(12) United States Patent
Cameron

(10) Patent No.: US 10,999,214 B2
(45) Date of Patent: May 4, 2021

(54) SECURE MEMORY WITH RESTRICTED ACCESS BY PROCESSORS

(71) Applicant: Donald Kevin Cameron, Sunnyvale, CA (US)

(72) Inventor: Donald Kevin Cameron, Sunnyvale, CA (US)

(*) Notice: Subject to any disclaimer, the term of this patent is extended or adjusted under 35 U.S.C. 154(b) by 0 days.

(21) Appl. No.: 15/925,741

(22) Filed: Mar. 19, 2018

(65) Prior Publication Data

US 2018/0219795 A1 Aug. 2, 2018

Related U.S. Application Data

(63) Continuation of application No. 14/412,672, filed as application No. PCT/US2013/055588 on Aug. 19, 2013, now Pat. No. 9,923,840.

(60) Provisional application No. 61/684,813, filed on Aug. 20, 2012.

(51) Int. Cl.

| *H04L 12/911* | (2013.01) |
|---|---|
| *G06F 9/24* | (2006.01) |
| *G06F 9/30* | (2018.01) |
| *G06F 9/48* | (2006.01) |
| *G06F 9/50* | (2006.01) |
| *G06F 9/54* | (2006.01) |
| *G06F 12/0802* | (2016.01) |

(Continued)

(52) U.S. Cl.
CPC .............. *H04L 47/788* (2013.01); *G06F 9/24* (2013.01); *G06F 9/3004* (2013.01); *G06F 9/4856* (2013.01); *G06F 9/5033* (2013.01); *G06F 9/547* (2013.01); *G06F 9/30* (2013.01); *G06F 12/0802* (2013.01); *G06F 2209/509* (2013.01); *H04L 67/10* (2013.01); *H04L 67/1002* (2013.01); *H04L 67/40* (2013.01)

(58) Field of Classification Search
CPC ... H04L 47/788; H04L 97/10; H04L 67/1002; H04L 67/40; H04L 67/10; G06F 9/24; G06F 9/547; G06F 9/5033; G06F 9/3004; G06F 9/4856; G06F 9/30; G06F 12/0802
See application file for complete search history.

(56) References Cited

U.S. PATENT DOCUMENTS

| 7,509,639 B2 * | 3/2009 | Worley, Jr. .............. G06F 9/468 713/164 |
|---|---|---|
| 7,979,844 B2 * | 7/2011 | Srinivasan .............. G06F 8/314 717/104 |

(Continued)

*Primary Examiner* — Davoud A Zand

(57) ABSTRACT

A method, apparatus and system for a secure memory with restricted access by processors. System has a plurality of processor units (PUs) coupled to a block of memory with at least one section secured (BMSS) against hacking by not allowing all PUs to access BMSS. One or more PUs has access to BMSS and is implemented with a dedicated function(s) that no other PU can perform such as a security function for encryption key checks. A thread running on a given PU that lacks access to a given memory location in BMSS is transferred to another PU with i) access to given memory location in BMSS; ii) implemented dedicated function; and/or iii) locked down instruction memory not free to run other code. Any attempt to breach protocol issues a fault. Existing code is hardened against less secure user code by only permitting authorized routines to transfer to the implemented PU.

20 Claims, 39 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 2003/0159070 A1* | 8/2003 | Mayer | G06F 21/53 |
| | | | 726/22 |
| 2004/0034794 A1* | 2/2004 | Mayer | G06F 21/567 |
| | | | 726/23 |
| 2005/0120122 A1* | 6/2005 | Farnham | H04L 69/03 |
| | | | 709/230 |
| 2005/0120242 A1* | 6/2005 | Mayer | G06F 21/55 |
| | | | 726/4 |
| 2007/0106986 A1* | 5/2007 | Worley, Jr. | G06F 9/45537 |
| | | | 718/1 |
| 2010/0274972 A1* | 10/2010 | Babayan | G06F 9/3842 |
| | | | 711/125 |
| 2013/0117541 A1* | 5/2013 | Choquette | G06F 9/3842 |
| | | | 712/214 |
| 2013/0132627 A1* | 5/2013 | Dong | G06F 9/545 |
| | | | 710/200 |
| 2013/0247060 A1* | 9/2013 | Makljenovic | G06F 9/526 |
| | | | 718/104 |
| 2014/0033217 A1* | 1/2014 | Vajda | G06F 9/30189 |
| | | | 718/102 |

\* cited by examiner

SECURE MEMORY WITH RESTRICTED ACCESS BY PROCESSORS

CROSS REFERENCE TO RELATED APPLICATIONS

This application is a continuation application that claims priority to and benefit of U.S. Pat. No. 9,923,840, application Ser. No. 14/412,672, filed on Jan. 3, 2015, issued Mar. 20, 2018, titled PROCESSING RESOURCE ALLOCATION; to PCT Application No. PCT/US2013/055588, filed Aug. 19, 2013; titled "PROCESSING RESOURCE ALLOCATION; and to U.S. Provisional Application No. 61/684,813, filed on Aug. 20, 2012, titled "PROCESSOR-IN-MEMORY ARCHITECTURE AND SOFTWARE METHODS FOR PARALLEL PROCESSING WITH SUPPORT FOR ACCELERATING SINGLE THREADED CODE"; all of which are incorporated herein by reference in their entirety.

TECHNICAL FIELD

The present application relates to the field of processing resource allocation.

BACKGROUND

In accordance with an exemplary scenario, a computer system may be a useful tool for the implementation of various data processing applications. However, as computer programs and data storage paradigms continue to become increasingly complex, the ability of computer systems to execute relatively intricate programs, and process relatively large amounts of data, in an expeditious and efficient manner may become more important over time. Consequently, the ability to efficiently allocate processing resources, such as, for example, in a multi-processor architecture, may be an indispensible tool for both modern and future computer systems.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a processing resource allocation method is disclosed. The method may include or comprise identifying an instruction mapped to data having a preselected data location. The method may also include or comprise determining whether to transfer a call of the instruction from a first processing unit (PU) to a second PU based on the preselected data location.

Additionally, in one embodiment, a processing resource allocation method is disclosed, wherein the method may include or comprise identifying an instruction mapped to data having a preselected data location. The method may also include or comprise determining with a processing resource allocation device whether to transfer a call of the instruction from a first PU to a second PU based on the preselected data location.

Moreover, in an embodiment, a computer-readable medium is disclosed, wherein the computer-readable medium stores a set of instructions that when executed cause a computer system to perform a method of processing resource allocation. The method may include or comprise identifying an instruction mapped to data having a preselected data location. The method may also include or comprise determining whether to transfer a call of the instruction from a first PU to a second PU based on the preselected data location.

DESCRIPTION OF THE DRAWINGS

The accompanying drawings, which are incorporated in and form a part of this specification, illustrate embodiments of the present technology, and, together with the Detailed Description, serve to explain principles discussed below.

Figure 1:
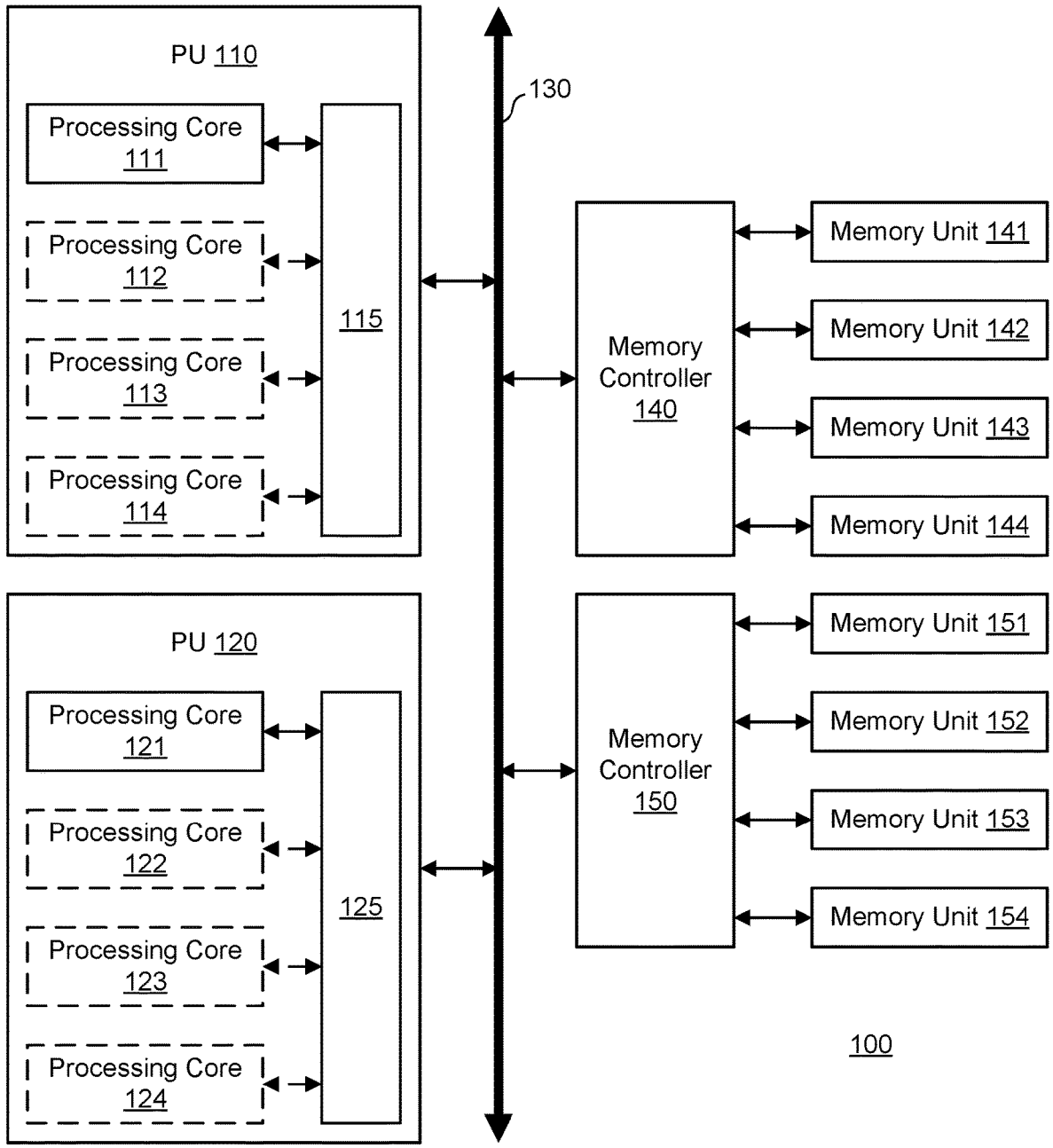
FIG. 1 is a block diagram of an exemplary processing architecture in accordance with an embodiment.

The drawings referred to in this description are not to be understood as being drawn to scale except if specifically noted, and such drawings are only exemplary in nature.

DETAILED DESCRIPTION

Reference will now be made in detail to embodiments of the present technology, examples of which are illustrated in the accompanying drawings. While the present technology will be described in conjunction with various embodiments, these embodiments are not intended to limit the present technology. Rather, the present technology is to be understood as encompassing various alternatives, modifications and equivalents.

Additionally, it is noted that numerous specific details are set forth herein in order to provide a thorough understanding of the present technology. It is further noted, however, that these specific details are exemplary in nature, and that the present technology may be practiced without these specific details. In other instances, well-known methods, procedures, components, circuits and systems have not been described in detail so as to not unnecessarily obscure aspects of the exemplary embodiments presented herein.

Moreover, it is noted that discussions throughout the present detailed description that utilize terms indicating that some action or process is to occur may refer to the actions and processes of a computer system, or a similar electronic computing device. For example, the computer system or similar electronic computing device manipulates and transforms data represented as physical (e.g., electronic) quantities within the computer system's registers and memories into other data similarly represented as physical quantities within the computer system memories or registers, or other such information storage, transmission, or display devices. The present technology is also well-suited to the use of other types of computer systems, such as, for example, optical and mechanical computers.

Thus, it is noted that the present technology may be described in the general context of computer-executable instructions, such as program modules, being executed by a computer. Such program modules may include, for example, routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote data storage media and computer memory devices.

The foregoing notwithstanding, it is further noted that terms indicating that some action or process is to occur may refer to manual actions or processes. Indeed, various embodiments of the present technology implement a combination of one or more computer-implemented actions or processes with one or more manual actions or processes. Moreover, one or more of these computer-implemented actions or processes may occur automatically, such as, for example, in response to (1) a specific user input, (2) a qualifying factor or parameter or (3) the occurrence of a previous action or process.

Additionally, it is noted that the terminology "coupled with" does not necessarily indicate a direct physical relationship. For example, when two components are described as being "coupled with" one another, there may be one or more other parts, materials, etc. (e.g., an adhesive or a signal/transmission line), that are coupled between, attaching, integrating, etc., the two components. As such, the terminology "coupled with" shall be given its broadest possible meaning, unless otherwise indicated.

Moreover, the terminology "communicatively associated with" does not necessarily indicate a physical relationship. For example, when two components are described as being "communicatively associated with" one another, these components may be configured to communicate with one another, for example, using a wireless and/or wired communication protocol. As such, the terminology "communicatively associated with" shall be given its broadest possible meaning, unless otherwise indicated.

Furthermore, the term "paradigm" shall not be construed as indicating a previously known understanding of the referenced subject matter. Rather, the term "paradigm" may be construed, for example, as simply referring to an example, arrangement, configuration or model presented in accordance with an embodiment of the present technology. Indeed, the term "paradigm" shall be given its broadest possible meaning, unless otherwise indicated.

Additionally, for purposes of clarity, it is noted that the term "program" may refer, for example, to an algorithm or series of instructions, or alternatively to the act of providing coded instructions for the performance of a particular task. Notwithstanding these exemplary definitions, the term "program" shall be given its broadest possible meaning, unless otherwise indicated.

It is further noted that the term "process" may refer to, for example, an activity whereby a program (or algorithm) is executed, or to a particular instance of a computer program that is being executed. Alternatively, the term "process" may simply refer, for example, to a series of actions taken to achieve a result, or alternatively to the act of performing a series of operations in order to achieve a result. Notwithstanding these exemplary definitions, the term "process" shall be given its broadest possible meaning, unless otherwise indicated.

Finally, the terminology "computer-readable medium" may be interpreted, for example, as referring to either a transitory or non-transitory computer-readable medium. However, at no time shall the terminology "computer-readable medium" be interpreted as only comprising one or more signals (e.g., one or more transitory, propagating signals) per se. Moreover, in the event that the terminology "computer-readable medium" is interpreted as a "non-transitory computer-readable medium", the resulting terminology "non-transitory computer-readable medium" shall be interpreted as encompassing all computer-readable media with the sole exception being a computer-readable medium that only comprises one or more signals (e.g., one or more transitory, propagating signals) per se.

I. Overview

In accordance with an exemplary scenario, processors within a processing architecture share memory (e.g., random access memory (RAM) or level 2 (L2) cache), and each processor has its own cache with its own view of the memory. Each processor is programmed as a single processor; thus, a multi-processor architecture essentially utilizes a single processor approach. Plus, the implemented communication mechanism that exists between the processors is through the shared memory. It is noted that a number of problems with this approach may develop. For example, it may be difficult to prioritize how the communication between the processors is carried out, attempting to transfer small amounts of information between the processors may not be efficient, and cache coherency problems may be experienced.

Pursuant to one exemplary scenario, cache coherency problems can be especially troublesome. For example, it may be important that each processor see the same view of the data, except that the data is actually saved in many different places. In particular, in a cache architecture, a processor will write to its own cache, which may be referred to, for example, as level 1 (L1) cache, and the other processors will not be able to see what has been written, since such L1 cache is not shared memory. Therefore, the data change is communicated to the second level of cache (or L2 cache), and then fed into each of the other processors' respective L1 cache, before the other processors can see it. Consequently, when a data change is implemented, this change will essentially "dirty" the cache line, in which case a signal is sent out to let each of the processors know not to use this data for the time being. Thus, it is noted that storing multiple copies of the same data value in different L1 caches can cause cache coherency problems.

Pursuant to one exemplary solution to such cache coherency problems, mutual exclusion (mutex) locks may be implemented. For example, when a first processor intends to write to a certain data variable, that data variable becomes locked such that no other processor is able to write to it while it is in a locked state. The first processor is then able to write to the locked data variable and then unlock it such that the new data value is sent to L2 cache and then fed into each of the remaining L1 caches. However, a problem may develop with regard to this exemplary solution in that this type of system may not scale well. For example, attempting to implement a mutex lock when the implemented architecture includes 100 processors may involve a significant amount of extra hardware.

In addition to the foregoing, it is noted that an objective of various performance-focused approaches is to minimize the time that it takes to move something, which depends on what is being moved. Pursuant to the aforementioned exemplary scenarios, it is the data that is moved; indeed, moving the code may not be necessary as the code is fixed (and instruction cache is provided that may be filled and subsequently refilled). In accordance with an embodiment of the present technology, however, the data itself is not moved, which helps to solve the aforementioned problems. For example, an embodiment of the present technology provides a hybrid computer architecture that enables better parallel processing and performance by minimizing overall data movement and cache coherency requirements. It also provides information to software as to how to direct context switches, and new approaches to code linking are implemented so as to take advantage of this.

Pursuant to one embodiment, a technique that utilizes "wandering threads" is implemented. The goal of such an implementation is to have processors working out of local cache and minimize cache misses. This technique may be implemented within, for example, a multi-core/many-core non-uniform memory access (NUMA) processing architecture using CPUs tightly bound to memory in groups. Moreover, in the event that the processing architecture has a unified global address space, the mechanism can be used with predefined, single-threaded code to achieve better performance without modification. Thus, it is noted that this approach may be implemented such that it supports preexisting code and using NUMA machines (that are not cache coherent) with relatively high core counts and where memory and processors are built using "die stacking".

II. Exemplary Architectures, Methods and Paradigms

Various exemplary embodiments of the present technology will now be discussed. It is noted, however, that the present technology is not limited to these exemplary embodiments, and that the present technology also includes obvious variations of the exemplary embodiments and implementations described herein. It is further noted that various well-known components are generally not illustrated in the drawings so as to not unnecessarily obscure various principles discussed herein, but that such well-known components may be implemented by those skilled in the art to practice various embodiments of the present technology.

A. Exemplary Processing Architectures

A number of exemplary processing architectures will now be explored. It is noted, however, that the present technology is not limited to these exemplary processing architectures techniques, and that other processing architectures techniques may be implemented.

In an exemplary scenario, computer system processor development may be independent from both memory development and the use of different IC processes. Consequently, a significant number computer architectures may be focused on managing the movement of data and code between the memory chips and the PUs. This may result in multiple layers of cache, which holds temporary copies of the data being moved. Due to attributes of silicon IC process scaling, processor speed may plateau or "top out", and single core performance may be a function of the average physical distance across which it is to move data and code during an operation. Since increasing core size may not be beneficial, processors may be built with multiple cores per PUs/IC package, wherein such multiple cores share access to the included memory, such as shown in FIG. 1.

With reference now to FIG. 1, an exemplary processing architecture 100 in accordance with an embodiment is shown. Exemplary processing architecture 100 includes one or more processing units (PUs), such as exemplary PUs 110, 120. Each of these PUs includes at least one processing core, such as exemplary processing cores 111, 121, wherein each of these processing cores may be referred to, for example, as a CPU. One or more of these PUs may also optionally include one or more additional processing cores, such as additional processing cores 112-114, 122-124. It is noted that each of these processing cores is configured to process electronic information, such as when computer-readable instructions are routed to these cores in the form of electronic digital signals. Moreover, one embodiment provides that the implemented processing cores are predefined or augmented processors capable of running sequential code (e.g., x86, ARM or MIPS processors).

Furthermore, in one embodiment, one or more of these PUs each includes at least one cache memory unit, such as exemplary cache memory units 115, 125. Each such cache memory units is communicatively coupled or associated with the processing core(s) contained within the same PU. Moreover, each of these cache memory units is configured to store electronic information, such as electronic digital information representing data and computer-readable instructions. For example, in one embodiment, different computer-readable instructions are routed, in the form of electronic digital information, to each of exemplary PUs 110, 120 from an external source. Upon or subsequent to the receipt of these instructions at exemplary PUs 110, 120, respectively, the received instructions are stored in exemplary cache memory units 115, 125, respectively. Subsequently, a processing core within the same PU as a particular cache memory unit may access the data and instructions stored within such cache memory unit, execute these instructions based on the accessed data, and return a number of processing results to the cache memory unit where such results will be stored.

Thus, in accordance with various embodiments, multiple PUs are implemented. It is noted that an implemented PU, or a number of its constituent components, may be included within an integrated circuit (IC) chip or package. It is further noted, however, that the present technology is not limited to the implementation of IC chips or packages.

With reference still to FIG. 1, each of the PUs is communicatively associated or coupled with a bus 130 (e.g., a data/address bus). In an embodiment, bus 130 (and/or one or more of the other physical transmission lines linking the various components of exemplary processing architecture 100) includes a printed circuit board (PCB) track, such as, for example, an off-chip PCB track. Bus 130 is communicatively associated or coupled with one or more memory controllers, such as exemplary memory controllers 140, 150. Moreover, each of these memory controllers is communicatively associated or coupled with one or more memory units, such as exemplary memory units 141-144, 151-154. It is noted that one or more of these memory units may include, for example, RAM, such as dynamic RAM (DRAM).

In an exemplary implementation, one or more memory units, such as exemplary memory units 141-144, 151-154, are configured to store instructions and/or data, and one or more memory controllers, such as exemplary memory controllers 140, 150, are configured to manage the flow of information traveling to and from such memory units. When instructions and/or data are to be routed to one or more of the aforementioned PUs from these memory units, the memory controllers are configured to access such information in these memory units and route the information along bus 130 to the appropriate PUs.

With reference still to exemplary processing architecture 100 shown in FIG. 1, an exemplary scenario provides that this architecture suffers from a long transfer path for arbitrary operations and contention for the various communication channels. As such, an embodiment provides for the reconfiguring of cores and memory in a way that minimizes the distance between a core and its data and code, minimizes contention between cores, and minimizes the movement of code and data. Although this may be difficult in a single IC process, it is noted that the ability to "die stack" ICs makes this easier to implement, thereby providing an architecture, such as shown in FIG. 2, where the shared memory bus is replaced by a network that is free from bottlenecks, where each piece of memory from among a plurality of memory units has directly associated processors, and where a CPU may have multiple processing cores.

Figure 2:
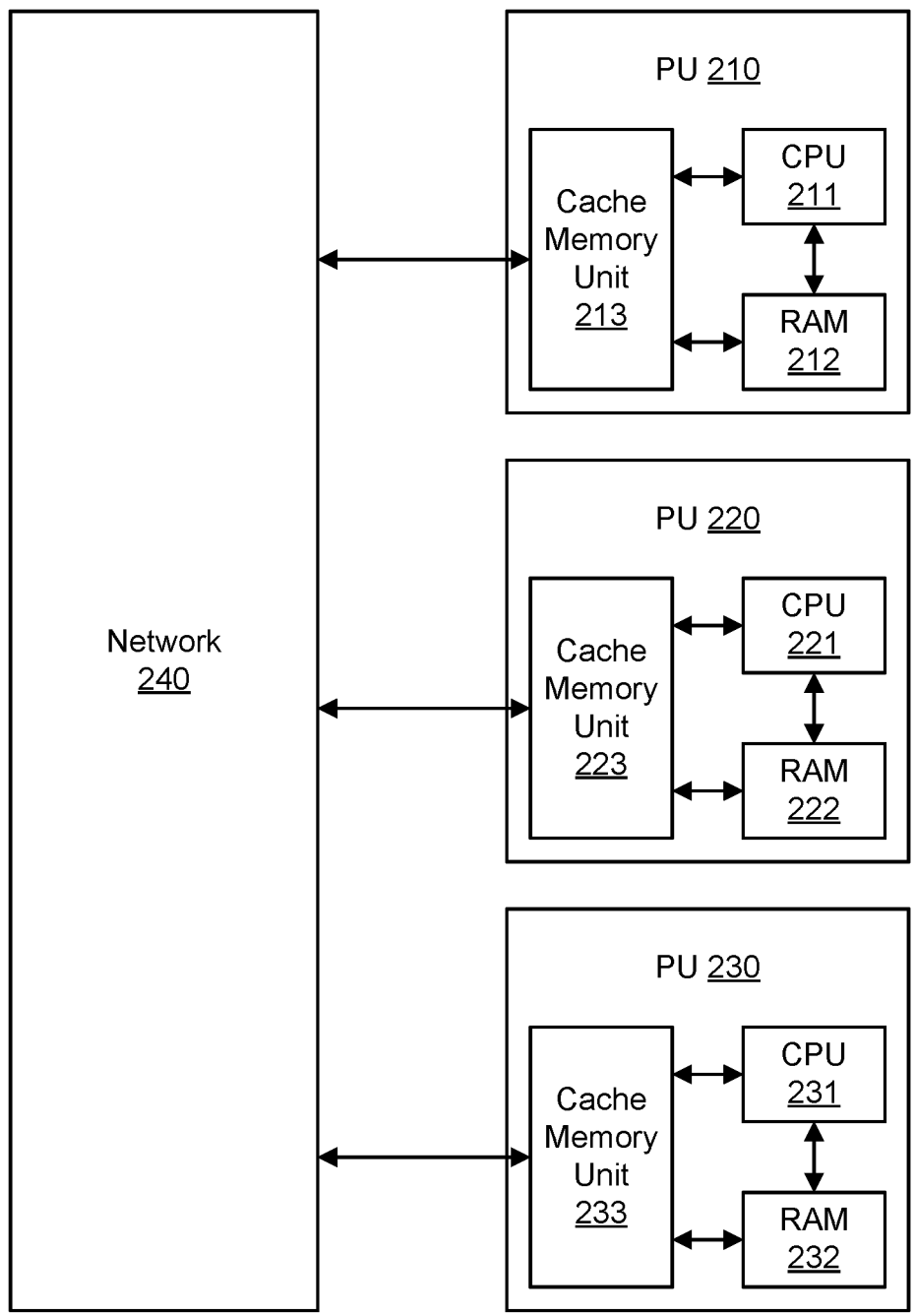
FIG. 2 is a block diagram of an exemplary distributed processing architecture (DPA) in accordance with an embodiment.

To further illustrate, and with reference now to FIG. 2, an exemplary distributed processing architecture (DPA) 200 in accordance with an embodiment is shown. Exemplary DPA 200 includes multiple PUs, such as exemplary PUs 210, 220, 230, wherein these PUs may be optionally arranged in a "die-stacked" configuration. For example, it is noted that "die stacking" may be defined, for example, as a process of stacking multiple components (e.g., semiconductor chips) on top of one other within a single semiconductor package. Therefore, an embodiment provides that two or more of the implemented PUs are stacked on top of one other, and that these stacked PUs are contained within, for example, a single semiconductor package mounted on a PCB.

In an embodiment, the implemented PUs are communicatively coupled or associated with a network 240, wherein network 240 is configured to route information to and from these PUs. In one embodiment, network 240 may be, for example, a distributed network of locally and/or remotely located computers and servers. It is noted, however, that the present technology is not limited to any particular type of network.

With reference still to FIG. 2, each of the implemented PUs includes at least one CPU, such as exemplary CPUs 211, 221 and 231, wherein each CPU is configured to process electronic information, such as when computer-readable instructions are routed to the CPU in the form of electronic digital signals. One embodiment provides that the implemented CPUs are predefined or augmented processors capable of running sequential code (e.g., x86, ARM or MIPS processors). Each of the implemented PUs also includes at least one RAM unit (e.g., a DRAM memory unit), such as exemplary RAM 212, 222 and 232, wherein the included CPU is communicatively associated or coupled with the RAM unit located within its respective PU. It is noted that each of the implemented RAM units is configured to store instructions and/or data that may be retrieved or accessed by its respective CPU.

Moreover, one embodiment provides that one or more of these RAM units are mapped globally such that the information stored in these globally mapped RAM units may be accessed by CPUs located in different PUs. To illustrate, it is noted that RAM 212 is communicatively coupled or associated with CPU 211, both of which being located within the same PU (PU 210), such that CPU is able to retrieve or access information stored in RAM 212. Additionally, in accordance with an exemplary implementation, RAM 212 is mapped globally such that CPUs 221, 231, which are located in different PUs with respect to RAM 212, are also able to retrieve and access the information stored in RAM 212. In the event that the existence of certain RAM is known to more than one PU, such RAM may be referred to as "shared RAM"; however, an individual PU's RAM may be partitioned such that some or all of the individual PU's RAM is private to such PU. Moreover, a "shared RAM unit" may refer, for example, to all of the RAM in a particular PU regardless of whether it is actually shared.

Furthermore, and with reference still to FIG. 2, each PU includes a cache memory unit, such as exemplary cache memory units 213, 223 and 233, wherein such cache memory unit is communicatively associated or coupled with both the CPU and RAM unit located within its respective PU, and wherein such cache memory unit may be configured to engage, for example, in memory management and/or network processing. Indeed, in one embodiment, the CPU, RAM unit and cache memory unit located within a particular PU are configured to communicate with one another through, for example, a through-silicon-via (TSV)/wide-input/output (Wide-IO) (or on-chip) communication architecture. It is noted, however, that that the present technology is not limited to this particular communication architecture, and that other communication architectures may be implemented.

Furthermore, and with reference still to FIG. 2, an embodiment provides that the same structure is included in a network of servers within a server farm with each PU being a server, and wherein the network is packet switched (e.g., an Ethernet paradigm). In such systems, memory may not be managed coherently across servers, and message-passing programming styles may be used for programming the system (e.g., a message passing interface (MPI)). Pursuant to a number of exemplary implementations, the methods described here provide a unified approach for programming such large distributed systems as well as smaller, highly integrated, parallel systems.

With respect to system performance, and in accordance with an exemplary implementation, it is noted that each processor has a "context", which refers to its stack frame. In particular, the processor has a memory stack that it is working within, which refers to the routine that the executed program is in at a particular point in time. Therefore, the routine that a processor is currently in may be referred to, for example, as its context. Moreover, in so much as the information for the routine is stored in local CPU registers such that this information may be quickly accessed, these registers, along with the program counter (or instruction pointer), may be construed as representing the context for a particular process. Thus, a "task context" may be defined, for example, as the minimal set of data utilized by a particular task that is to be saved in order to enable an interruption of such task that is subsequently followed by a successful continuation of this same task at the very point that it was interrupted. In view of the foregoing, one implementation provides that a "context" includes the data stored within the registers and call stack that is not visible to a programmer (e.g., because it does not have a memory address) but is nevertheless utilized by the code being executed.

When the processor calls a new routine, it will fetch the new instructions for this other routine from memory, and then execute them; this may be referred to, for example, as a "context switch", whereby a processor moves from one frame to another frame when a call is executed. It is noted that such a context switch may be performed by locally saving the CPU registers used by the currently executing thread and then loading the registers that are to be used by the next thread to be executed. It is further noted that such a context switch may enable multiple processes to share a single CPU, and therefore may be an extremely important feature of a multitasking operating system. In particular, such context switches are performed extremely fast such that it may seem as though multiple processes are being executed simultaneously on the same processor.

With reference still to exemplary DPA 200 shown in FIG. 2, in an embodiment, this architecture is a NUMA architecture that may (or may not) be cache coherent, depending on the implementation of the network and caches. Similarly, the memory may or may not be arranged such that it forms one global address space and is available to each processor from among a plurality of implemented processors.

The foregoing notwithstanding, an exemplary scenario provides that a problem exists with this latter distributed architecture. In particular, there is still a finite amount of local memory and cache, so while performance of tasks in memory may be better than could be achieved with exemplary processing architecture 100, a processor will still stall if requested data or code is not stored locally for a particular processor, which would involve management for "swapping" data in and out of the cache and/or memory (e.g., DRAM) if normal code execution is performed (such as with x86 or ARM processors). Moreover, a second exemplary scenario provides that SMP processing architectures may not scale well, and neither do the software approaches used with them. However, an embodiment of the present technology provides that the DPA may be used effectively without running into these problems if, for example, the coding style is message-passing rather than SMP, and if each "thread" can be bound or allocated to a particular CPU. It is noted that a "thread" may be defined as, for example, an independent sequence of instructions within a program that can be executed independently of the program's other code. In particular, each thread represents a separate control path through the code, and if multiple threads are defined in a particular process, then each of those threads will be essentially independent of one another.

Figure 3:
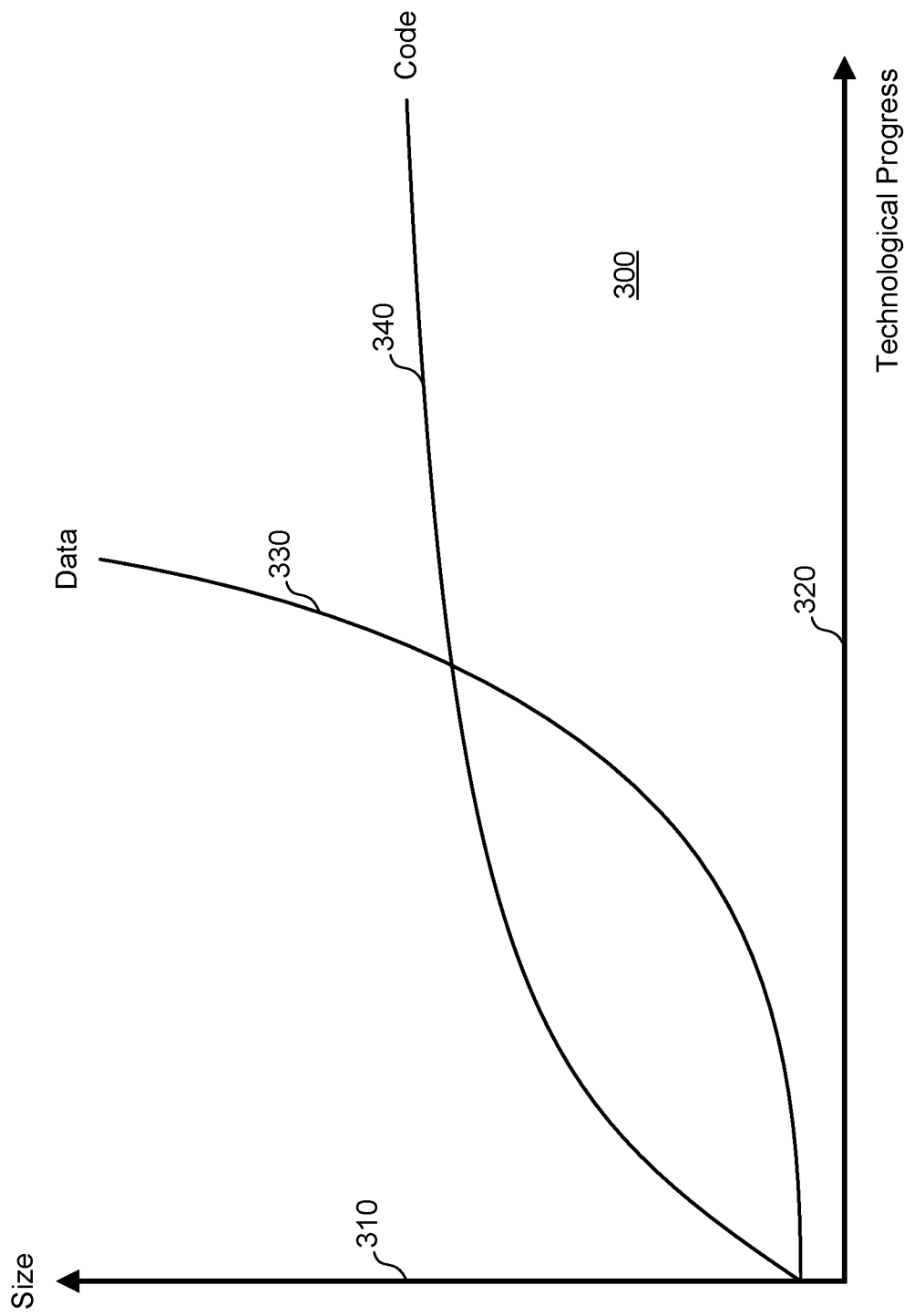
FIG. 3 is a diagram of an exemplary progress analysis in accordance with an embodiment.

In view of the foregoing, a number of proposed extensions/modifications to a simple DPA shall be explored herein. These proposed extensions/modifications are supported by a number of observations. First, and with reference now to FIG. 3, a diagram of an exemplary progress analysis 300 in accordance with an embodiment is shown. In the diagram, a vertical axis 310 is used to measure the size of the plotted information, and a horizontal axis 320 is used to measure the technological progress associated with the plotted information, wherein the technological progress is a function of information size. Moreover, observations about data and code are plotted, as plots 330 and 340, respectively, as the size of such data and code increases. The diagram yields (pursuant to an exemplary scenario) the observable conclusion about code and data over time, whereby code size grows logarithmically while data grows exponentially. The reason for this is that data capacity appears to follow Moore's Law (which states that the number of transistors within ICs doubles approximately every two years), whereas code tends to be reused over time and has functions that may be often called or utilized.

Moreover, in accordance with one exemplary scenario, a second observation provides that, for a particular type of data, there are a fixed number of operations performed on it. This may be formalized in "object oriented" programming languages, such as the C++ programming language based on the C programming language (hereinafter referred to simply as "C++" and "C", respectively), where data is described as belonging to "classes", it being noted that a class contains, for example, a finite number of "methods" or routines that can implement the data.

In view of the foregoing two observations, it is noted that if multiple data sets of a particular type are each allocated into the memory of a specific PU in a DPA, then the code utilized to process this data will be focused on the methods for that particular data type, and the amount of implemented code will be (in accordance with one implementation) significantly smaller than the data itself. Thus, within a particular PU, the code that is to be stored locally will be the method code for the data that is held locally. This will enable a relatively high degree of processing efficiency to be achieved, as will be further explored herein.

B. Exemplary Processing Resource Allocation

A number of exemplary processing resource allocation techniques will now be explored. It is noted, however, that the present technology is not limited to these exemplary processing resource allocation techniques, and that other processing resource allocation techniques may be implemented.

Figure 4:
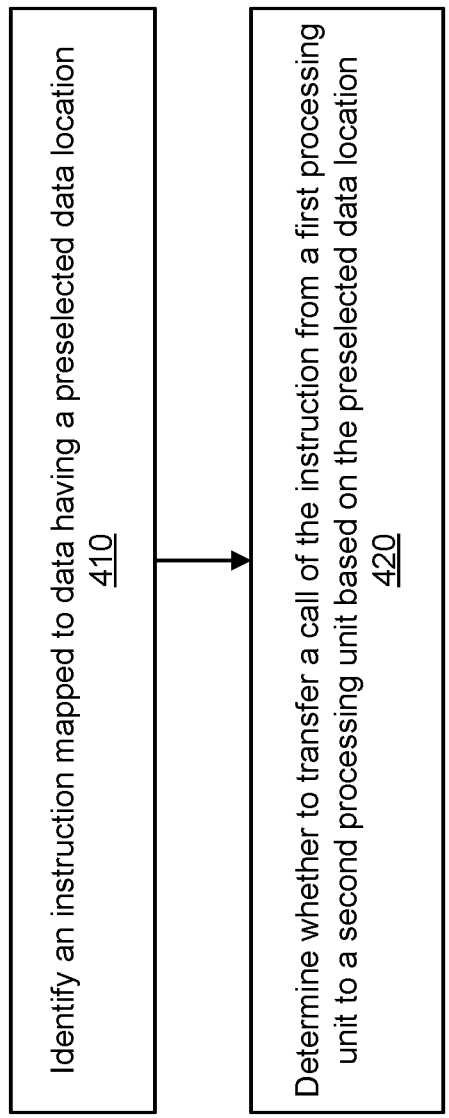
FIG. 4 is a flowchart of an exemplary method of processing resource allocation in accordance with an embodiment.

In view of the foregoing, and with reference now to FIG. 4, an exemplary method of processing resource allocation 400 in accordance with an embodiment is shown. Exemplary method of processing resource allocation 400 includes identifying an instruction mapped to data having a preselected data location 410 and determining whether to transfer a call of the instruction from a first PU to a second PU based on the preselected data location 420. To illustrate, consider the example where the data is not currently stored in a cache memory unit allocated to the first PU, but where the data may be currently stored in a different cache memory unit allocated to the second PU. In the event that this different cache memory unit is in fact currently storing this data, such that the second PU already has relatively quick access to this locally stored data, a "thread of control" that involves the aforementioned instruction may be transferred from the first PU to the second PU (due to the relative ease with which the second PU is able to access the data, and in order to prevent the first PU from beginning the process of storing a local copy of this data so as to execute the instruction). In this manner, the thread of control may be moved rather than the data itself.

It is noted that moving a thread may be a unidirectional task, whereas, pursuant to one exemplary scenario, a data/code fetch is bidirectional in that a request is sent and then data is returned. With high bandwidth low-latency communication channels (e.g., fiber optic channels), it may be faster to move a thread context than to request data/code purely as a result of the distance involved. In particular, electronic signals travel near the speed of light, but this is still only centimeters per nanosecond. In contrast, a number of exemplary processors can perform many operations in a single nanosecond.

To further illustrate, one exemplary implementation provides that a first PU is running a thread (such that this PU has a particular "thread of control"). Next, the decision point for this first PU is presented when the first PU is to perform a jump or routine call, which may involve, for example, a code jump. In particular, the first PU identifies the memory address that it would be jumping to, and the first PU then decides whether it or a different PU is going to perform the jump or routine call. In order to make this decision, the first PU determines (1) what data is involved, (2) where the corresponding data is located (e.g., if a routine involves a particular object, then the location of that object is determined), and (3) which PU has local memory (e.g., L1 cache or RAM) that corresponds to this particular location. Based on this location information and the corresponding PU identity, the first PU is able to determine whether to perform the jump or routine call itself or else transfer (or pass) the thread of control to a different PU (e.g., a second PU, a third PU, etc.). In the event that this thread of control is indeed passed to a different PU, then this other PU will perform the call, and the first PU will then be free to begin running a different thread.

For purposes of still further illustration, an exemplary implementation provides that, in C++, a first PU begins to perform an executable routine call on a method, and there is a data pointer mapped to a particular object that is to be retrieved for the execution of such routine. It is noted that this pointer is located in a particular argument in the call such that the executing PU will be working from a particular register. The first PU will look at this register to determine what memory value is stored therein, and if that memory value does not belong to the first PU, it will transfer the call to a different PU, in which case the first PU will not bother retrieving, analyzing or processing additional code associated with this routine.

In view of the foregoing, an embodiment provides that a first PU receives the aforementioned thread of control in a DPA, wherein multiple data sets of a particular type are each allocated into the memory of a second PU within such DPA, and wherein the data that is the subject of the transfer decision of the first PU corresponds to one of these data sets. Consequently, if the first PU is not already storing a copy of this data, then the first PU will transfer this thread of control to the second PU, which will locally store the method code for that locally stored data. As previously noted, this will enable a relatively high degree of processing efficiency to be achieved, because the code utilized to process this data will be focused on the methods for that particular data type, and the amount of implemented code will be (in accordance with one implementation) significantly smaller than the data itself.

Figure 5:
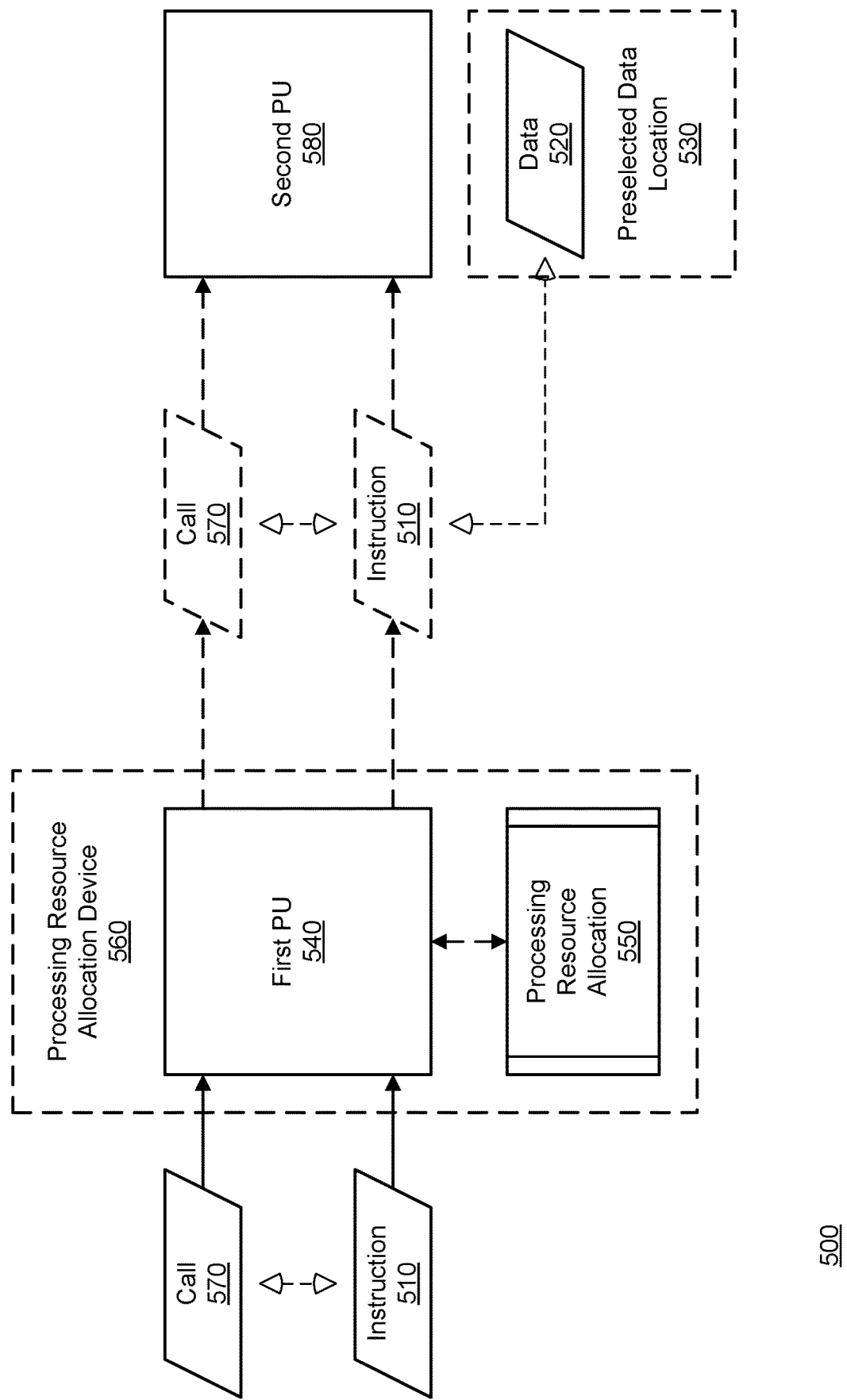
FIG. 5 is a block diagram of an exemplary processing resource allocation paradigm in accordance with an embodiment.

To further illustrate, and with reference now to FIG. 5, an exemplary processing resource allocation paradigm 500 in accordance with an embodiment is shown. In particular, an instruction 510 mapped to data 520 having a preselected data location 530 is identified, such as may occur when a first PU 540 receives instruction 510. It is noted that preselected data location 530 may be located within, for example, local memory of a particular PU. Additionally, a processing resource allocation 550 is performed, such as by a processing resource allocation device 560, in order to determine whether a call 570 of instruction 510 is to be transferred from first PU 540 to a second PU 580 based on preselected data location 530. For example, if preselected data location 530 is located within the local memory of first PU 540, then call 570 will not be transferred, in which case first PU 540 will maintain the thread of control and perform call 570. Alternatively, if preselected data location 530 is not located within the local memory of first PU 540, but is located within the local memory of second PU 580, then call 570 will be transferred to second PU 580, in which case second PU 580 will obtain the thread of control and perform call 570.

With reference still to FIG. 5, it is noted that processing resource allocation 550 may be performed by processing resource allocation device 560. In an embodiment, processing resource allocation device 560 includes one or more of the implemented PUs, such as first PU 540. Moreover, one embodiment provides that processing resource allocation 550 is performed by first PU 540. It is noted, however, that processing resource allocation 550 may be performed by a PU other than first PU 540.

In view of the foregoing, an exemplary implementation involves moving the computing context to its associated code and data rather than moving the data and code in and out of a particular processing core. Thus, data is spread over globally shared memory in a way that preserves locality such that a particular processor (1) only handles a particular subset of data types within a particular processing time span, (2) does not miss cache for instructions and (3) is unlikely to miss cache for data. Indeed, a relatively high degree of processing efficiency will be realized whether or not cross-processor cache coherency is achieved, because threads using the same data will be guided to the same processor. This approach may be referred to, for example, as "wandering threads", because a single thread of control may wander across processors while accessing different areas of memory. Furthermore, one embodiment provides that the more processors that are implemented, the lower the probability that threads will be on the same processor and in contention for resources. Similarly, the higher the number of processors that are implemented, the more likely it will be that relevant data will be stored in local cache rather than in external DRAM.

The foregoing notwithstanding, it is noted that exemplary method of processing resource allocation 400, as discussed above, may be supplemented and/or modified. Indeed, for purposes of illustration, a number of exemplary embodiments will now be explored. However, the present technology is not limited to these exemplary embodiments.

Figure 6:
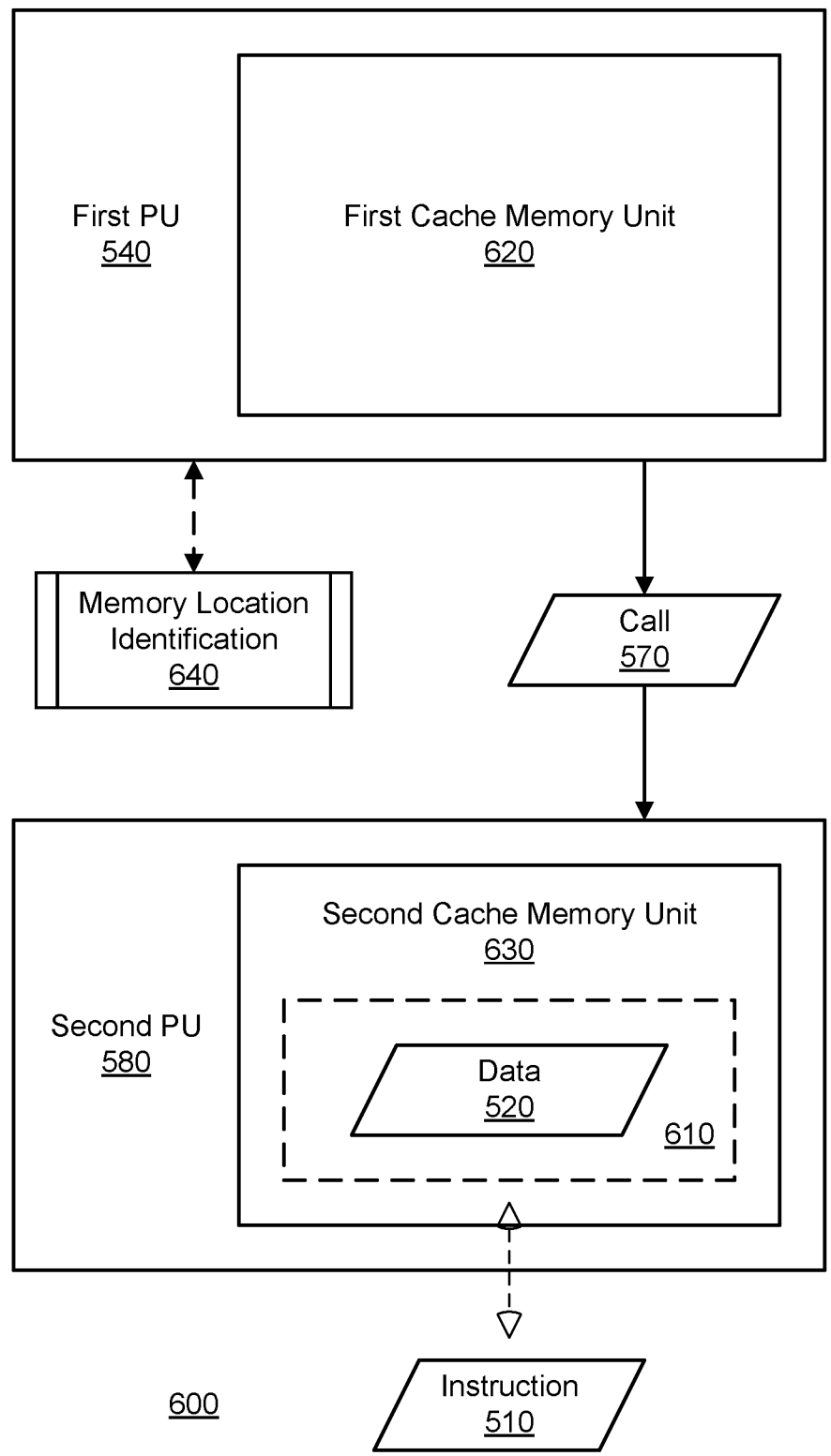
FIG. 6 is a block diagram of a first exemplary call transferring paradigm in accordance with an embodiment.

Similar to the embodiment shown in FIG. 1, one embodiment provides a processing machine, system or architecture, such as may be implemented by a parallel processing machine, which includes a plurality of PUs communicatively associated or coupled with one another, or connected to each other, wherein each of the plurality of PUs has local memory, and wherein the plurality of PUs are configured to either execute an instruction or transfer execution of the instruction to another PU based on a data or code location in memory associated with the instruction. To illustrate, and with reference now to FIG. 6, a first exemplary call transferring paradigm 600 in accordance with an embodiment is shown. In particular, a code or data memory location 610 associated with instruction 510 is identified, and call 570 is transferred from first PU 540 to second PU 580 based on code or data memory location 610 being associated with second PU 580.

Consider the example where first and second cache memory units 620, 630 are associated with (e.g., assigned to or included within) first and second PUs 540, 580, respectively. A memory location identification 640 is performed, such as by, for example, first PU 540, whereby it is determined that data 520 is currently stored in code or data memory location 610 (e.g., preselected data location 530 shown in FIG. 5), wherein code or data memory location 610 is located in second cache memory unit 630 rather than in first cache memory unit 620. This is important because instruction 510 is mapped to data 520 such that access to data 520 is a condition to successfully executing instruction 510 in its entirety. Consequently, call 570 is transferred from first PU 540 to second PU 580, because second PU 580 already has local access to data 520. In particular, it is noted that a performance of call 570 by second PU 580 will not involve the additional time and energy associated with sending a data request to external memory and then wait for the returned value/data set.

To further explain, consider the example where a processor is running a relatively large or complex program. Due to the size or complexity of this program, the processor will sometimes miss the instruction cache, because sometimes the program execution will involve fetching a new set of instructions from shared memory. Moreover, in object oriented languages, particular types of data may be associated with particular operations in the way that the code is written. Consequently, an embodiment provides that objects of a particular type and a particular space are allocated to a particular processor such that this processor, during a particular processing time span, is only going to process the code that interacts with that particular type of data. Therefore, if a processor only has a particular type of data in L1 cache, or in a preselected portion of such L1 cache, then the processor is only going to implement, during a particular processing time span, a relatively small number of instructions, which makes it highly unlikely that the processor will miss the instruction cache.

Thus, in an embodiment, instead of executing a call locally, a first processor will instead pass the context, and in particular transfer the call, to a second processor if such second processor already has the relevant data in its own L1 cache. Consequently, it is the context that is moved rather than the data itself. Essentially, the first processor gives up on a particular context, and passes it to a different processor. Moreover, one embodiment provides that if the second processor ends up giving up on this context, then it can then pass it on to a third processor, and so forth. As a result, the passed thread of control may be referred to, for example, as a "wandering thread". Thus, the thread of control may be passed (or "wander") to a different processor where the instructions and the data are located in local memory.

For purposes of selecting a specific processing architecture, it is noted that wandering threads may be implemented, for example, on a DPA, such as described herein. For example, it is noted that many threads may be simultaneously performed in a DPA system, and that it would be unlikely that such threads would collide if they are utilizing different data than one another. However, the present technology is not limited to the implementation of a DPA. Rather, wandering threads may also be implemented on architectures other than DPAs. Indeed, one example provides that server farms utilizing Ethernet communication may have a similar structure.

With reference to the call transfer mechanism, an embodiment provides that running message passing code involves not just the ability to transfer data between PUs, but also the ability to process it when it arrives. This may be implemented, for example, as a remote procedure call (RPC), which will be further discussed herein. It is noted that a RPC may be defined, for example, as a mechanism configured to transfer a computing context of a first PU that is executing a program to a second PU so as to enable this second PU to continue executing the program, it being noted that a compiler may reform a user's code to have different call boundaries. For example, rather than simply passing data between PUs, both data and a handler routine entry point are sent. Consequently, single threaded code may be run on a DPA with a unified global address space by using the RPC mechanism to transfer control between PUs. Therefore, rather than having a single core executing the single threaded code by continually reading in the instructions and data, the thread of control wanders from PU to PU depending on what data is being processed. In so much as the method code is likely to be resident with the data on the PU, relatively few "cache misses" will occur. In this manner, the cost of a cache-miss may be traded for the overhead of transferring the call context. It is noted that this technique may be used with single threaded code compiled for various processors if, for example, hardware support is added to the cores to identify that the memory being accessed for a given routine call or operation belongs to another PU and that transferring control to that PU may be beneficial.

C. Exemplary Memory Allocation

A number of exemplary memory allocation techniques will now be explored. It is noted, however, that the present technology is not limited to these exemplary memory allocation techniques, and that other memory allocation techniques may be implemented.

In an embodiment, the respective local memories of different PUs are allocated to different data sets, respectively, in advance of the wandering threads being received by such PUs such that each of these different PUs is configured to efficiently process specific threads. In this manner, a relatively efficient and specialized processing architecture may be achieved.

Figure 7:
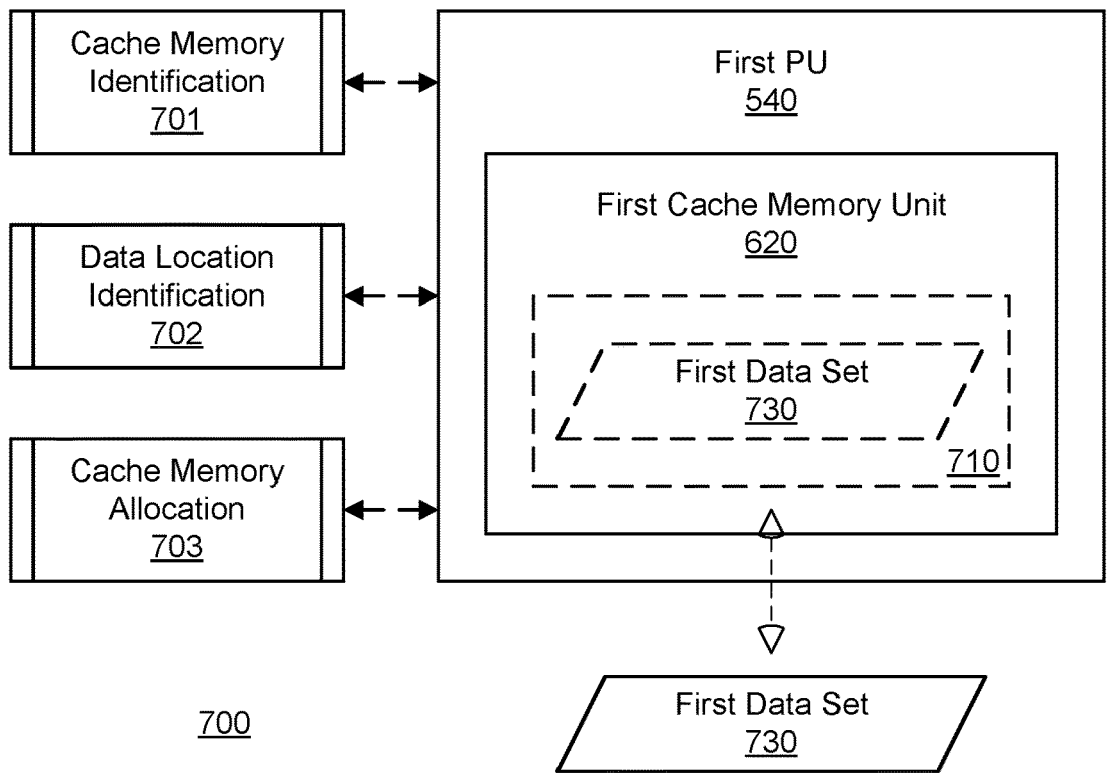
FIG. 7 is a block diagram of an exemplary memory allocation paradigm in accordance with an embodiment.

To illustrate, and with reference now to FIG. 7, an exemplary memory allocation paradigm 700 in accordance with an embodiment is shown. In particular, first and second cache memory units 620, 630 associated with (e.g., assigned to or included within) first and second PUs 540, 580, respectively, are identified, as represented by cache memory identification 701. Additionally, first and second data locations 710, 720 associated with first and second data sets 730, 740, respectively, are identified, as represented by data location identification 702, wherein first and second data locations 710, 720 are located within first and second cache memory units 620, 630, respectively. For example, first and second data locations 710, 720 may be identified based on first and second data sets 730, 740 being stored in first and second data locations 710, 720, respectively.

Moreover, an allocation of first and second cache memory units 620, 630, as represented by cache memory allocation 703, to first and second data sets 730, 740, respectively, is conducted based on first and second data locations 710, 720. In particular, in so much as first and second data locations 710, 720 are located within first and second cache memory units 620, 630, respectively, first and second cache memory units 620, 630 are allocated to first and second data sets 730, 740, respectively. Consequently, these cache memory units have been allocated to completely different data sets, which may be accessed, for example, in order to perform different process threads, respectively. In this manner, a particular PU can be configured to efficiently process those threads mapped to the specific data set to which its local memory has already been allocated.

Consequently, and with reference still to FIG. 7, if a thread of control pertaining to first data set 730 is received by second PU 580, then second PU 580 may pass this thread of control to first PU 540, since first PU 540 has already been allocated to this particular data set. Similarly, if a different thread of control pertaining to second data set 740 is received by first PU 540, then first PU 540 may pass this different thread of control to second PU 580, since second PU 580 has already been allocated to this particular data set.

Furthermore, in the event that first and second data sets 730, 740 have two different data types, respectively, then a third data set having one of these two data types may be routed to the cache memory unit that is already storing data having this same data type. In this manner, multiple data sets that share a particular data type will be co-located within the same local memory unit for a particular PU, which further increases the relative efficiency with which that PU will be able to process those threads mapped to its locally stored data.

Figure 8:
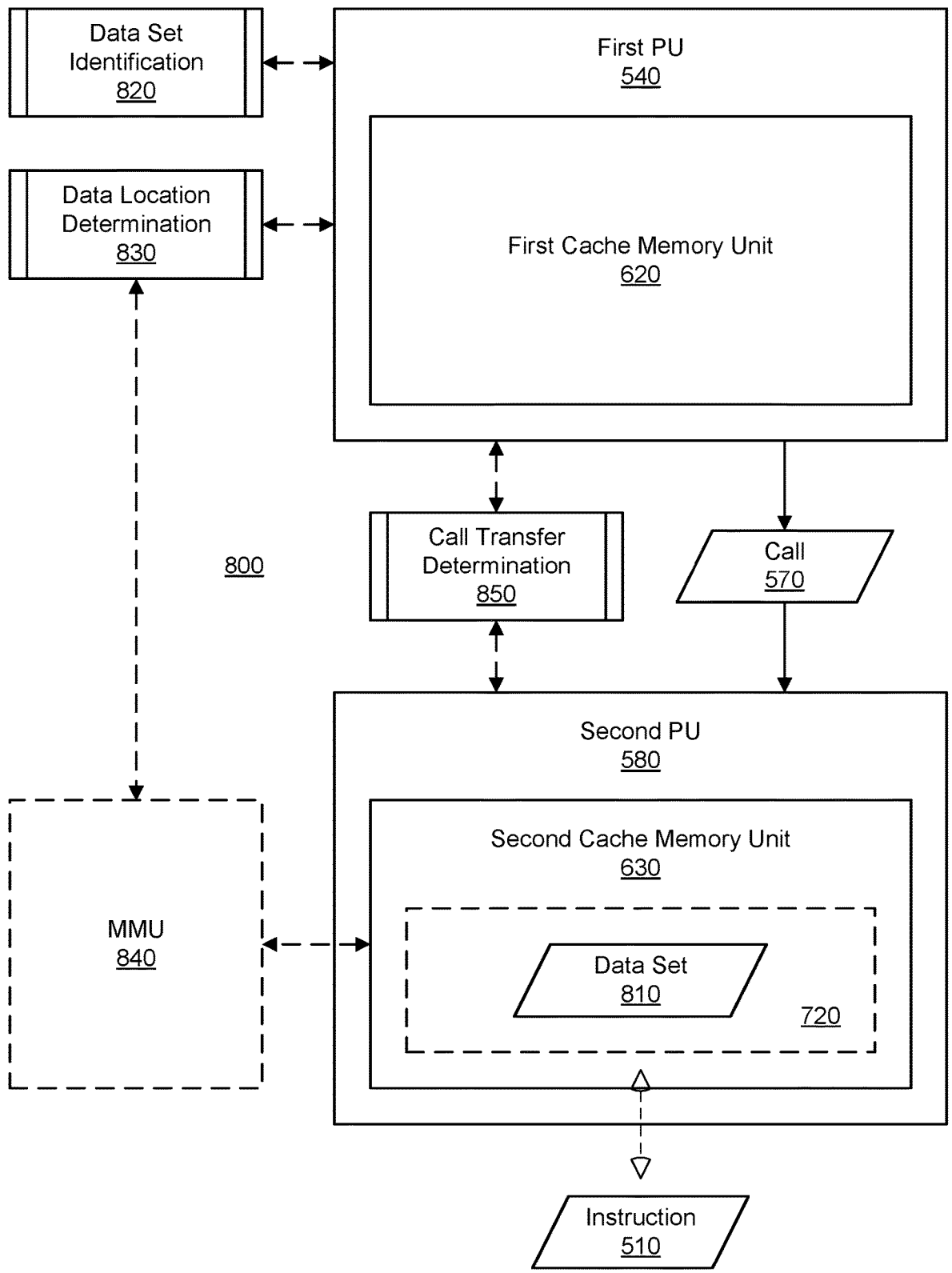
FIG. 8 is a block diagram of a second exemplary call transferring paradigm in accordance with an embodiment.

With reference now to FIG. 8, a second exemplary call transferring paradigm 800 in accordance with an embodiment is shown. In particular, a data set 810 mapped to instruction 510 is identified, as represented by data set identification 820. Additionally, it is determined that data set 810 is currently stored, as represented by data location determination 830, in second cache memory unit 630 (e.g., at second data location 720), rather than in first cache memory unit 620, to thereby decide to transfer call 570 from first PU 540 to second PU 580.

For example, data location determination 830 is performed, whereby it is determined that data set 810 is not located in first cache memory unit 620. Consequently, data location determination 830 subsequently involves determining if one or more of the other available PUs are currently storing data set 810, such as by communicating with an optional memory management unit (MMU) 840, which may be communicatively associated or coupled with one of the implemented PUs (such as first PU 540). As a result of this inquiry, it is determined that data set 810 is currently being stored in second cache memory unit 630. Furthermore, a call transfer determination 850 is performed, whereby it is decided to transfer call 570 from first PU 540 to second PU 580 as a result of (1) data set 810 not being currently stored in first cache memory unit 620 and (2) data set 810 already being currently stored in first cache memory unit 620.

In view of the foregoing, it is noted that, pursuant to an embodiment, whether to transfer calls is determined based on the location (e.g., physical address) of data rather than the specific data type of such data. For example, rather than deciding to transfer calls based on data type, the data type information may be accessed in advance by the memory allocators to make sure that data of the same type is co-located such that a particular PU will have mostly the same type of data stored in its local memory. Additionally, a static analysis of code may be implemented to help generate alternative memory allocators that steer locality of allocation. Moreover, multiple PUs may have copies of the same data so that requests on heavily used data can be more effectively processed. As such, an embodiment provides that the data type is less significant in the call transfer decision than the location of the data, although the data location may represent a proxy for the applicable data type. Indeed, in various exemplary implementations, the runtime system will be able to identify the addresses (as pointers) in the code stream, but will be unable to identify the data type information.

D. Exemplary Transfer Decision Processes

A number of exemplary transfer decision techniques will now be explored. It is noted, however, that the present technology is not limited to these exemplary transfer decision techniques, and that other transfer decision techniques may be implemented.

To begin with, it is noted that a variety of mechanisms may be implemented (in some cases simultaneously) to support wandering threads. These mechanisms may include hardware and software support, the former being transparent to program execution and the latter involving modification of the code before or after loading.

i. Hardware Support

A number of exemplary hardware support techniques will now be explored. It is noted, however, that the present technology is not limited to these exemplary hardware support techniques, and that other hardware support techniques may be implemented.

In accordance with an exemplary implementation, two different levels of hardware support may be provided. The first level involves determining whether code is stored in a redirect sector of memory. If so, then the accessed call is identified as a potential redirect call. If not, then the call is performed by the first PU rather than being transferred to a different PU. However, in the event that the call is identified as a potential redirect call as a result of the first level of hardware support, a second level involves identifying which PU is already storing the relevant data so that the call may be redirected to such PU.

Thus, in one embodiment, hardware support for call transferring techniques may include, for example, identifying calls or operations that could possibly be transferred, implementing a lookup mechanism in order to identify which actual calls or operations to consider for transfer, and providing address to PU identifier translation. In view of the foregoing, a number of exemplary techniques will now be explored a. Shadow Registers In an embodiment, "shadow registers" are used to perform a direct transfer of control and support software (e.g., user level) decision making about the transfer. To illustrate, and in accordance with an exemplary implementation, it is noted that a PU has a data path or "pipeline". Additionally, the PU is communicatively associated or coupled with a MMU (see, e.g., MMU 840 shown in FIG. 8), which is configured to manage access to memory that is requested by the PU. In particular, when the PU receives a call, it requests information about the corresponding memory address from the MMU. As addresses are being filled on the pipeline, the MMU fills extra registers (e.g., shadow registers) in the PU to thereby identify what kind of addresses those are (e.g., local, shared, redirectable). When the PU calls code that is mapped to one of these addresses, the PU can access its shadow registers to help determine whether the call should be transferred or not.

For example, one embodiment provides a processor with a deep data-path and prefetch for code, wherein shadow registers are employed to mark up which pointer registers have an associated PU. Information about call and instruction treatment are held as tags in the instruction/data cache. For example, when instructions or data are fetched into cache from memory, the tags are set for future use. In so much as the DPA has a relatively low cache-miss rate, the expense of the tag evaluation does not impact overall performance, and it can be done in parallel to the memory fetch. Consequently, the tag evaluation may be performed by support code, which is already cached.

Figure 9:
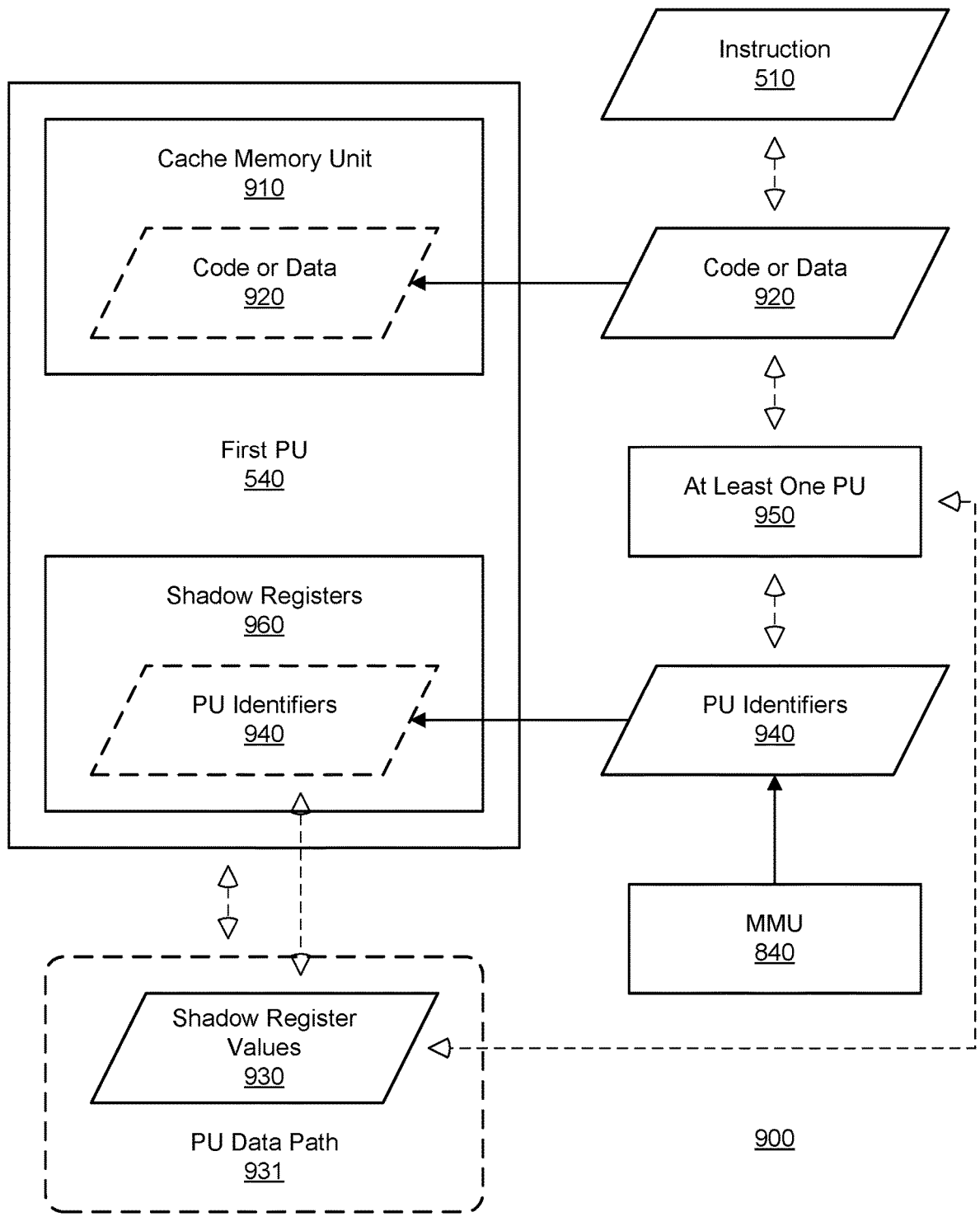
FIG. 9 is a block diagram of an exemplary PU identification paradigm in accordance with an embodiment.

With reference now to FIG. 9, an exemplary PU identification paradigm 900 in accordance with an embodiment is shown. In particular, a cache memory unit 910 associated with (e.g., allocated to or stored within) first PU 540 is selected, and code or data 920 associated with (e.g., mapped to) instruction 510 is fetched into cache memory unit 910. Additionally, a PU data path 931 associated with first PU 540 is identified, and shadow register values 930 in PU data path 931 are defined such that shadow register values 930 reflect PU identifiers 940 that indicate at least one PU 950 associated with code or data 920, such as where at least one PU 950 is already locally storing code or data 920.

Consider the example where first PU 540 includes a number of shadow registers 960 as well as cache memory unit 910, and where PU identifiers 940 are stored in shadow registers 960, such as by MMU 840, which is communicatively associated or coupled with first PU 540. Shadow register values 930 are defined in PU data path 931, wherein shadow register values 930 reflect PU identifiers 940. In so much as PU identifiers (and similarly the defined shadow register values 930) indicate at least one PU 950 that already has local access to code or data 920, the identification of at least one PU 950 may be ascertained simply by accessing shadow register values 930.

Pursuant to an exemplary implementation, it is noted that the "data path" for a processor may be defined, for example, as a pipeline of stages that condition the data for the processor core. Each pipeline stage may have a version of the registers. Although a pipeline will stall upon cache misses, complex processors may run multiple pipelines in parallel so that a stalled pipeline can be skipped. The shadow registers travel along the pipeline with the regular registers; for example, upon filling a register with a pointer address (or random data), the next (or a subsequent) pipeline stage might add a shadow register with the MMU's guess as to which PU this address (or data) belongs to. It is noted that, for many processors, there is no real distinction at the hardware level between the code in memory and the data itself, so code may be viewed as a special type of data. It is further noted that certain processors do indeed make such a distinction; in particular, such processors will write-protect the code and/or block execution of the data in order to prevent "hacking", although this protection may be optional for backward compatibility.

The foregoing notwithstanding, it is noted that a processing core can assess the state of the shadow registers at each stage of its data path and decide whether to transfer control of a thread to another processing core. If no transfer is automatically executed by the hardware, the information in the shadow registers would still be available to the code to support a software methodology, such as described herein.

In one embodiment, per-PU tuning may be achieved by modifying the instruction cache that is working in a read-only mode from memory. Thus, when evaluating the instruction cache redirect tags, the code loaded into the cache (e.g., call address, etc.) may be modified. This mechanism may be implemented to swap a normal version of a routine for a redirect version on a per-PU basis such that modifying code prior to execution may be avoided, and such that there is no significant impact on PU performance where a redirect is not to be implemented.

Furthermore, in an embodiment, multiple PUs may have copies of the same data, and each PU is configured to send out messages regarding how busy it is to the network so that MMU 840, which fills the shadow registers with PU identifiers, can intelligently pick PUs. Moreover, a system monitoring process may be implemented to identify "hot spots" in the DPA from the PU messages about performance and assign additional PUs to particular regions of memory.

b. Redirect Calls

Given a body of compiled code, a routine call can be redirected during linking or loading so as to point at alternative implementations. Once it is determined that this routine call is to be redirected, such call may be referred to, for example, as a "redirect call".

Figure 10A:
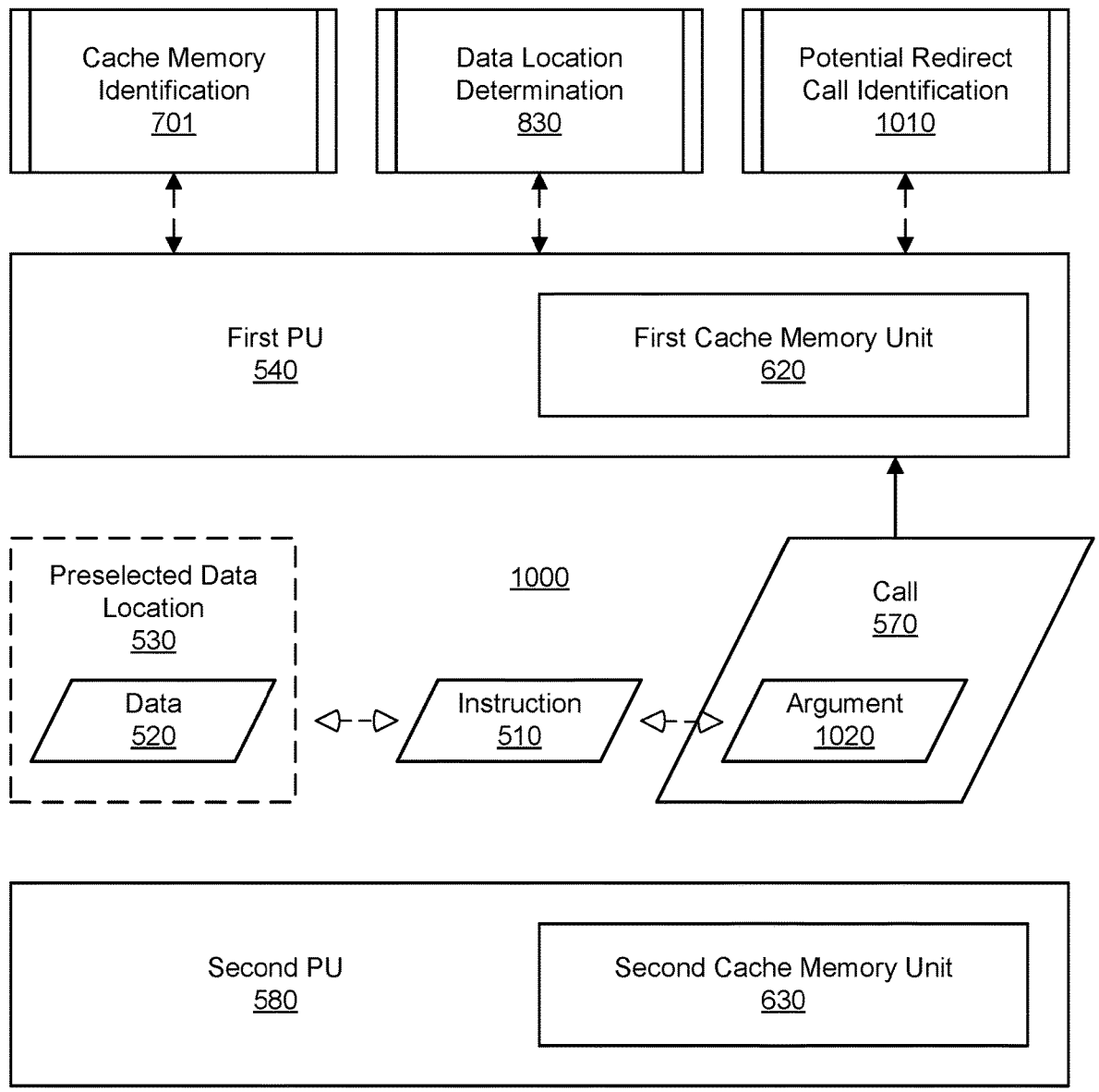
FIG. 10A is a block diagram of an exemplary redirect call identification paradigm in accordance with an embodiment.

With reference now to FIG. 10A, an exemplary redirect call identification paradigm 1000 in accordance with an embodiment is shown. In particular, first and second cache memory units 620, 630, are identified, such as represented by cache memory identification 701, wherein first and second cache memory units 620, 630 are associated with (e.g., allocated to or included within) first and second PUs 540, 580, respectively. Additionally, call 570 is accessed with first PU 540, wherein call 570 includes an argument 1020 indicating that instruction 510 is mapped to preselected data location 530. Moreover, argument 1020 is analyzed with first PU 540 in order to make a determination that preselected data location 530 is not located within first cache memory unit 620, as represented by data location determination 830. Furthermore, call 570 is identified as a potential redirect call, such as represented by potential redirect call identification 1010, based on this determination.

Figure 10B:
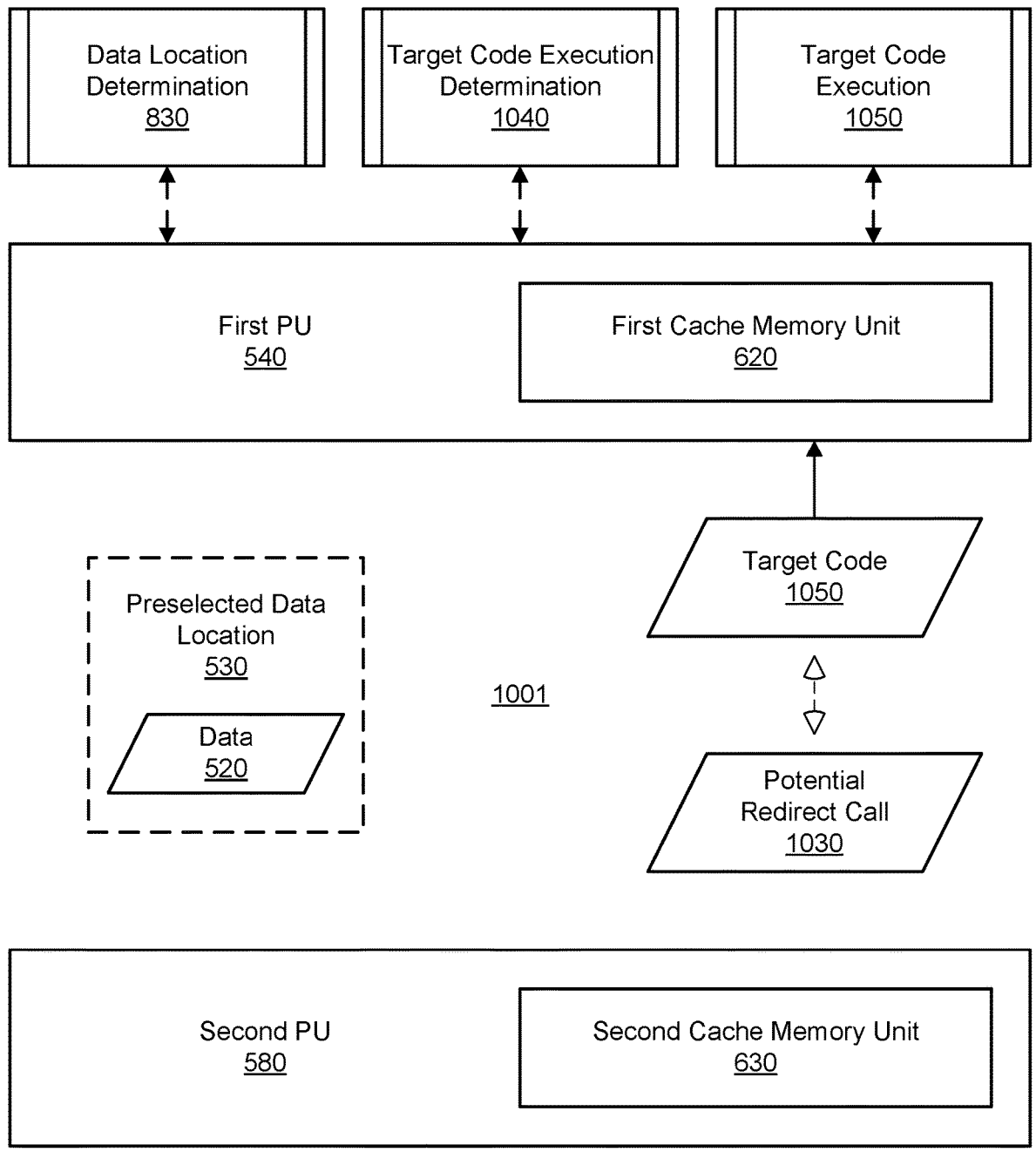
FIG. 10B is a block diagram of an exemplary target code execution paradigm in accordance with an embodiment.

After call 570 is identified as a potential redirect call, it is determined whether this potential redirect call is to be transferred to a different PU. Pursuant to one exemplary implementation, the "target" code is executed locally, in which case the redirect call mechanism is not executed. To illustrate, and with reference now to FIG. 10B, an exemplary target code execution paradigm 1001 in accordance with an embodiment is shown. In particular, call 570 is identified as a potential redirect call, as represented by potential redirect call 1030, and it is determined that preselected data location 530 is not located within second cache memory unit 630, as represented by data location determination 830, to thereby make a decision, such as represented by target code execution determination 1040, to execute target code 1050 associated with (e.g., mapped to) potential redirect call 1030 with first PU 540. Moreover, target code 1050 is executed, as represented by target code execution 1060, with first PU 540 based on this decision.

Figure 10C:
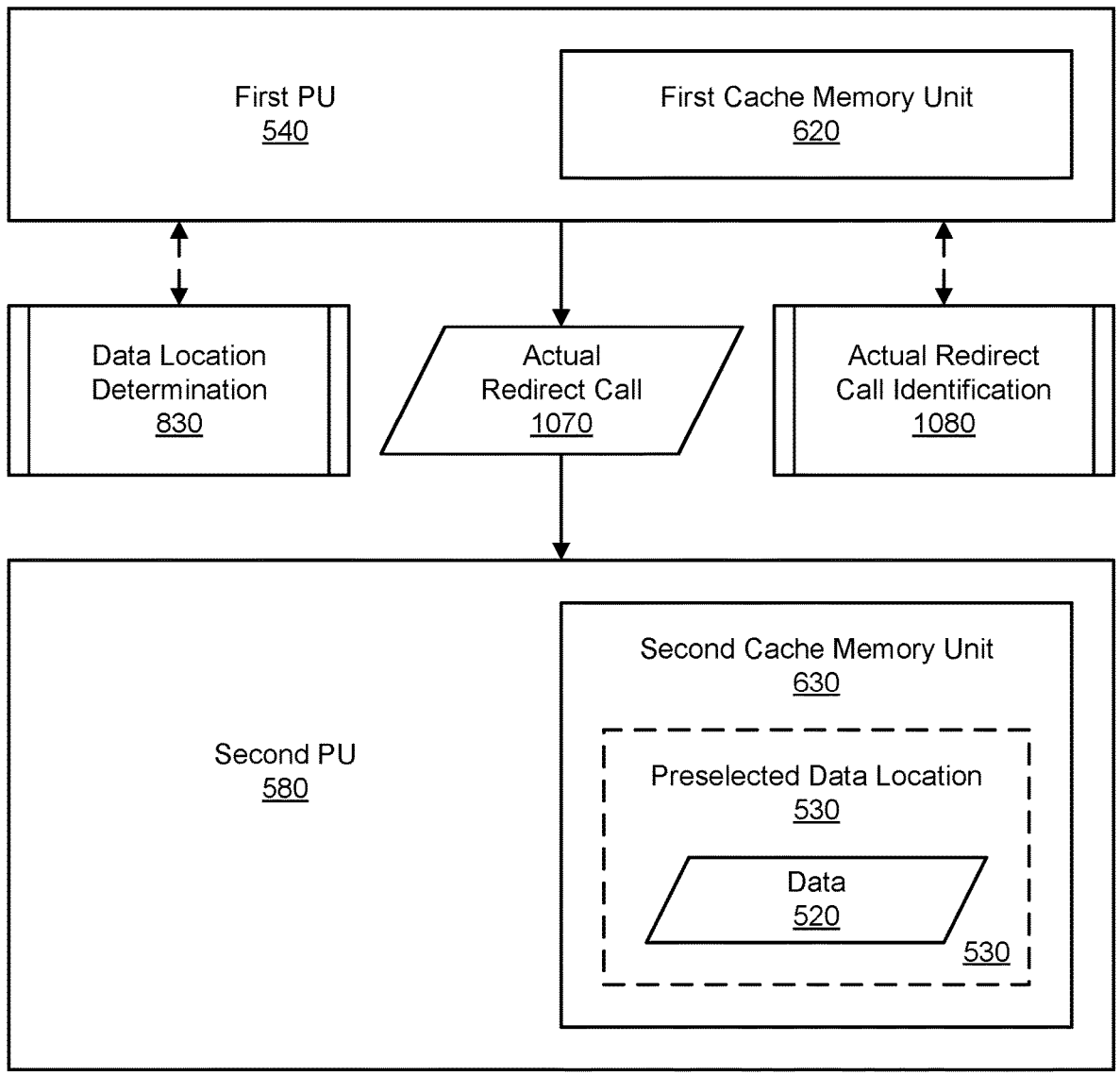
FIG. 10C is a block diagram of a third exemplary call transferring paradigm in accordance with an embodiment.

The foregoing notwithstanding, in the event that preselected data location 530 is located within a cache memory unit allocated to a PU other than first PU 540, one embodiment provides that the call will be transferred to such other PU. For example, and with reference now to FIG. 10C, a third exemplary call transferring paradigm 1002 in accordance with an embodiment is shown. In particular, it is determined, as represented by data location determination 830, that preselected data location 530 is located within second cache memory unit 630 to thereby identify the potential redirect call as an actual redirect call 1070, as represented by actual redirect call identification 1080. Consequently, actual redirect call 1070 is transferred from first PU 540 to second PU 580.

c. Memory Partitioning

Thus, in an embodiment, a PU is configured to determine whether to transfer a call based on whether data related to that call is already stored in the local memory (e.g., DRAM) of another PU. Alternatively, or in addition to the foregoing, one embodiment provides that a PU is able to determine whether to transfer a call by determining whether an instruction is stored in a particular sector of shared memory (e.g., global address range 1000 to 2000).

In particular, it is noted that the code itself may be loaded such that the code is allocated to a specific, predefined area of shared memory. For example, a static analysis of code may be implemented to determine code type, wherein this information may be used to drive memory placement. Moreover, after the code has been loaded into the allocated memory, and when the address of the code is subsequently identified, this address information will indicate a nature (e.g., redirectable or otherwise) associated with the code. Therefore, pursuant to one embodiment, it is determined whether code mapped to a call is stored in a "redirect sector" of memory. For a redirect sector, the beginning and end addresses of the redirect sector may be identified to thereby create a redirect address range, and if an address falls within this range, then the call will be identified as a potential redirect call. If not, then the call is immediately performed locally rather than being further scrutinized for a possible transfer to a different PU.

Figure 11:
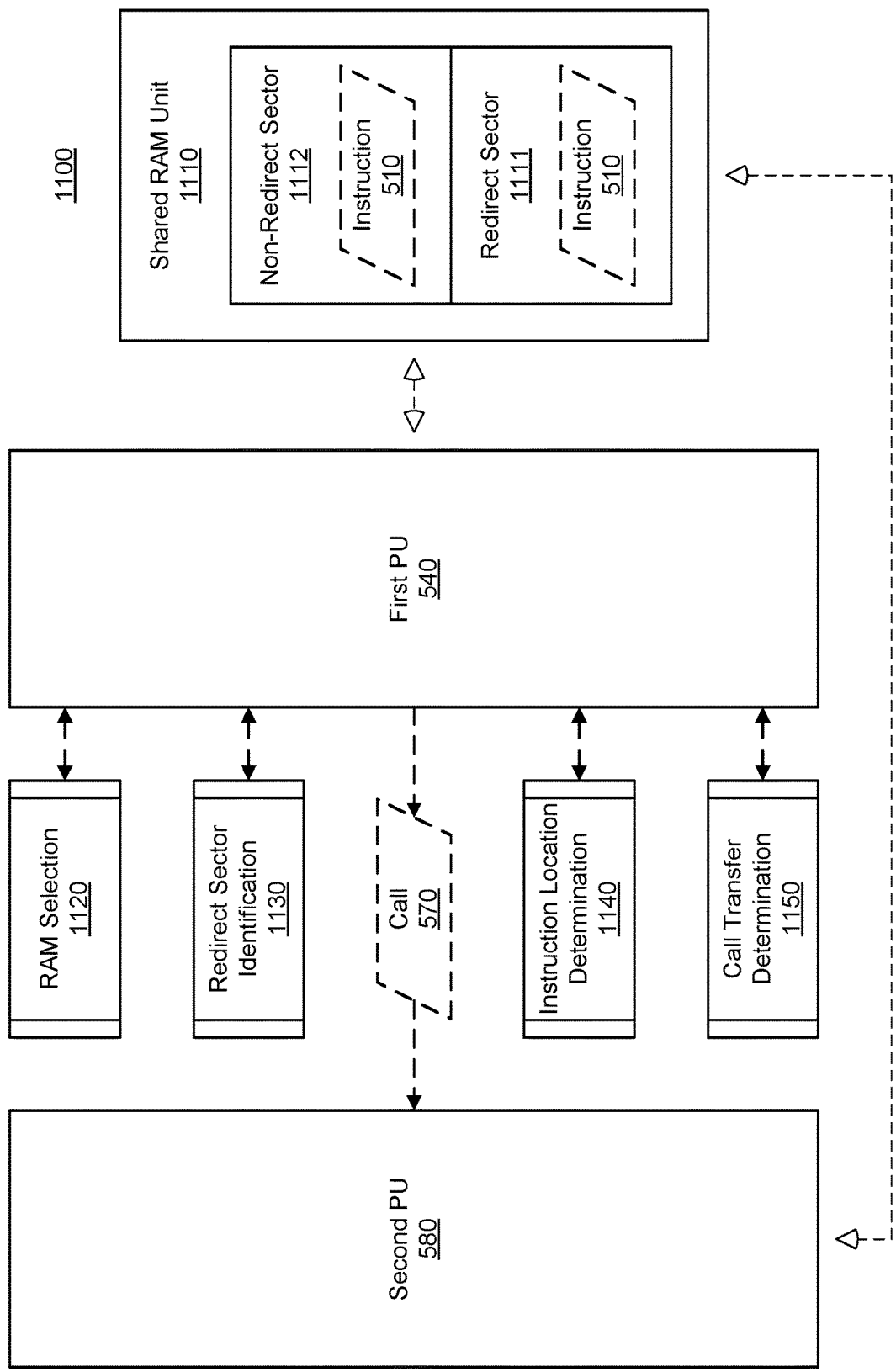
FIG. 11 is a block diagram of an exemplary call transfer determination paradigm in accordance with an embodiment.

To illustrate, and with reference now to FIG. 11, an exemplary call transfer determination paradigm 1100 in accordance with an embodiment is shown. In particular, a shared RAM unit 1110 having instruction 510 stored therein is selected, as represented by RAM selection 1120. Additionally, a sector of shared RAM unit 1110 is identified as a redirect sector 1111, as represented by redirect sector identification 1130, wherein redirect sector 1111 is distinguishable from a non-redirect sector 1112 of shared RAM unit 1110. Moreover, it is determined whether instruction 510 is stored in redirect sector 1111, as represented by instruction location determination 1140, to thereby determine whether to transfer call 570 from first PU 540 to second PU 580, as represented by call transfer determination 1150.

To further illustrate, an exemplary implementation provides that if it is determined that instruction 510 is stored in redirect sector 1111 of shared RAM unit 1110, then call 570 is identified as a potential redirect call, in which case call 570 may be subsequently transferred from first PU 540 to second PU 580. For example, call 570 may be automatically transferred upon determined that instruction 510 is stored in redirect sector 1111, or call 570 may be transferred if it is determined, upon further analysis (such as further discussed herein), that call 570 is an actual redirect call (merely than simply a potential redirect call). In the event that call 570 is ultimately transferred from first PU 540 to second PU 580, then second PU 580 will perform call 570 and access instruction 510 from redirect sector 1111. In this manner, the thread of control associated with the executable routine that includes instruction 510 has been successfully passed to second PU 580, and second PU 580 will execute instruction 510.

Alternatively, if it is determined that instruction 510 is not stored in redirect sector 1111 of shared RAM unit 1110, but rather is stored in non-redirect sector 1112, then call 570 will not be transferred from first PU 540 to second PU 580 (unless a further analysis successfully identifies call 570 as an actual redirect call), in which case first PU 540 will perform call 570 and access instruction 510 from non-redirect sector 1112. In this manner, the thread of control associated with the executable routine that includes instruction 510 has been retained by first PU 540, and first PU 540 will execute instruction 510.

In addition to the foregoing, an embodiment provides that code is loaded into memory at specific locations to support call transfer determination 1150. For example, when a program starts up, it may map shared libraries into memory, but in no specific location. Pursuant to one embodiment, however, static code and shared libraries and subsections thereof are mapped into the RAM sectors in order to support such a redirect sector technique.

Figure 12:
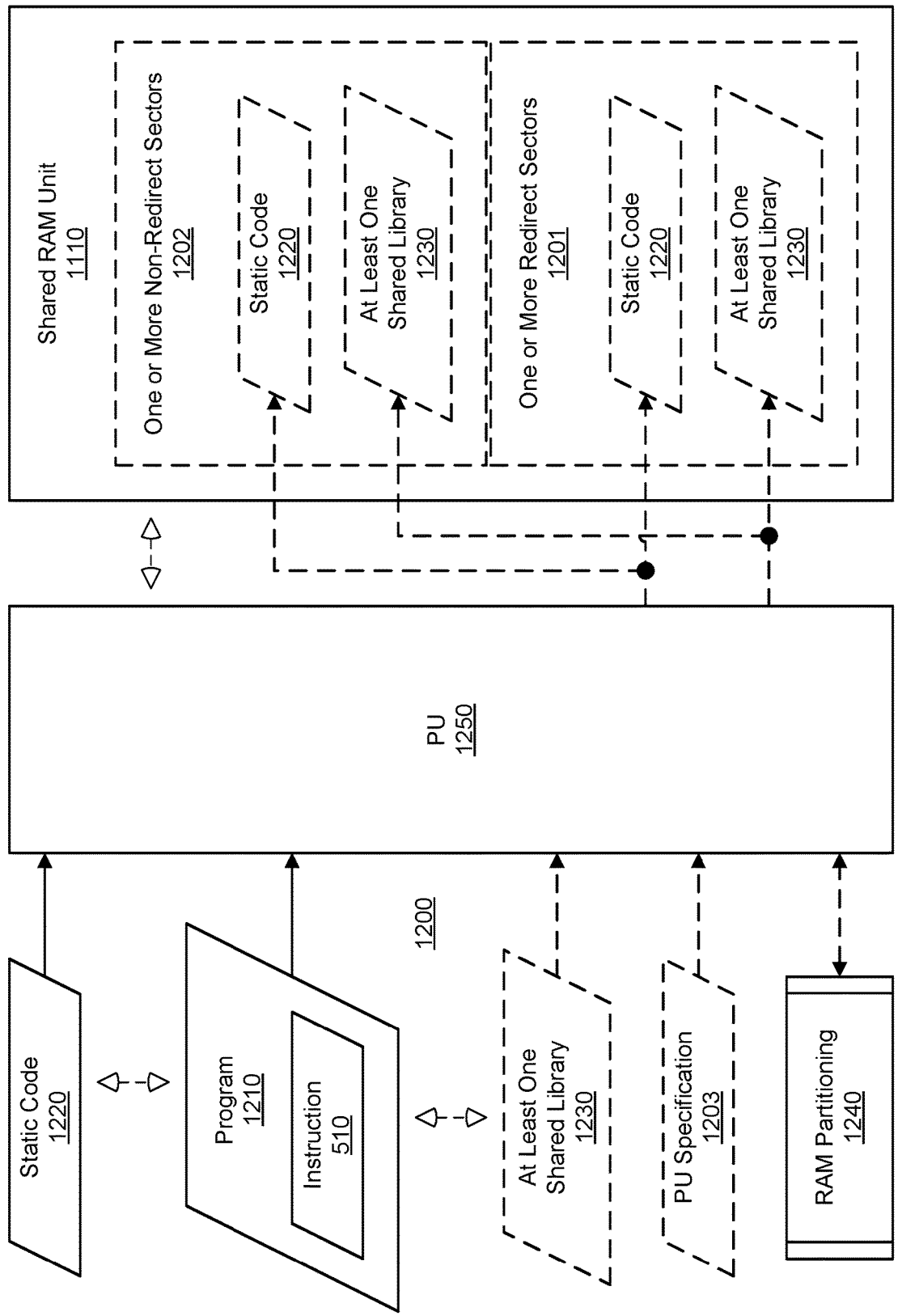
FIG. 12 is a block diagram of an exemplary memory partitioning paradigm in accordance with an embodiment.

To illustrate, and with reference now to FIG. 12, an exemplary memory partitioning paradigm 1200 in accordance with an embodiment is shown. In particular, a shared RAM unit 1110 is selected, and one or more sectors of shared RAM unit 1110 are identified as one or more redirect sectors 1201, respectively. Indeed, it is noted that a shared RAM unit may include multiple redirect sectors, and each of these redirect sectors may be associated with a different behavior. Additionally, a program 1210 including instruction 510 is identified, and static code 1220 corresponding to program 1210 is accessed. Moreover, shared RAM unit 1110 is partitioned, as represented by RAM partitioning 1240, by defining a collective size of one or more redirect sectors 1201 based on a size of static code 1220. Furthermore, static code 1220 (or an amount thereof) is loaded into one or more selected redirect sectors from among one or more redirect sectors 1201 based on the partitioning (and optionally based on a PU specification 1203, such as where PU specification 1203 indicates that a specific PU is not to be provided with all of static code 1220). In this manner, an embodiment provides a relatively efficient technique for allocating shared memory for the call transferring decision process.

It is noted that the foregoing process may be useful in the event that program 1210 is entirely static, as might occur, for example, in an embedded system. The foregoing notwithstanding, an embodiment provides that the foregoing process is adapted for a program that is not entirely static. In particular, and with reference still to FIG. 12, one or more different sectors of shared RAM unit 1110 are identified as one or more non-redirect sectors 1202, respectively, and one or more portions of at least one shared library 1230 corresponding to program 1210 are accessed. Additionally, shared RAM unit 1110 is proportioned, such as during RAM partitioning 1240, by defining the collective size of one or more redirect sectors 1201 based on a collective size of static code 1220 and the one or more portions of at least one shared library 1230. Moreover, one or more portions of static code 1220 are loaded into either (1) one or more selected redirect sectors from among one or more redirect sectors 1201 or (2) one or more selected non-redirect sectors from among one or more non-redirect sectors 1202 based on the proportioning (and optionally based on PU specification 1203); alternatively, or in addition to the foregoing, one or more portions of at least one shared library 1230 are loaded into either (1) one or more selected redirect sectors from among one or more redirect sectors 1201 or (2) one or more selected non-redirect sectors from among one or more non-redirect sectors 1202 based on the proportioning (and optionally based on PU specification 1203).

Pursuant to an exemplary implementation, many processors will utilize relocatable code. Therefore, moving such code around during the loading phase is relatively easy. Furthermore, for purposes of illustration, one embodiment provides that one or more of these operations are performed by a PU 1250, which may be, for example, first PU 540 or, alternatively, a completely different PU.

Figure 13:
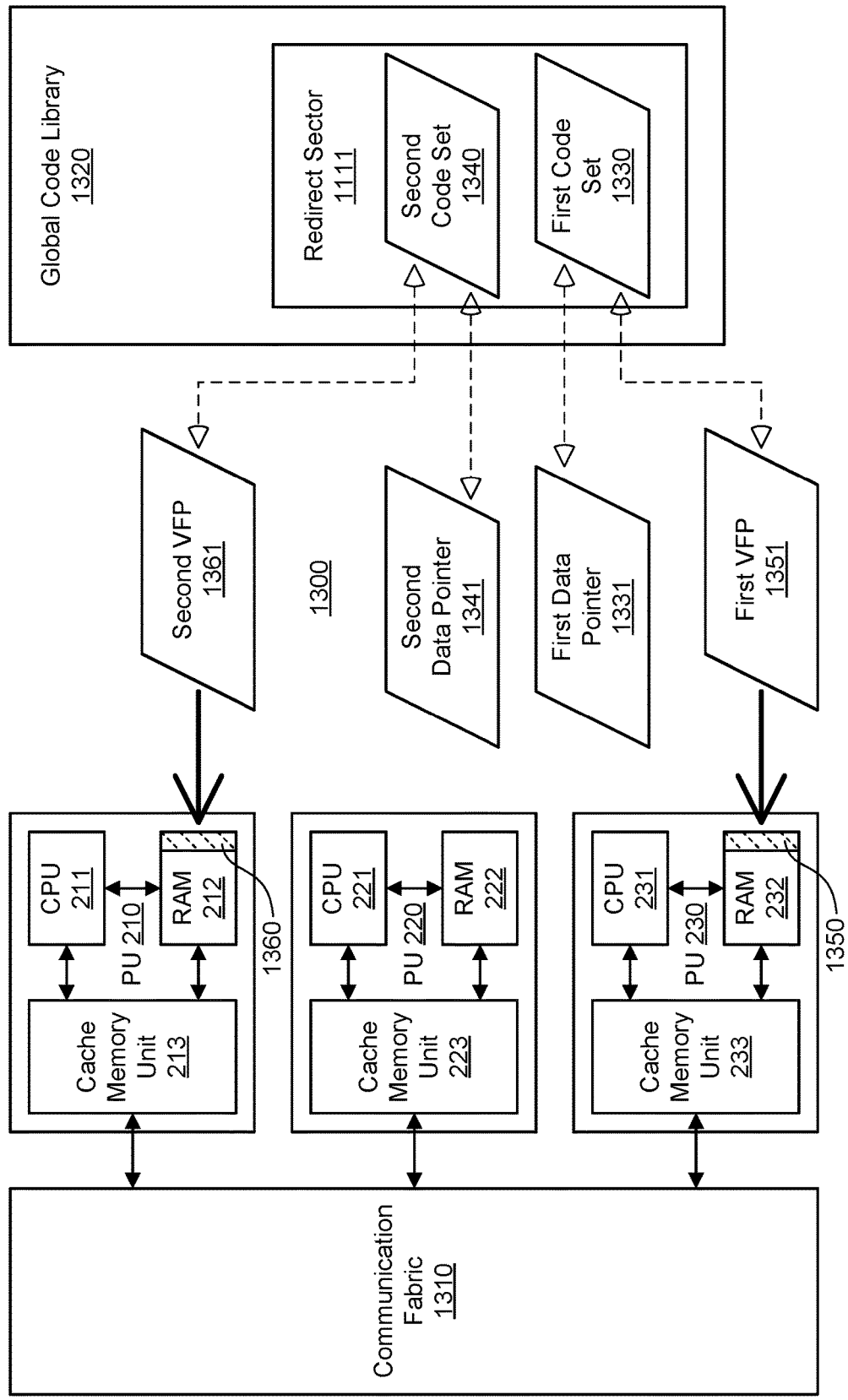
FIG. 13 is a block diagram of an exemplary processing resource allocation system in accordance with an embodiment.

With reference now to FIG. 13, an exemplary processing resource allocation system 1300 in accordance with an embodiment is shown. Exemplary processing resource allocation system 1300, which may be substantially similar to the DPA architecture described above with reference to FIG. 2, includes multiple PUs, such as exemplary PUs 210, 220, 230, wherein these PUs are communicatively coupled or associated with a communication fabric 1310, and wherein these PUs may be collectively arranged in a die-stacked configuration. Communication fabric 1310, which may include, for example, a front side bus and memory subsystem (e.g., by implementing a peripheral component interconnect express (PCI-E) architecture), is configured to route information to and from these PUs.

Each PU includes at least one CPU, such as exemplary CPUs 211, 221 and 231, and at least one RAM unit (e.g., a DRAM memory unit), such as exemplary RAM 212, 222 and 232, wherein the CPUs and RAM units within each PU are communicatively associated or coupled with one another. Additionally, each RAM unit is mapped globally, such that other PUs can obtain information stored in an external unit of RAM. This enables any particular processor from among a plurality of processors within this system to request data from any memory unit from among a plurality of implemented memory units where such data might be stored.

Moreover, each PU includes a cache memory unit, such as exemplary cache memory units 213, 223 and 233, wherein such cache memory unit is communicatively associated or coupled with both the CPU and RAM unit located within its respective PU. Indeed, in one embodiment, the CPU, RAM unit and cache memory unit within a particular PU are configured to communicate with one another through, for example, a through-silicon-via (TSV)/wide-input/output (Wide-IO) (or on-chip) communication architecture.

With reference still to FIG. 13, a global code library 1320 is provided, wherein global code library 1320 includes a redirect sector 1111. In an embodiment, redirect sector 1111 includes one or more distinct code sets, such as first and second code sets 1330, 1340. Moreover, different PUs are allocated to objects of different data types, respectively. For example, in the illustrated embodiment, PU 230 is allocated to objects belonging to a first data type, and PU 210 is allocated to objects belonging to a second data type, because PUs 230, 210 are already locally storing objects belonging to these first and second data types, respectively. Consequently, if first and second code sets 1330, 1340 include objects belonging to such first and second data types, respectively, then first and second code sets 1330, 1340 will be routed to PUs 230, 210, respectively. In this manner, PU 210 is able to perform the methods associated with the objects having the second data type while PU 230 is able to perform the methods associated with the objects having the first data type, thereby increasing the degree of efficiency associated with the performance of these methods since, during the performance of these methods, these PUs will already have the relevant code and data for their respective operations stored locally.

With reference still to FIG. 13, consider the example where first and second code sets 1330, 1340 are associated with first and second data types, respectively. First and second data pointers 1331, 1341 are linked to first and second code sets 1330, 1340, respectively, and indicate that first and second code sets 1330, 1340 are associated with the aforementioned first and second data types, respectively. Additionally, if code or functions associated with the first data type are stored in, for example, a portion 1350 of RAM 232, then a first virtual function pointer (VFP) 1351 is generated, wherein first VFP 1351 points at, or is mapped to, this portion 1350 of RAM 232. Similarly, if code or functions associated with the second data type are stored in, for example, a portion 1360 of RAM 212, then a second VFP 1361 is generated, wherein second VFP 1361 points at, or is mapped to, this portion 1360 of RAM 212. Thus, when a call is identified as a potential redirect call because redirect sector 1111 has been accessed, these VFPs are analyzed to determine if data associated with the relevant code set in redirect sector 1111 is already locally stored by one of the available PUs; if this is the case, then the potential redirect call will be identified as an actual redirect call, and the redirect call will be transferred (or passed) to that specific PU.

Figure 14:
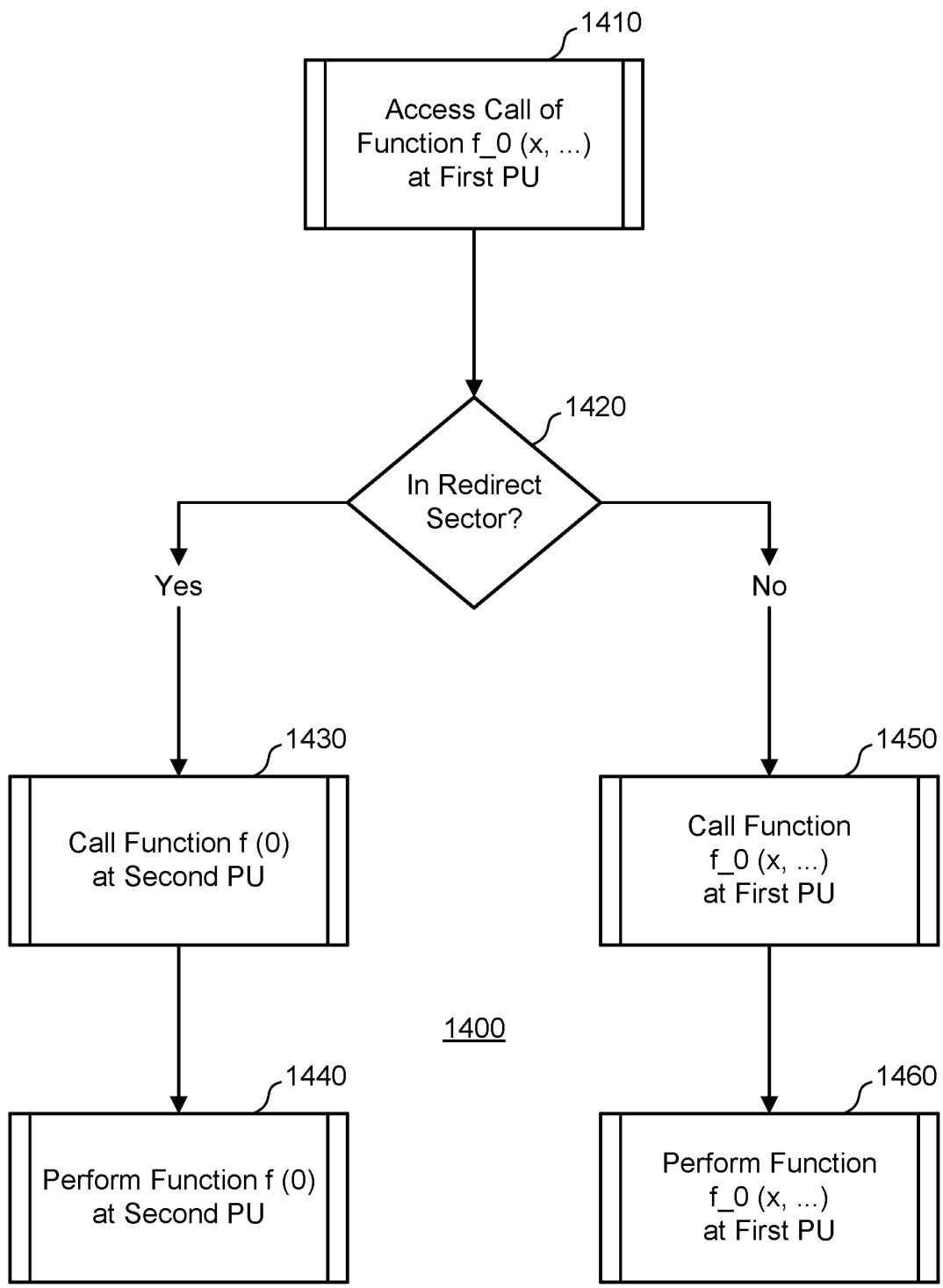
FIG. 14 is a flowchart of an exemplary redirect analysis in accordance with an embodiment.

To further illustrate, and with reference now to FIG. 14, an exemplary redirect analysis 1400 in accordance with an embodiment is shown. In particular, a call of function $f_0(x, \ldots)$ is accessed at 1410 by a first PU, wherein "$f_0$" is a function pointer, and wherein "x" is a data pointer (it being noted that more than one data pointer may be referenced, as indicated by the symbols ", . . . "). At 1420, it is determined whether a redirectable version (e.g., a wandering thread version) of function $f_o(x, \ldots)$, which may be referred to as function f(0), is currently stored in a redirect sector of global memory. If it is, then function f(0) is called by a second PU at 1430, since this second PU already has code and/or data pertaining to this function stored locally. Subsequently, at 1440, the second PU will perform function f(0). Alternatively, if it is determined at 1420 that function f(0) is not currently stored in a redirect sector of global memory, then the function will not be redirected, and $f_o(x, \ldots)$, which may be stored in a non-redirect section of global memory, will be called at 1450 by the first PU and subsequently performed at 1460 by the first PU.

ii. Software Support

In view of the foregoing, an embodiment provides that a PU is communicatively associated or coupled with (or includes) a MMU. The MMU tracks which PU has the memory as well as where the data is. A PU asks its MMU where specific data is mapped to memory in order to determine whether the data is mapped to its own local memory or the local memory of another processor. Thus, once a call is identified as a potential redirect call, it is determined whether the data is currently stored in a redirectable location, at which time the potential redirect call will be identified as an actual redirect call, and the call will be transferred. Although this may be done at the hardware level, software may be implemented to support this technique. In particular, software support may be added to help the PUs make more complicated decisions, such as by, for example, injecting support code into or near the runtime code. Indeed, although the processing speeds of the PUs are relatively fast, moving information in and out of them may be relatively slow. Therefore, making a smart decision can save a significant amount of time and energy. As such, various embodiments involve software modification before or after loading in order to support the transparent transfer of control between PUs.

Consequently, a number of exemplary software support techniques will now be explored. It is noted, however, that the present technology is not limited to these exemplary software support techniques, and that other software support techniques may be implemented.

a. Redirect Code

In the case of a wandering thread, a routine may be redirected to code that will inspect the arguments of the intended call to determine if the call is to be executed locally or on a different processor (such as by invoking an RPC, as will be further explored herein). For example, an exemplary C language call is "fprintf":

int fprintf (FILE*stream, const char*format, . . . );

The redirect code will note that it is redirecting the call "fprintf" and will inspect the pointer stream to see if it is pointing at local memory. If it is not, and a PU for that memory can be identified, the redirect code will execute a transfer to that PU and wait for its completion, thereby causing a local suspension of the thread. If the redirect code determines that the pointer is local or cannot identify the holding PU, then it performs the actual "fprintf" call locally. The advantage to this is that only the PU processing the "printf" would actually dereference the stream pointer and its associated buffers. The redirect code can be tuned to forward relevant context utilized by the particular call so that the PU doing the processing does not reach back to the originating PU's cache/memory; indeed, in one embodiment, software modifiable instruction cache is implemented for per-PU tuning of code after loading. The same redirect code can be used for multiple target routines that share an argument profile if the target function is given as an argument (e.g., the first argument is a pointer and is transferring to the PU for that memory). For purposes of illustration, if the "fprintf" redirect code was implemented in a C programming language, it might look similar the following:

```
int redirect_fn_p_var (int (*fn)( ), void * p1, ...) {
    int pu;
    if (local_address (p1) || !(pu = pu_for_address (p1) )) {
        return asm_redirect_var (fn, p1); // (Comment 1: Perform call)
    }
    return wt_transfer_wait_var (pu, fn, p1); // (Comment 2: Transfer
    and wait)
}
```

Figure 15:
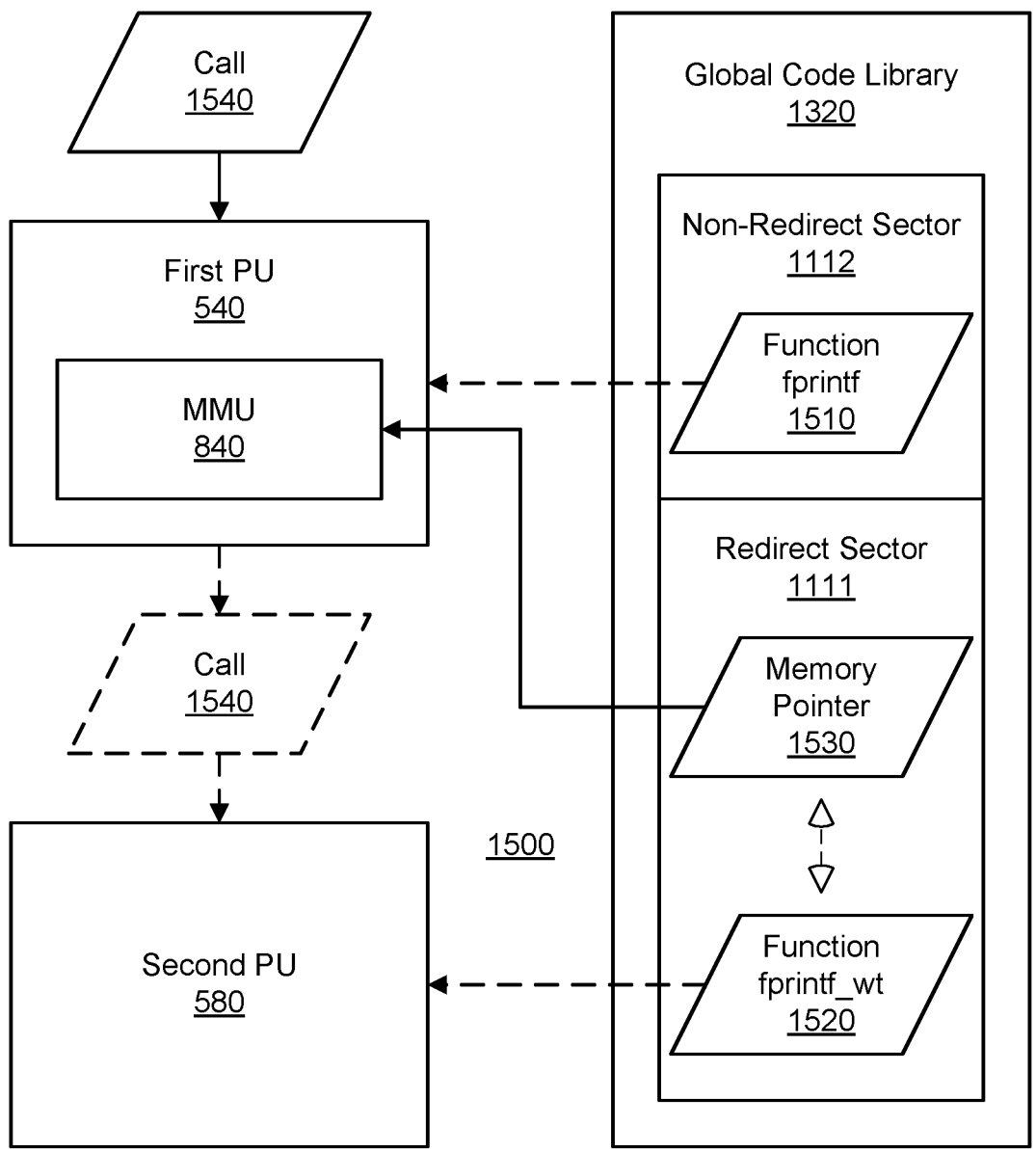
FIG. 15 is a block diagram of an exemplary global code library paradigm in accordance with an embodiment.

To further illustrate, and with reference now to FIG. 15, an exemplary global code library paradigm 1500 in accordance with an embodiment is shown. In particular, a global code library 1320 includes a redirect sector 1111 and a non-redirect sector 1112, wherein a function fprintf 1510 is stored in non-redirect sector 1112, and wherein a wandering thread version of this function (represented as function fprintf 1520) is stored in redirect sector 1111. It is noted that a memory pointer 1530 is linked to function fprintf$_{wt}$ 1520, wherein memory pointer 1530 identifies the address where data pertaining to this function is currently stored. Thus, when first PU 540 receives a call 1540 of function fprintf 1510, it is determined that a wandering thread version of this function is currently stored in redirect sector 1111. Consequently, first PU 540 identifies this function as a relocatable call, and a MMU 840 associated with first PU 540 analyzes memory pointer 1530 (which is associated with a particular input/output (I/O) buffer controlled by one of the PUs) to determine if the identified address is located within the local memory of first PU 540. If so, then first PU 540 will call function fprintf 1510 and perform this function by accessing the locally stored data. If not, then MMU 840 determines where this address is located (and identifies the PU associated with this location). Pursuant to one exemplary implementation, code pertaining to such an analysis might resemble the following:

```
fprintf (file * p, ...) {
    if (my_memory (p)) {
        fprintf (p, ...)
    }
    else {
        PU2 = find_PU (p);
        transfer_context (PU2)
    }
};
``` where "p" is the memory pointer that is scrutinized.

With reference still to FIG. 15, once this other PU is identified, then first PU will transfer call 1540 to this other PU (which is represented in FIG. 15 as second PU 580). In response to accessing call 1540, this other PU will then access the wandering thread version of this function (represented as function fprintf$_{wt}$ 1520).

In the case of languages, such as C++, that are capable of performing per-class allocation operations and virtual functions, the redirect code can be added to the class methods and picked over a plain method at linking/loading if the code is being executed on a machine that supports wandering threads. In one embodiment, the class constructor will place the instances of the class on a particular PU to get the best performance for that class. Java and SystemVerilog are languages similar to C++, with the exception that they use "garbage collection" for memory management (e.g., there is background scanning for unreferenced data such that memory can be reallocated). It is noted that the methods described herein do not preclude using garbage collection; rather, the methods described herein may improve its performance by limiting the scope of the searches.

In accordance with an exemplary implementation, the above methods are configured to leave the user code unmodified. Moreover, finer grain control may be gained by using wandering thread support routines directly in user source code, or by analyzing and regenerating the compiled code with redirect operations in-lined, wherein this latter approach may be implemented, for example, with lower level virtual machine style code. The foregoing notwithstanding, in one embodiment, "byte-code" (rather than machine specific code) is implemented that will be interpreted by the runtime system. For example, if old x86 code is loaded, the extra injected code might not be x86 compatible, but will nevertheless be understood by the runtime system.

b. Processing Capability

It is noted that various embodiments involve the implementation of processor unit performance monitoring in order to drive processor unit replication and selection. Indeed, in one embodiment, a redirect call is transferred to a particular PU based on a current processing capability of that PU, wherein the applicable processing capability analysis may be conducted, for example, by the implemented (e.g., injected) support code. For example, once a call is identified as a potential redirect call, in the event that more than one PU is available to process this call, such as may occur if more than one PU is currently storing the relevant data locally, then the current processing capabilities of these various PUs may be analyzed in order to make an informed decision regarding which PU could process the subject routine the most efficiently. As a second example, a routine may have a number of different arguments each of which may be associated with a different PU (along with the target code itself), in which case the injected code will decide which factor is the most important.

Figure 16:
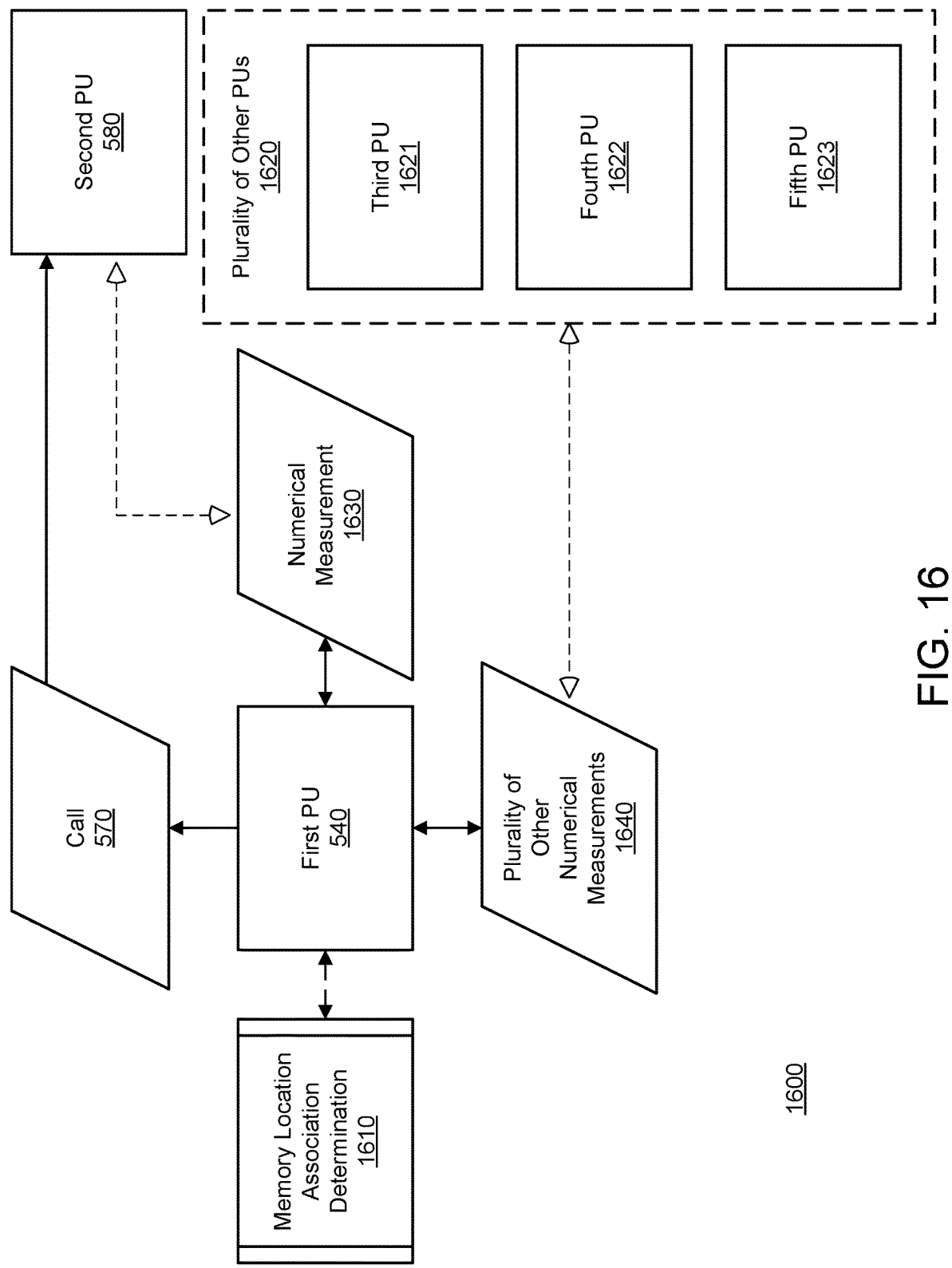
FIG. 16 is a block diagram of a fourth exemplary call transferring paradigm in accordance with an embodiment.

To further illustrate, and with reference now to FIG. 16, a fourth exemplary call transferring paradigm 1600 in accordance with an embodiment is shown. In particular, it is determined, as represented by memory location association determination 1610, that a code or data memory location 610 associated with instruction 510 (see, e.g., FIG. 6) is associated with (e.g., located within) second PU 580 as well as with a plurality of other PUs 1620. For purposes of illustration, plurality of other PUs 1620 includes third, fourth and fifth PUs 1621, 1622, 1623 in FIG. 16. Additionally, a numerical measurement 1630 reflecting a currently available processing capability corresponding to second PU 580 is defined. To illustrate, the currently available processing capability of second PU 580 may be measured, for example, by determining the number of calculations or processing cycles that second PU 580 can perform within a particular time period under current conditions, and numerical measurement 1630 will provide a numerical reflection of this figure.

Moreover, a plurality of other numerical measurements 1640 are defined, wherein plurality of other numerical measurements 1640 reflect a plurality of other currently available processing capabilities, respectively, and wherein the plurality of other currently available processing capabilities correspond to plurality of other PUs 1620, respectively. To illustrate, the currently available processing capabilities of third, fourth and fifth PUs 1621, 1622, 1623 may be measured, for example, by determining the number of calculations or processing cycles that each of these PUs is able to perform within the aforementioned time period under current conditions, and plurality of other numerical measurements 1640 will provide numerical reflections of these figures, respectively. In the event that numerical measurement 1630 is greater than each of plurality of other numerical measurements 1640, thereby indicating that second PU 580 may be able to process instruction 510 faster than the other available PUs, call 570 will be transferred from first PU 540 to second PU 580.

c. Resource Access

The foregoing notwithstanding, in an embodiment, a redirect call is transferred to a particular PU based on that PU having access to a particular resource (e.g. an Ethernet or a serial advanced technology attachment (SATA) interface). In particular, a redirect is initiated in order to achieve adjacency and access to such a resource. For example, once a call is identified as a redirect call, in the event that more than one PU is available to process this call, such as may occur if more than one PU is currently storing the relevant data locally, then a particular resource that may aid in the efficient processing of the subject routine is identified, and one of the available PUs is selected based on such PU having access to this identified resource. This may be useful, for example, where a particular PU has sole control of a piece of hardware so as to avoid concurrency issues.

Figure 17:
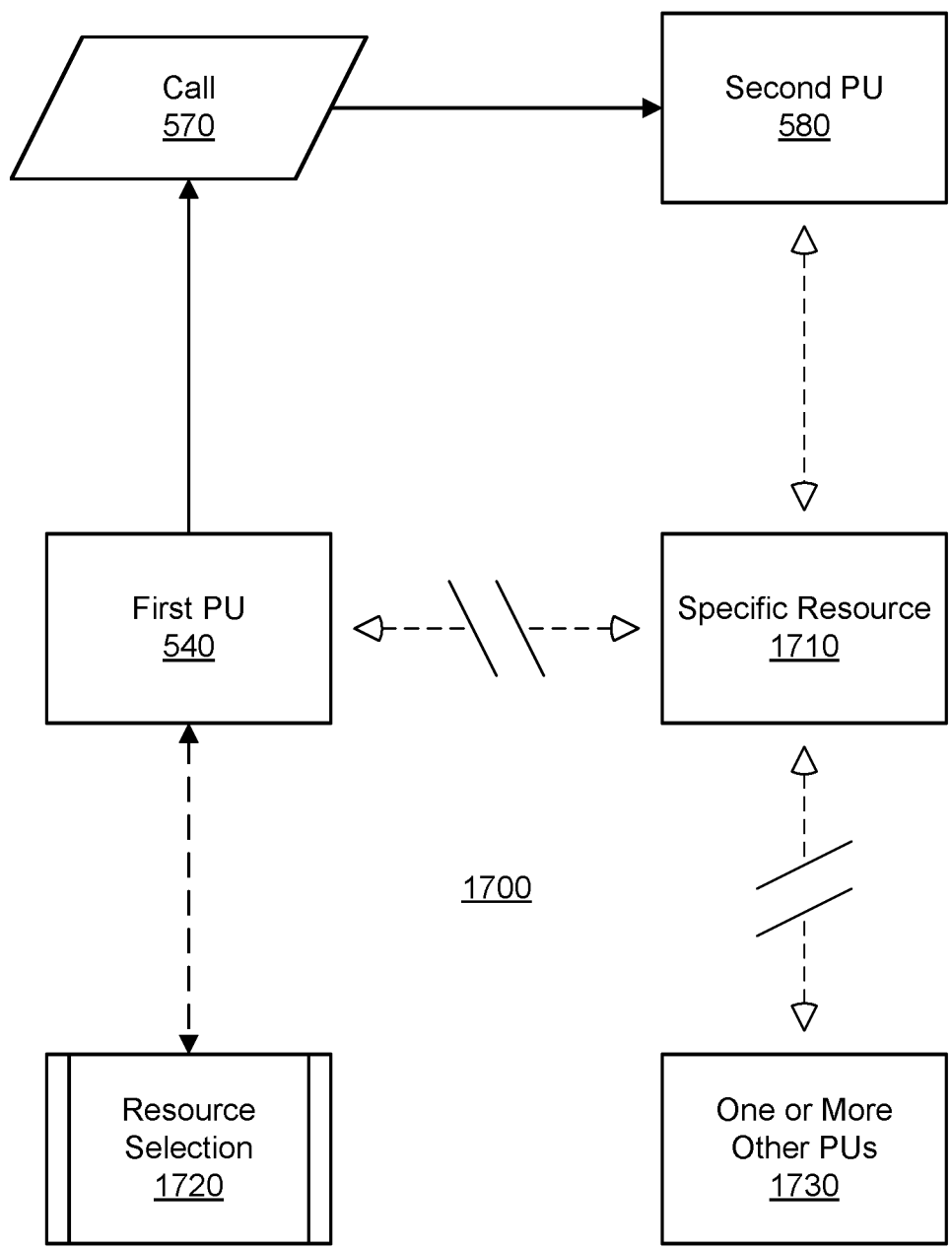
FIG. 17 is a block diagram of a fifth exemplary call transferring paradigm in accordance with an embodiment.

To illustrate, and with reference now to FIG. 17, a fifth exemplary call transferring paradigm 1700 in accordance with an embodiment is shown. In particular, a specific resource 1710 is selected, such as represented by resource selection 1720, and call 570 is transferred from first PU 540 to second PU 580 based on (1) a degree of control of specific resource 1710 being assigned to second PU 580, (2) first PU 540 lacking access to specific resource 1710 and/or (3) one or more other PUs 1730 lacking access to specific resource 1710. Thus, although a PU from among one or more other PUs 1730 may be locally storing the data pertaining to the subject routine, this PU will not be selected for the call redirect, because such PU would not be able to utilize specific resource 1710 during the processing of the redirect call. In a language such as C++, this technique could be achieved, for example, by allocating the stream descriptors (or their meta-data) in the memory of the appropriate PU. For example, PU 580 may be built into, for example, a SATA controller or a hard-drive itself, and it may be configured to manage data transfer to a directly attached disk, while the call in question is initiated by PU 540 while referencing data on other PUs. The RPC code executed on PU 540 may send requests to other PUs that data be sent to PU 580 in order to accelerate the fulfilling of the call.

d. Shared-Memory Coherence Machine Instructions

It is noted that, in accordance with an exemplary implementation, particular machine instructions are used in multi-threaded, SMP machines, and various executable routines are built upon these instructions. In particular, these executable routines include those that use identifiable shared-memory coherence machine instructions; specific examples include those routines that utilize test-and-set (e.g., mutex) code and semaphores. In the case of portable operating system interface (POSIX) threads (or "Pthreads"), an embodiment provides that Pthread routine implementation implies the use of lower level machine mechanisms to handle cross-thread communication. Therefore, pursuant to one embodiment, recognizing shared-memory coherence machine instructions will help to determine which routines may be moved to the same processor such that this same processor is able to efficiently execute these specific machine instructions. It is noted that such instructions may be identified, for example, during loading and then directed such that those including or mapped to executable routines are placed in an appropriate redirect sector. Different redirect sectors may be used to indicate different call types. The Pthreads mutex call has the address of interest as the first argument, and, for other routines, perhaps the second or third argument is the address of the data that is the most pertinent for RPC decisions. The sector choice may direct how shadow registers are filled to reflect the call type and how an implemented hardware RPC mechanism is to be used.

Figure 18:
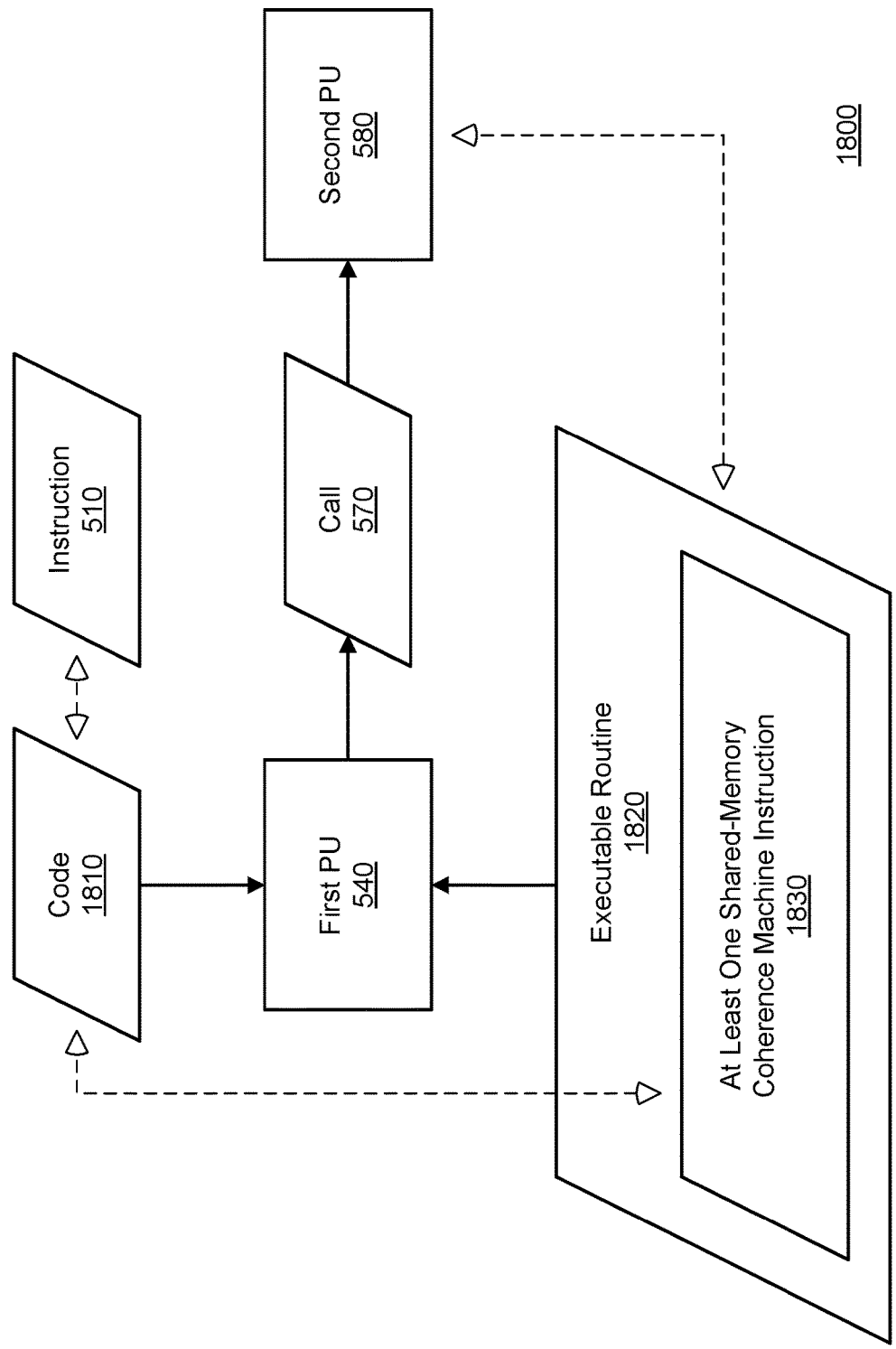
FIG. 18 is a block diagram of a sixth exemplary call transferring paradigm in accordance with an embodiment.

To illustrate, and with reference now to FIG. 18, a sixth exemplary call transferring paradigm 1800 in accordance with an embodiment is shown. In particular, code 1810 associated with instruction 510 is identified, such as where code 1810 is mapped to or includes instruction 510, and where this code 1810 is accessed by first PU 540. Additionally, an executable routine 1820 including at least one shared-memory coherence machine instruction 1830 is identified. Moreover, call 570 is transferred from first PU 540 to second PU 580 based on executable routine 1820 being associated with second PU 580 and based on code 1810 being mapped to at least one shared-memory coherence machine instruction 1830.

To further illustrate, consider the example where predefined library code (such as, for example, Pthreads, which imply the use of coherency instructions) is absent. It is noted that code that utilizes, for example, test-and-set instructions can be identified and marked in a manner that is similar to the Pthread calls. Moreover, in so much as test-and-set operations may be much simpler if they do not span across multiple PUs, an embodiment provides that serializing the processing of such calls on a single PU enables the implementation of hardware coherency support to be avoided. The foregoing notwithstanding, other methodologies may also be implemented.

e. Code Injection

Figure 19:
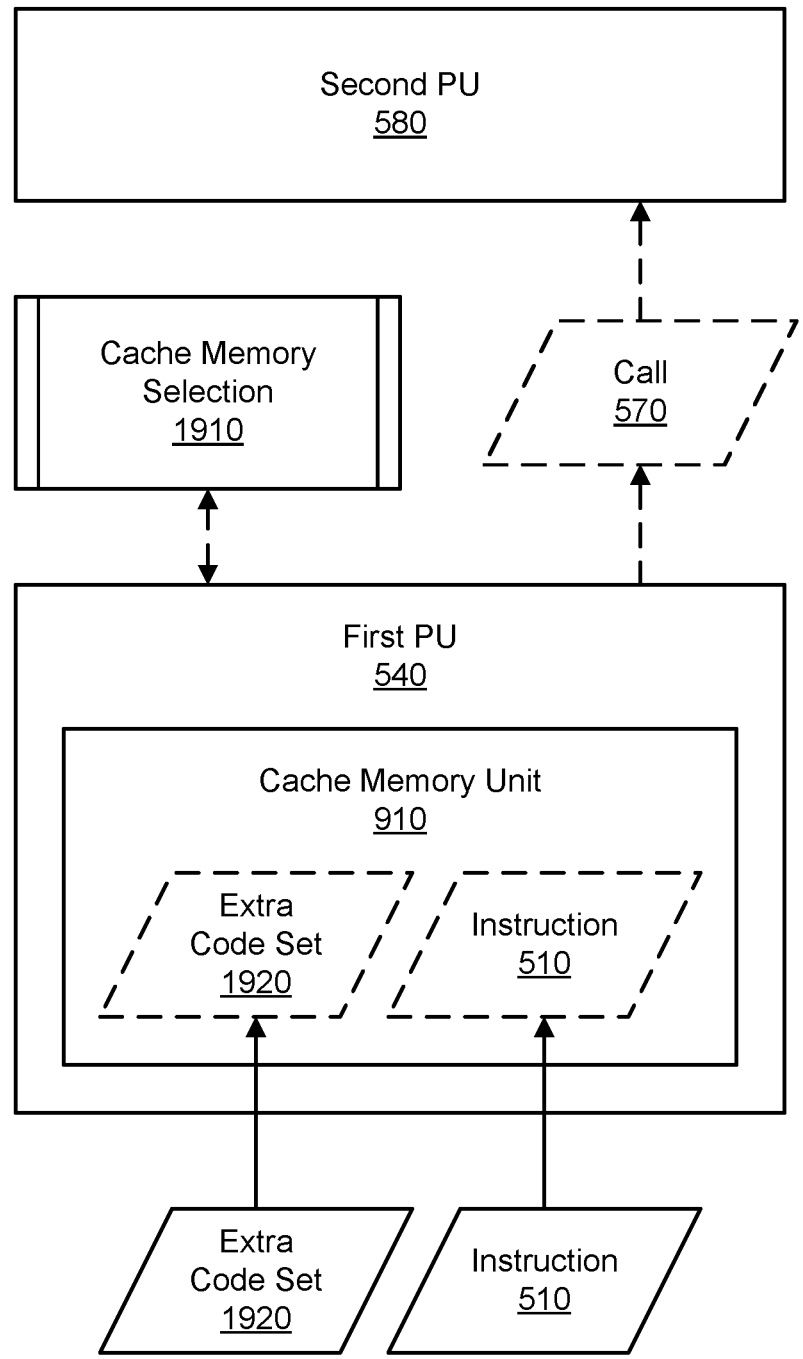
FIG. 19 is a block diagram of an exemplary code injection paradigm in accordance with an embodiment.

As previously indicated, one embodiment provides that a code injection technique may play an important role in determining whether to transfer a call. For example, and with reference now to FIG. 19, an exemplary code injection paradigm 1900 in accordance with an embodiment is shown. In particular, a cache memory unit 910 associated with (e.g., allocated to or included within) first PU 540 is selected, as represented by cache memory selection 1910, and instruction 510 is loaded into cache memory unit 910. Additionally, an extra code set 1920 is injected into cache memory unit 910 at a boundary (e.g., an adjacent set or proximate address sequence of memory locations) associated with instruction 510, wherein instruction 510 is a target instruction. It is noted that the identification of this boundary may be performed, for example, during cache memory selection 1910. It is further noted that extra code set 1920 is configured to enable first PU 540 to determine whether to transfer call 570 to a specific PU, such as second PU 580. In this manner, additional software may be implemented to help support the hardware with its redirect decision-making processes, thereby enabling more complicated analyses to be carried out (such as in a manner discussed herein). An exemplary method for injecting code in systems that use dynamic shared libraries is to load alternative shared libraries before those that would be used by default and that contain the appropriate entry points. This can be done on Linux systems, for example, by the use of environment variables such as "LD_PRELOAD"; the runtime system then uses the preloaded routines by preference, and they in turn can call the original targets or other code. The Linux command "strace" uses such a mechanism, it being noted that Linux is an "open source" operating system.

Thus, an embodiment provides that, during the code loading phase, extra code is injected at executable routine boundaries to make decisions about whether to move the call to another PU or keep it local. It is noted that various processor architectures could be augmented to provide information to the injected code to help with this decision-making process. It is further noted that the software injection technique could be used stand-alone on existing SMP machines with existing (e.g., precompiled) software, although this approach may work best for software that handles relatively large amounts of static data in a random manner, such as in, for example, circuit simulation, database, and artificial intelligence (AI) applications.

f. Pointer Translation

In accordance with an exemplary implementation, a particular type of routine call uses, for efficiency purposes, pointers as arguments rather than copying data, and these pointers may be converted to pass-by-value calls. For example, consider the operating system call "stat", as described in its "man" page:

int stat (const char*path, struct stat*buf);

The data being transferred in this call is the location "path" for a file and the location to which to return information about it. A RPC may be invoked for this, because the PU executing the code does not manage files. Such a call can be remapped to a copy-in/copy-out call, whereby the data is passed by value rather than by reference, such as, for example:

struct stat_i rpc_stat (const char path[MAX_PATH]);

wherein stat_i includes the normal stat call return with the stat data.

Upon transferring that call from one PU to another, the receiving RPC will call the regular "stat" with temporary local storage for the "path" and "buf". The "buf" data will be sent back to the caller without invoking the overhead of addressing the original data through the memory subsystem. The code for operating system calls such as these may be created in advance by processing the source code for the system libraries and translating it into pass-by-value versions, which will be available to the runtime loader for each PU. Thus, the code injected to make the RPC branch decisions can assume the presence of pass-by-value (or partial pass-by-value) support code. To illustrate, a call to "stat" will be converted to, for example, a call to "stat$transfer" when loaded (noting that the symbol "$" in names may be reserved for system calls), and then the injected branch code will either call "stat", or possibly "stat$rpc", where the "stat$rpc" version, which is provided in a library, converts to pass-by-value and performs the RPC. This prevents the loader from being forced to behave intelligently about how these calls work, since it will not be analyzing the routines for which the support code is provided. For calls not seen before (e.g., calls involving user code), it may not be possible to make such translations, and RPCs may contain pointers back to the originating PU, which will be served by the memory subsystem at higher overhead. In the case where a routine does not involve sending a return value (which may be indicated, for example, in C/C++ as "void" calls with "const" arguments), the RPC mechanism may return immediately locally without waiting for the remote PU to complete the RPC call, in which case the RPC becomes a "detached" or independent thread.

Figure 20:
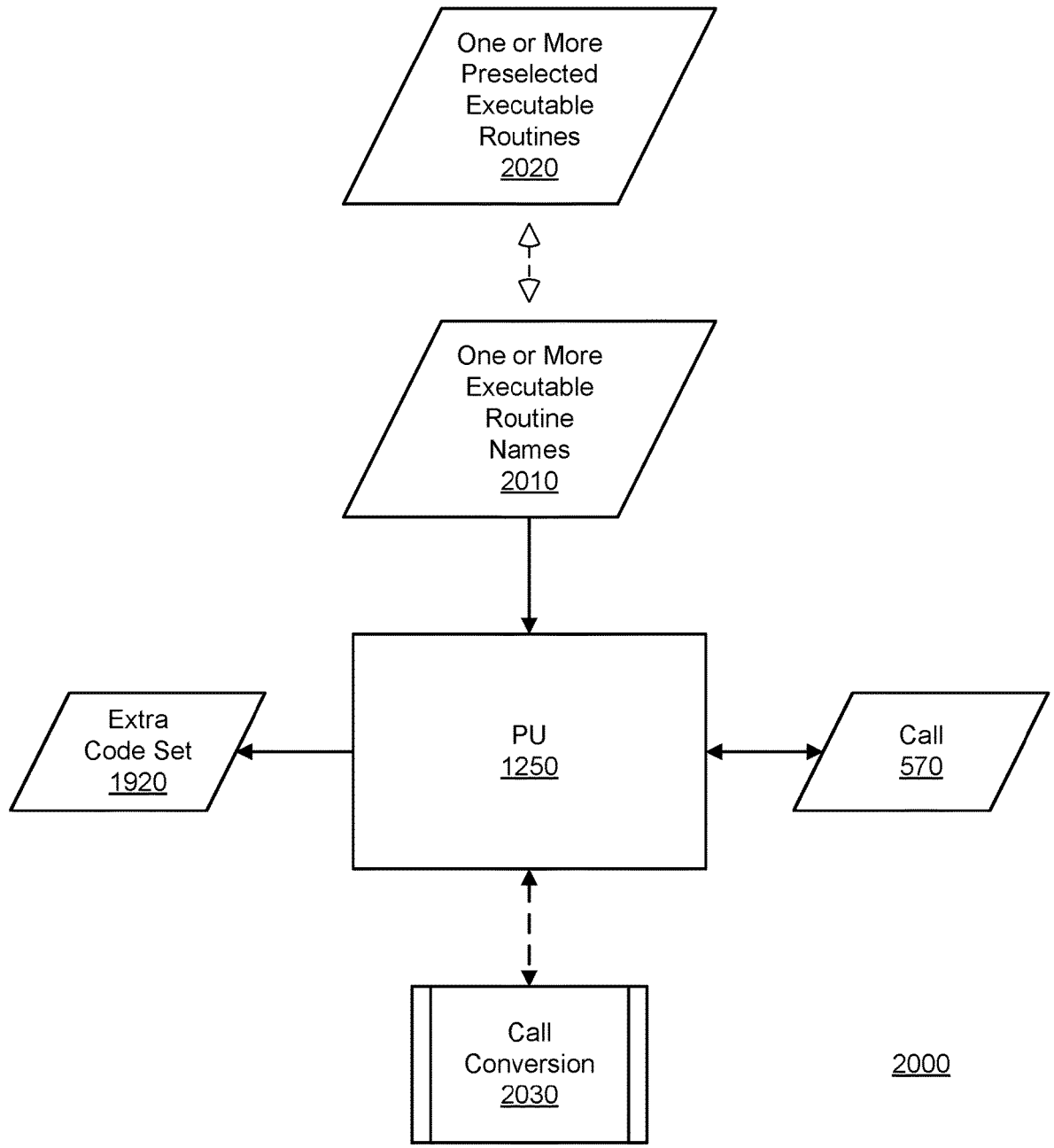
FIG. 20 is a block diagram of an exemplary code selection paradigm in accordance with an embodiment.

Thus, in an embodiment, the executable routine names are utilized to select the code that is to be injected for the RPC decision. To illustrate, and with reference now to FIG. 20, an exemplary code selection paradigm 2000 in accordance with an embodiment is shown. In particular, one or more executable routine names 2010 corresponding to one or more preselected executable routines 2020, respectively, are identified. Additionally, extra code set 1920 is selected based on one or more executable routine names 2010 so as to convert call 570, as represented by call conversion 2030, from a pass-by-reference call into a pass-by-value call.

Moreover, one embodiment provides that various hybrid (e.g., hardware plus software) methodologies may be implemented. For example, code may be profiled statically to determine PU specifications (e.g., whether 64 bit support is to be implemented, or whether 32 bit support would be sufficient) or whether floating-point support is to be implemented. This can be used to tag the code in libraries so that a PU with a minimum of hardware is used to execute the code.

Furthermore, pursuant to one exemplary implementation, an implemented PU includes a floating-point unit (FPU), which may be referred to as a math coprocessor, and which is configured to carry out operations on floating point numbers. Consequently, the hardware redirection to this PU is automatic when other PUs without this support attempt to call a function that involves floating-point support. It is noted that this may not involve actual data memory access, and that this is premised on code type. Additionally, in so much as code and data both reside in memory, this can be keyed on the code's location, and the loader placing code in memory can order it so that particular types of code are stored in particular regions of memory, thereby causing PU assignment to be relatively simple. Moreover, it is noted that floating point instructions may be recognized in code in a manner that is similar to the recognition of coherency instructions.

g. Virtual Function Tables

With respect to modifying code at runtime with languages such as C++, there is an alternative option to injecting code at the regular call sites (as in a C language). In particular, an exemplary implementation provides that, in so much as C++ uses "virtual function tables" (VFTs) to customize subclasses, each instantiated data item that belongs to a class with virtual functions has one or more VFT pointers. Setting or initializing the VFT pointers is part of the C++ constructor's job, so if a "wrapper" is added around the constructor, the VFT pointers can be modified to point at other versions of the VFT that will use RPC redirection code before calling the methods in question. Thus, when the code is loaded, certain class constructors will be replaced with calls to other code, which will call the constructor, but which will also modify the allocated data before returning the data address to the original caller, it being noted that the constructor calls are already modified (though perhaps at a lower level) to help ensure that the data location is correct.

Thus, in an embodiment, a wrapper call is injected around constructors (e.g., C++ constructors) during loading so as to replace the original VFT with an alternate VFT having entries that are RPC decision wrappers. Consider the example where a predefined version of the VFT exists in the compiled code. This VFT is copied and a number of its entries are changed such that these entries point at RPC decision wrappers. Additionally, the previous pointer to the predefined version of the VFT is replaced with a new pointer to the new version of the VFT.

Figure 21:
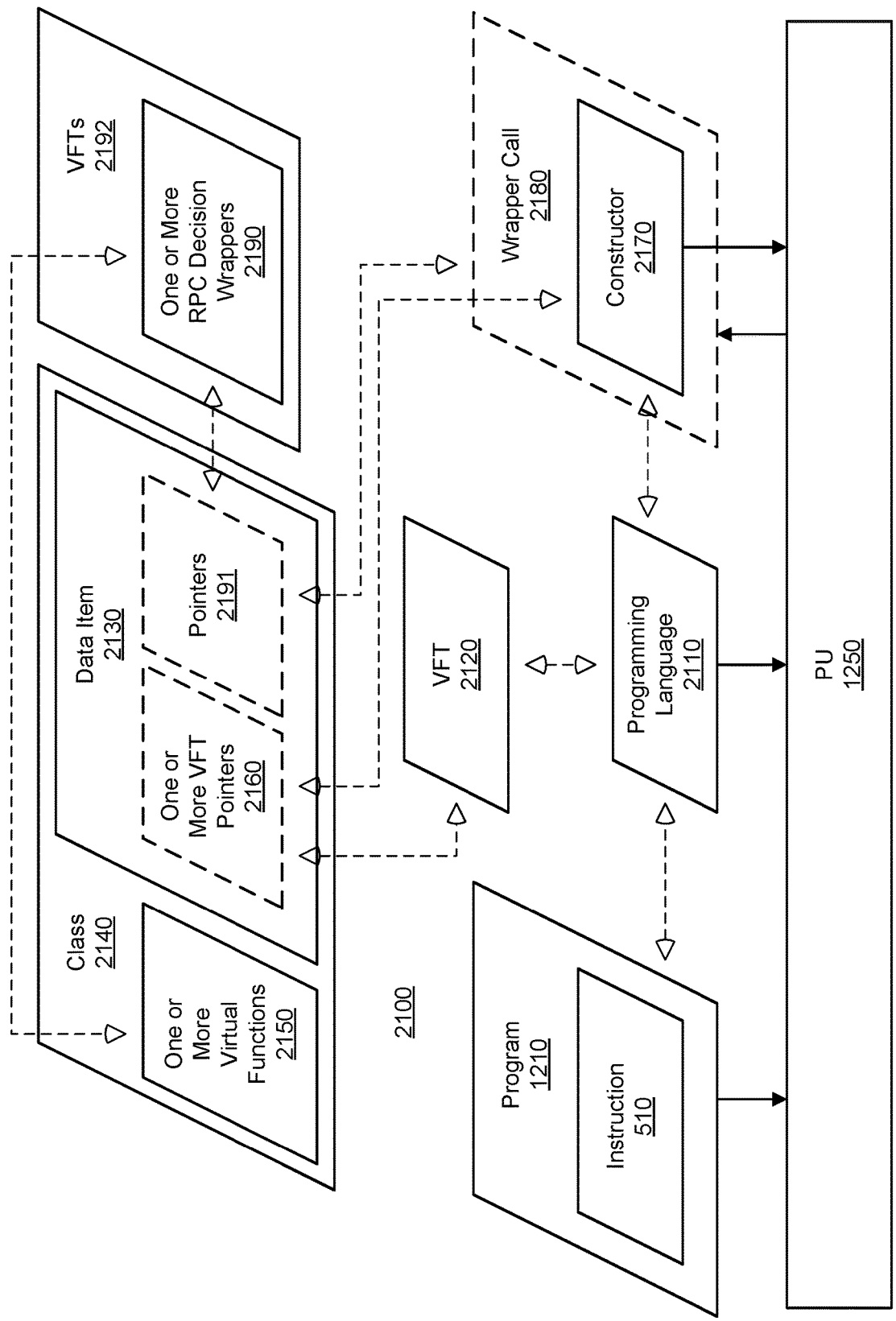
FIG. 21 is a block diagram of an exemplary virtual function table (VFT) replacement paradigm in accordance with an embodiment.

To illustrate, and with reference now to FIG. 21, an exemplary VFT replacement paradigm 2100 in accordance with an embodiment is shown. In particular, a program 1210 including instruction 510 is accessed, and a programming language 2110 corresponding to program 1210 is identified, wherein programming language 2110 is configured to implement a VFT 2120 such that a data item 2130 belonging to a class 2140 having one or more virtual functions 2150 includes one or more VFT pointers 2160 mapped to VFT 2120. Additionally, a constructor 2170 associated with programming language 2110 is identified, wherein constructor 2170 is configured to define one or more VFT pointers 2160. Moreover, a wrapper call 2180 is injected around constructor 2170 during a loading of program 1210 to thereby replace one or more VFT pointers 2160 with pointers 2191 to VFTs 2192 comprising one or more remote procedure call (RPC) decision wrappers 2190 for one or more virtual functions 2150.

The foregoing notwithstanding, in an embodiment, a wrapper call is injected around a constructor during a loading of the program to thereby replace one or more VFT entries with one or more RPC decision wrappers. Additionally, the class instance VFT pointers are updated to use the new VFT(s). It is noted that the alternate VFTs may be allocated in the same memory block as the class instance such that destruction of the class instance automatically removes them, or such that they may be managed separately. This relates to the per-instance code modification that will now be explored.

In one embodiment, in so much as the VFT pointers in a class instance are specific to that instance, these pointers can be modified on a per-instance basis at runtime. In the event that RPC calls are often made (or rarely or never made), then the VFT can be modified so that RPC decision code is not called, and the virtual functions will go directly to the code locally or to a RPC. Such branch-decision data can be stored with the VFT, which is allocated with the class instance when using RPC decision wrappers (whereas normal C++ would share a VFT across all or multiple instances of a class). Consequently, it is noted that virtual functions are called with a pointer to the class instance from which the location of the VFT pointer(s) can be derived.

Moreover, in an embodiment, this approach involves the PU loading the memory that contains the VFT pointer, which is co-located with the data, wherein a "call-site" approach would involve analyzing the address without loading it. It is noted, however, that all of the data associated with the object may or may not be loaded, so this approach may be of benefit where large objects are at the nexus of multiple PUs managing operations on remote objects.

Figure 22:
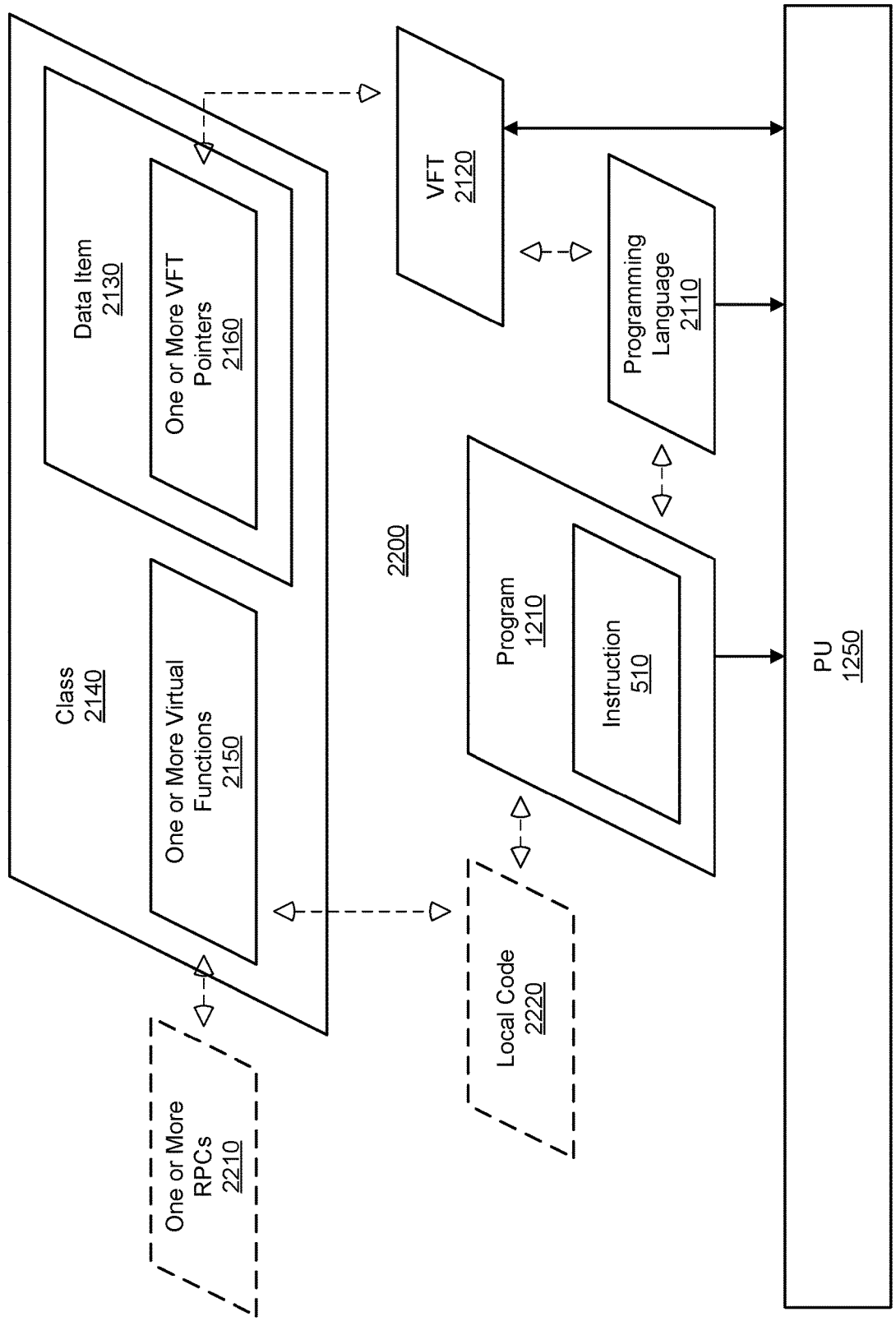
FIG. 22 is a block diagram of an exemplary VFT modification paradigm in accordance with an embodiment.

Thus, in an embodiment, the VFT is itself modified such that RPC decision code is not called. To illustrate, and with reference now to FIG. 22, an exemplary VFT modification paradigm 2200 in accordance with an embodiment is shown. In particular, program 1210, which includes instruction 510, is accessed. Additionally, programming language 2110, which corresponds to program 1210, is identified, wherein programming language 2110 is configured to implement VFT 2120 such that data item 2130, which belongs to a class 2140 having one or more virtual functions 2150, includes one or more VFT pointers 2160 mapped to VFT 2120.

In addition to the foregoing, an embodiment provides that VFT 2120 is modified without RPC decision code being called. For example, and with reference still to FIG. 22, VFT 2120 may be modified, as a result of an implementation of multiple RPCs, such that one or more virtual functions 2150 are automatically directed to one or more RPCs 2210, respectively, without RPC decision code being called. Pursuant to a second example, however, VFT 2120 is modified, as a result of a lack of an implementation of one or more RPCs 2210 (or as a result of a PU not needing to use a RPC), such that one or more virtual functions 2150 are automatically directed to local code 2220 associated with program 1210 without RPC decision code being called.

h. Runtime/Branch Behavior

In an embodiment, runtime metrics are used to further tune the VFTs for optimum behavior. For example, it is noted that a large part of accelerating code execution at runtime may depend on successful branch prediction in the processor hardware; indeed, the silicon dedicated to this may include more than simply the processor itself. C++ and similar languages that use data sub-class specific methods can reduce the decision making by assuming specific cases in a sub-class. Thus, a runtime branch decision is traded for a compile-time decision, and the overhead becomes the constant virtual function call redirect, which is in contrast to an unpredictable branch miss. Being able to observe the runtime behavior of the virtual function calls enables the runtime system to choose between implementations of a routine that assume one set of branch behaviors more likely than another. For example, if a routine has two branches in it, four versions of the code can be created, wherein these four versions handle the various cases properly, but wherein their code is generated assuming different true/false likelihoods on the branches.

Figure 23:
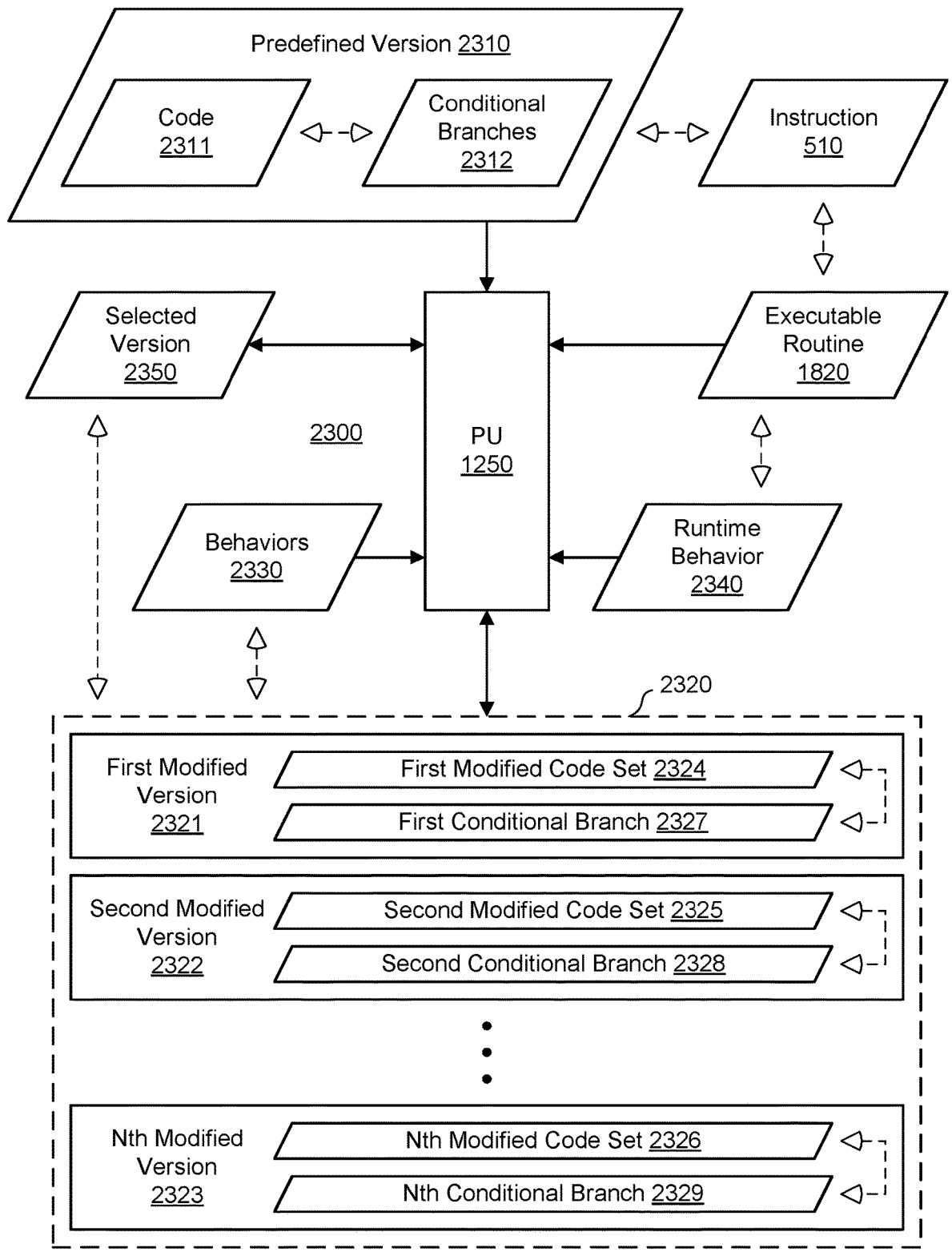
FIG. 23 is a block diagram of an exemplary modified instruction selection paradigm in accordance with an embodiment.

Thus, pursuant to one embodiment, multiple versions of code are generated for branch-optimization. To illustrate, and with reference now to FIG. 23, an exemplary modified instruction selection paradigm 2300 in accordance with an embodiment is shown. In particular, a predefined version 2310 of instruction 510 is accessed, wherein predefined version 2310 includes code 2311 mapped to a plurality of conditional branches 2312. Additionally, multiple modified versions 2320 of instruction 510 are generated, wherein modified versions 2320 include N number of modified versions (N being an integer value greater than 1); for purposes of illustration, modified versions 2320 are shown in FIG. 23 as including first through $N^{th}$ modified versions 2321-2323. Moreover, each of modified versions 2320 includes code 2311 modified to follow a different conditional branch from among plurality of conditional branches 2312. For example, in FIG. 23, first through $N^{th}$ modified versions 2321-2323 are shown as including first through Nth modified code sets 2324-2326, respectively, wherein first through Nth modified code sets 2324-2326 have been modified to follow first through Nth conditional branches 2327-2329, respectively.

An exemplary method of selecting which version of code to use involves (1) assigning a bit in a key to each decision/branch from among a plurality of decisions/branches in the code and (2) setting the bit for each decision/branch based on the specific sequences of events that the corresponding decision/branch involves. This may be accomplished, for example, at the hardware level with a "shift-and-or" operation that shadows branch operations (which has a minimal impact on performance), with the key being reset automatically upon call/return operations. At the end of the code sequence in question, the key can be used as part of a "hash" look-up to select a specific version of the routine (from among a plurality of possible routine versions) for the next time that such sequence is called, wherein this specific routine version is selected because it is a relatively effective and efficient version with respect to the execution of such sequence as compared to the other routine versions from among the plurality of possible routine versions. Moreover, it is noted that call-site updates are atomic and can be performed on a separate thread (e.g., with hardware support, the lookup and rewrite operation can be "forked off" to work independently as the main thread of control goes/wanders elsewhere). This allows "single threaded" code to self-optimize by using the spare cores in a multicore PU architecture to perform on-the-fly tuning.

With reference still to exemplary modified instruction selection paradigm 2300, a plurality of behaviors 2330 associated with the multiple modified versions 2320, respectively, are predicted. Additionally, an executable routine 1820 associated with instruction 510 is accessed, and a runtime behavior 2340 associated with executable routine 1820 is identified. Furthermore, a modified version is selected, as represented by selected version 2350, from among modified versions 2320 for execution during a performance of executable routine 1820 based on a predicted behavior of such modified version corresponding to runtime behavior 2340.

Furthermore, an embodiment provides that, as with the redirect/RPC version, the branch behavior of the virtual function being used can be monitored, and, if it is suboptimal, the VFT entry can be swapped for one that better matches the behavior. An example would be the use of model code in Spice simulators where the model code has many factors that choose which equations to use for calculating voltages and currents; however, most of those factors are runtime constants that will not change after a simulator starts. Using a generic self-monitoring version of the model code as the initial version, the first few calls on a model instance can be observed, and a switching to a non-monitored version with optimal branch defaults (or no branches) may be performed. It is noted that the compiler system adds the monitoring code and that the user would be unaware of this. Also, branch code can be identified in existing compiled code, and methods may be implemented for regenerating compiled code in different forms.

In an exemplary implementation, when optimizing VFT table usage, either the VFT pointer(s) in the class instance can be changed (e.g., to point at different versions of the VFT) or the VFT entries themselves can be changed; the choice is based on the implemented class methods and the number of class instances. In the event that a relatively large number of instances of the same class are implemented, a common set of VFTs is implemented so as to lower the amount of memory that is utilized (such as where thousands of instances are implemented when a significantly smaller number of distinct modes of operation are utilized). Similarly, if a correlation exists between the respective behaviors of the various methods, then a change of state in the class instance may involve changing a number of methods such that optimal performance may be achieved, and updating the VFT pointer is faster than changing all the method pointers in the VFT. However, in the event where the number of instances is relatively small and there is little correlation between the respective behaviors of the implemented methods, a process of updating the individual entries in the VFT is implemented, wherein this process may be referred to, for example, as call-site rewriting.

Figure 24:
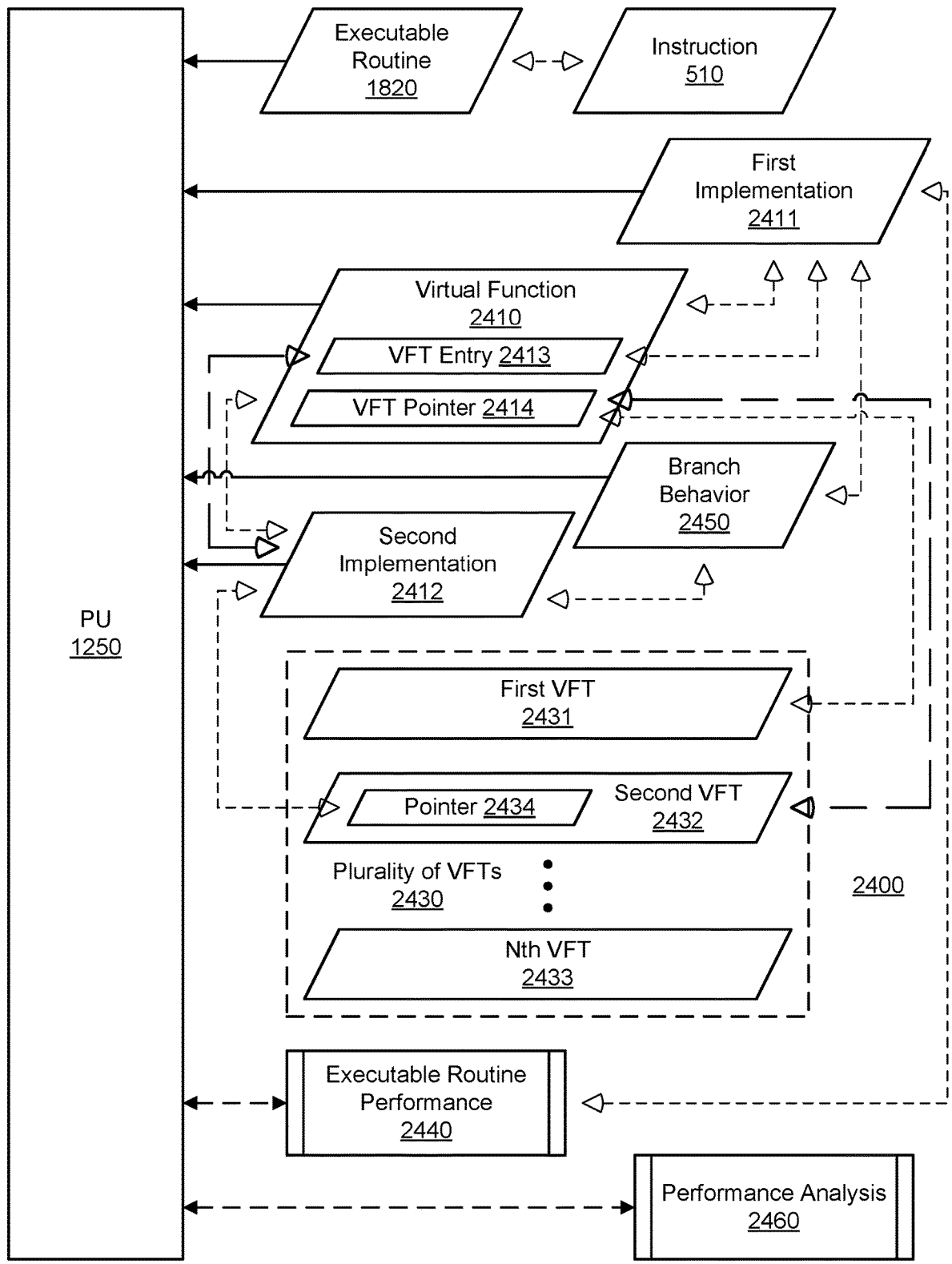
FIG. 24 is a block diagram of a first exemplary virtual function remapping paradigm in accordance with an embodiment.

To further illustrate, and with reference now to FIG. 24, a first exemplary virtual function remapping paradigm 2400 in accordance with an embodiment is shown. In particular, an executable routine 1820 associated with (e.g., including or mapped to) instruction 510 is accessed, and first and second implementations 2411, 2412 of a virtual function 2410 are identified, wherein virtual function 2410 includes a VFT entry 2413 pointing at first implementation 2411, and wherein virtual function 2410 further includes a VFT pointer 2414 mapped to a first VFT 2431 from among a plurality of VFTs 2430. For purposes of illustration, plurality of VFTs 2430 is shown in FIG. 24 as including first through Nth VFTs 2431-2433. Additionally, a performance of a portion of executable routine 1820 is initiated with first implementation 2411, as represented by executable routine performance 2440, and a branch behavior 2450 exhibited by first implementation 2411 during this performance is identified.

After branch behavior 2450 is identified, VFT pointer 2414 may be remapped, or VFT entry 2413 may be updated, based on this branch behavior 2450. In particular, and with reference still to FIG. 24, a performance analysis 2460 of branch behavior 2450 is conducted to thereby determine that a degree to which second implementation 2412 corresponds to branch behavior 2450 is greater than a degree to which first implementation 2411 corresponds to branch behavior 2450. Furthermore, VFT pointer 2414 is remapped to a second VFT 2432 from among plurality of VFTs 2430 (e.g., such that VFT pointer 2414 is no longer mapped to first VFT 2431) based on performance analysis 2460, wherein second VFT 2432 includes a pointer 2434 mapped to second implementation 2412; alternatively, VFT entry 2413 may be updated to point (e.g., directly) at second implementation 2412 (e.g., rather than at first implementation 2411) based on performance analysis 2460.

For purposes of clarity, it is noted that first and second implementations 2411, 2412 of virtual function 2410 may be (or may correspond to the respective implementations of) two different versions, respectively, of virtual function 2410. In this manner, it is noted that utilizing different versions of a single virtual function may be distinguishable from utilizing different virtual functions; for example, in a C++ class, multiple distinct virtual functions may exist, and each of these will be provided with a different slot/entry in a VFT. In contrast, an embodiment provides that different versions of a single virtual function are compiled (or precompiled), and a version from among these virtual function versions is selected (e.g., at runtime) based on such version being, embodying or representing a relatively effective and efficient implementation of a particular method. To illustrate, consider the example where a class may have "Method A" and "Method B" implemented as "Virtual Function A" and "Virtual Function B", in which case "Entry 0" and "Entry 1" of the VFT will be pointing at "A" and "B", respectively. A new version of "B" (e.g., "B1") may be created by compiling "B" with different parameters, and "B1" may be utilized by changing "Entry 1" to point at "B1" rather than at "B". Other exemplary applications of this methodology may include swapping between optimized and debug versions of a routine. For example, in a debug environment, when the user sets a breakpoint in a routine, the code version can be swapped from a fully-optimized version to one that supports debugging and breakpoints, which may have performance advantages over swapping between compiled versions for the entire program.

In an embodiment, a program may also exhibit certain behavior whereby, after making a particular decision, different behavior is more likely to occur the next time through the call in question. A particular function implementation may therefore rewrite its own "call-site" (e.g., the VFT entry for the called function) so that the next time through will be less likely to miss cache. An example of this involves simulation models of logic operations where the model switches between states and where each state responds differently. The code for such models may have a "state variable" that is queried as part of the class instance. Thus, being able to rewrite the code entry point obviates the implementation of the state variable, since the state is implicit in the call being made. In the event that the compiler system is aware of the use of call-site rewriting, such state variables can be eliminated from the generated code, thereby saving memory.

Figure 25:
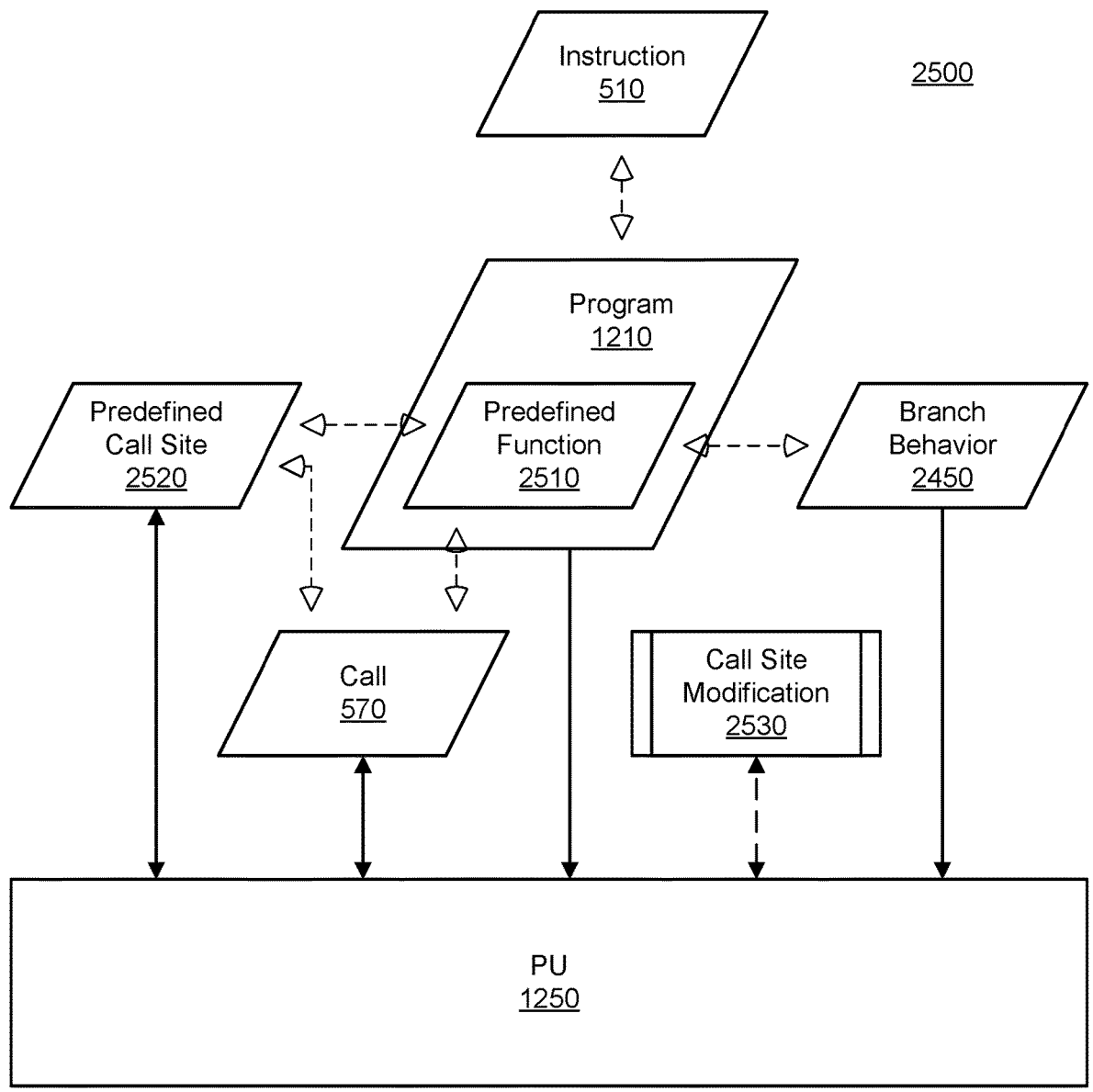
FIG. 25 is a block diagram of an exemplary call site modification paradigm in accordance with an embodiment.

With reference now to FIG. 25, an exemplary call site modification paradigm 2500 in accordance with an embodiment is shown. In particular, a program 1210 associated with (e.g., including or mapped to) instruction 510 is accessed, wherein program 1210 includes a predefined function 2510 mapped to a predefined call site 2520. Additionally, a call 570 of predefined function 2510 is performed with predefined call site 2520, such as by utilizing a VFT pointer entry, and a branch behavior 2450 exhibited by predefined function 2510 is identified as a result of call 570. Moreover, predefined call site 2520 is modified, as represented by call site modification 2530, based on branch behavior 2450. For example, based on branch behavior 2450, the implemented VFT pointer may be remapped to a different VFT entry.

In an exemplary implementation, a hardware supported version is provided wherein a call-site address is stored in shadow registers. In particular, the methodology involves adding executable routines to the generated code (e.g., "set$call(<version>)") to make use of the shadow register information, wherein such routines are ultimately not performed if the hardware/software is unable to support such code. Moreover, it is noted that a branch miss can cause a pipeline stall while the processor waits for its code-fetching hardware to catch up with where the branch actually went. Pursuant to a second exemplary implementation, however, a fully realized system is provided, wherein the branch prediction hardware is eliminated, because the software itself is better equipped to predict its own behavior. It is noted that this saves on time and power and makes more device surface area available for cache memory and/or other functions.

Thus, it is noted that an embodiment provides for call-site rewriting. Pursuant to an exemplary scenario, however, the GNU Compiler Collection (GCC), which is the GNU C language compiler, allows marking branch choices, but GCC does not produce multiple versions of the code. The foregoing notwithstanding, in one embodiment, a compiler system is configured to enable users to indicate that the branch behavior is runtime constant in order to support the foregoing, and such that versions of code may be generated that eliminate unnecessary branch decisions. Thus, in addition to creating redirect and RPC code, different versions of the target code will be produced for use by the runtime system, and the extra versions may be included in the program executable and/or its shared libraries. It is noted that C++ libraries may additionally use "name mangling" so that multiple versions of routines with the same name can be present in order to support function overloading.

As previously indicated, a program may exhibit certain behavior whereby, after making a particular decision, different behavior is more likely to occur in the future; in one embodiment, a virtual function may be remapped accordingly. To illustrate, and with reference now to FIG. 26, a second exemplary virtual function remapping paradigm 2600 in accordance with an embodiment is shown. In particular, an executable routine 1820 associated with (e.g., including or mapped to) instruction 510 is accessed, and first and second implementations 2411, 2412 of a virtual function 2410 are identified, wherein virtual function 2410 includes a VFT entry 2413 pointing at first implementation 2411, and wherein virtual function 2410 further includes a VFT pointer

Figure 26:
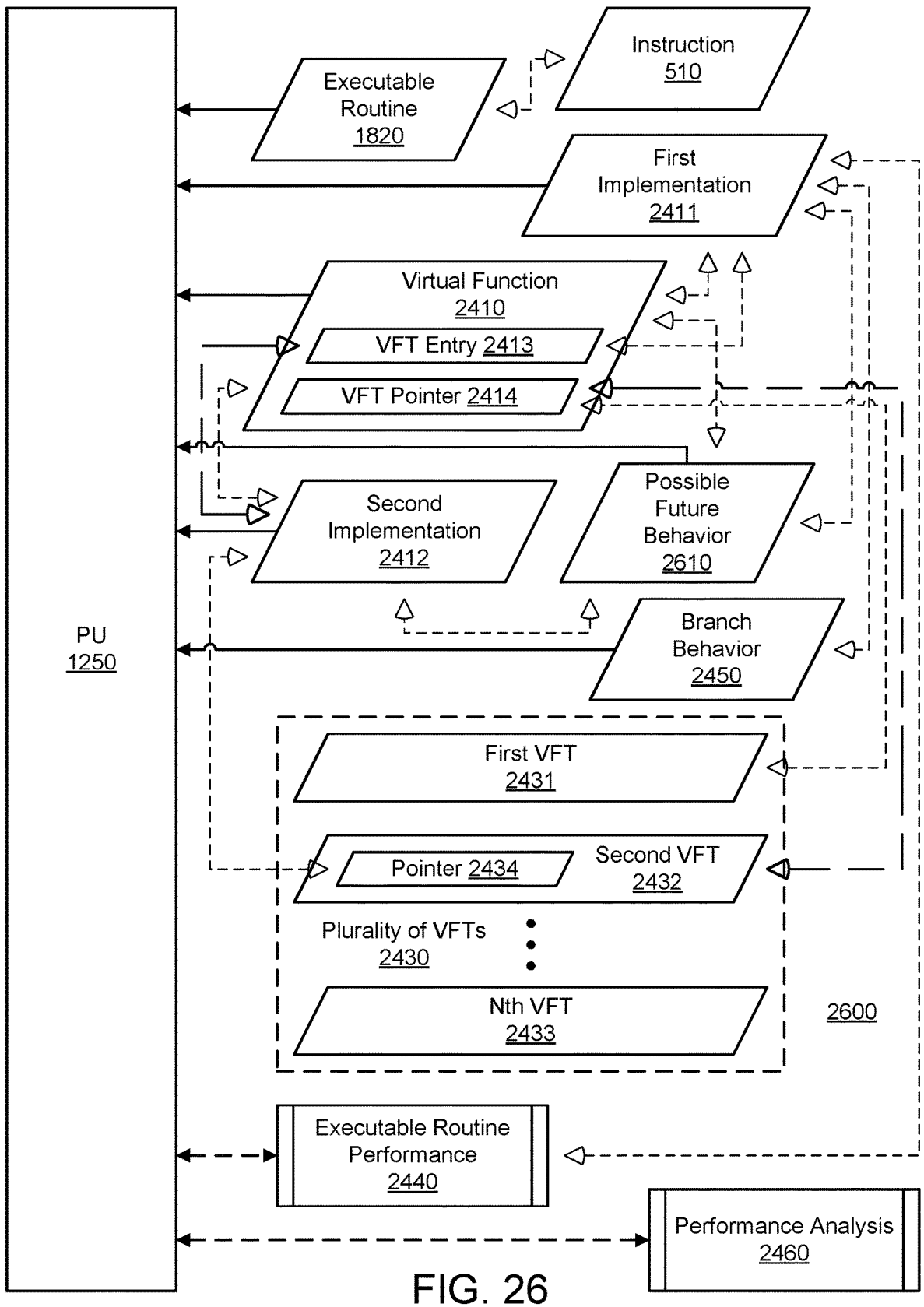
FIG. 26 is a block diagram of a second exemplary virtual function remapping paradigm in accordance with an embodiment.

2414 mapped to a first VFT 2431 from among a plurality of VFTs 2430. For purposes of illustration, plurality of VFTs 2430 is shown in FIG. 26 as including first through Nth VFTs 2431-2433. Additionally, a performance of a portion of executable routine 1820 is initiated with first implementation 2411, as represented by executable routine performance 2440, a branch behavior 2450 exhibited by first implementation 2411 during this performance is identified, and a possible future behavior 2610 of virtual function 2410 is predicted based on branch behavior 2450.

After possible future behavior 2610 is predicted, VFT pointer 2414 may be remapped, or VFT entry 2413 may be updated, based on this possible future behavior 2610. In particular, and with reference still to FIG. 26, a performance analysis 2460 of possible future behavior 2610 is conducted to thereby determine that a degree to which second implementation 2412 corresponds to possible future behavior 2610 is greater than a degree to which first implementation 2411 corresponds to possible future behavior 2610. Furthermore, VFT pointer 2414 is remapped to a second VFT 2432 from among plurality of VFTs 2430 (e.g., such that VFT pointer 2414 is no longer mapped to first VFT 2431) based on performance analysis 2460, wherein second VFT 2432 includes a pointer 2434 mapped to second implementation 2412; alternatively, VFT entry 2413 may be updated to point (e.g., directly) at second implementation 2412 (e.g., rather than at first implementation 2411) based on performance analysis 2460.

E. Exemplary Call Transferring

A number of exemplary call transferring techniques will now be explored. It is noted, however, that the present technology is not limited to these exemplary call transferring techniques, and that other call transferring techniques may be implemented.

i. Automatic Transferring

In view of the foregoing, an embodiment provides that a PU (e.g., first PU 540) that accesses a call determines whether that call should be redirected, such as with an RPC, to a different PU. As previously explained, this decision may be made with hardware and/or software support mechanisms. In one embodiment, however, a thread of control may be first transferred automatically before such a higher level decision is made, such as where the thread of control is automatically transferred from a different PU to first PU 540 before the subsequent RPC decision process is performed because this other PU does not have access to all of the system's memory.

Figure 27:
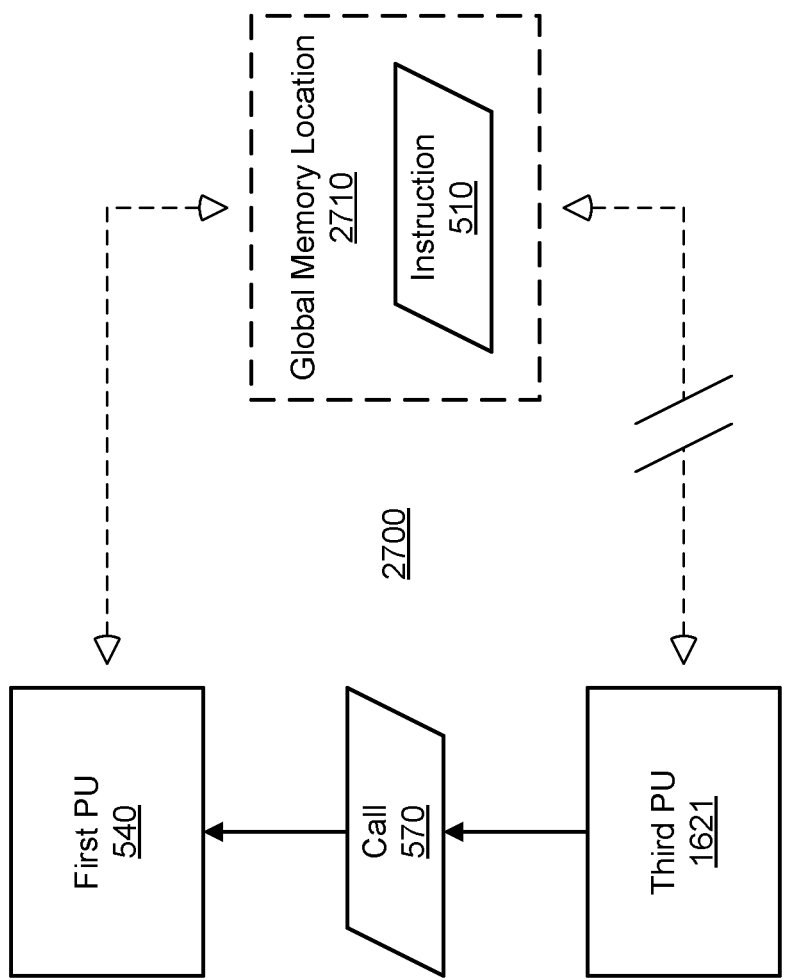
FIG. 27 is a block diagram of an exemplary automatic call transferring paradigm in accordance with an embodiment.

To illustrate this concept of automatic call transferring, and with reference now to FIG. 27, an exemplary automatic call transferring paradigm 2700 in accordance with an embodiment is shown. In particular, a global memory location 2710 associated with instruction 510 is identified. Additionally, call 570 is automatically transferred from third PU 1621 to first PU 540 as a result of third PU 1621 lacking access to global memory location 2710 and first PU 540 having access to global memory location 2710.

To further illustrate, although a global memory map may be implemented, one exemplary implementation provides that not all processors have access to all memory, and that calls involving memory that cannot be accessed/cached locally may be transferred automatically to a PU with access. This may make sections of memory secure against hacking. For example, one PU will have the task of handling encryption keys, wherein such PU is the only PU from among a plurality of implemented PUs that has access to the associated data. Attempts to address that data space from other PUs would cause a segmentation fault (SEGV), and access would only be achieved through the authorized (or "blessed") routines that are allowed to transfer, which is a method for hardening existing code where the information that is to be secured is in shared libraries used by less secure user code.

Similarly, an embodiment provides that the instruction memory may be locked down on the secure PU so that such PU is not free to run other code. Pursuant to an exemplary implementation, this may be achieved in a non-distributed architecture by customizing the memory protection, although there would still be a physical path from the user code to the memory that is to be provided with a degree of protection. In accordance with one exemplary implementation, however, the RPC mechanism would be available in a DPA such that there is no other path to the memory to be protected.

ii. Memory Allocation Per Data Type

Pursuant to one embodiment, memory allocation is performed per-data-type. In particular, an exemplary implementation provides that such memory allocation is somewhat difficult to implement with the C language, but C++ and other object oriented languages use type-specific constructors for which extra code may be injected. For example, when loading a C++ library, the memory allocation calls are identified within the constructors and then amended to use specific regions of memory such that the data will reside with a particular PU.

Figure 28:
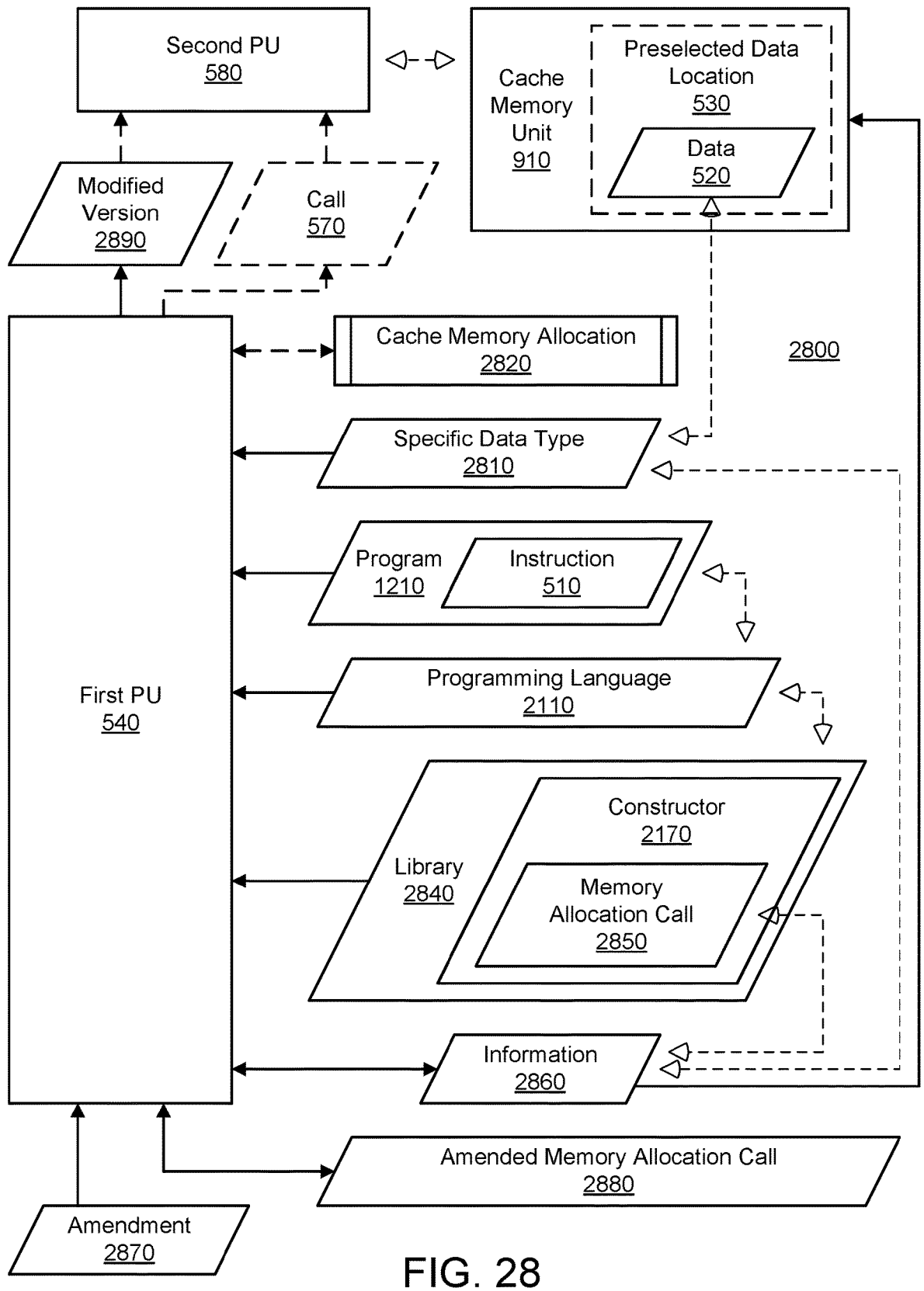
FIG. 28 is a block diagram of an exemplary memory loading paradigm in accordance with an embodiment.

For purposes of illustration, and with reference now to FIG. 28, an exemplary memory loading paradigm 2800 in accordance with an embodiment is shown. In particular, a cache memory unit 910 associated with (e.g., allocated to or included within) a specific PU (e.g., second PU 580) is identified, and an allocation of cache memory unit 910 to a specific data type 2810 associated with data 520 is conducted, as represented by cache memory allocation 2820, based on preselected data location 530 being located within cache memory unit 910. Additionally, a program 1210 including instruction 510 is accessed, and a programming language 2110 corresponding to program 1210 is identified.

In the case where constructors are nested, the inner constructors may be directed to allocate memory into the same PUs as the outer constructors such that related data is collocated. This may be the case, for example, in tasks such as a simulation where a circuit model is constructed hierarchically.

Moreover, a library 2840 corresponding to programming language 2110 is accessed, wherein library 2840 defines a constructor 2170 including a memory allocation call 2850, and wherein memory allocation call 2850 is mapped to information 2860 having specific data type 2810. Furthermore, an amendment 2870 to memory allocation call 2850 is implemented based on the allocation (performed during cache memory allocation 2820) to thereby create an amended memory allocation call 2880 and a modified version 2890 of program 1210, and amended memory allocation call 2880 is performed such that information 2860 is loaded into cache memory unit 910 as a result of amendment 2870.

With reference still to FIG. 28, pursuant to one embodiment, call 570 is performed to thereby execute modified version 2890 of program 1210 with the specific PU as a result of the allocation (performed during cache memory allocation 2820). Consider the example where call 570 is transferred to second PU 580 from first PU 540, and where second PU 580 receives modified version 2890 of program 1210 from first PU 540. Second PU 580 performs call 570 such that modified version 2890 of program 1210 is executed, wherein the execution of this particular version of program 1210 is executed by second PU 580 as a result of the aforementioned memory allocation.

Moreover, an embodiment provides that the code injection method for the foregoing memory loading approach is much the same as code injection for the RPC decision making process, noting that (1) code injection is performed on a per-PU basis when a program is loaded into memory, (2) different PUs may have different versions of the program in memory depending on how it is amended as it is loaded and (3) the location of the code implies the RPC mode. With respect to various platforms and distributed computing environments where there is no physically shared memory, it is noted that this approach may involve a "software only" mechanism, although hardware support may serve to make the process faster and more efficient.

iii. Code Preprocessing

As previously indicated, an exemplary implementation provides that a particular type of routine call uses, for efficiency purposes, pointers as arguments rather than copying data, and these pointers may be converted to pass-by-value calls. The foregoing notwithstanding, in one embodiment, a transfer library is implemented to transfer data between the implemented PUs, and the operating system code is preprocessed in advance of such transfer in order to generate this transfer library, wherein this preprocessing involves translating pass-by-reference source code into pass-by-value support code.

Figure 29:
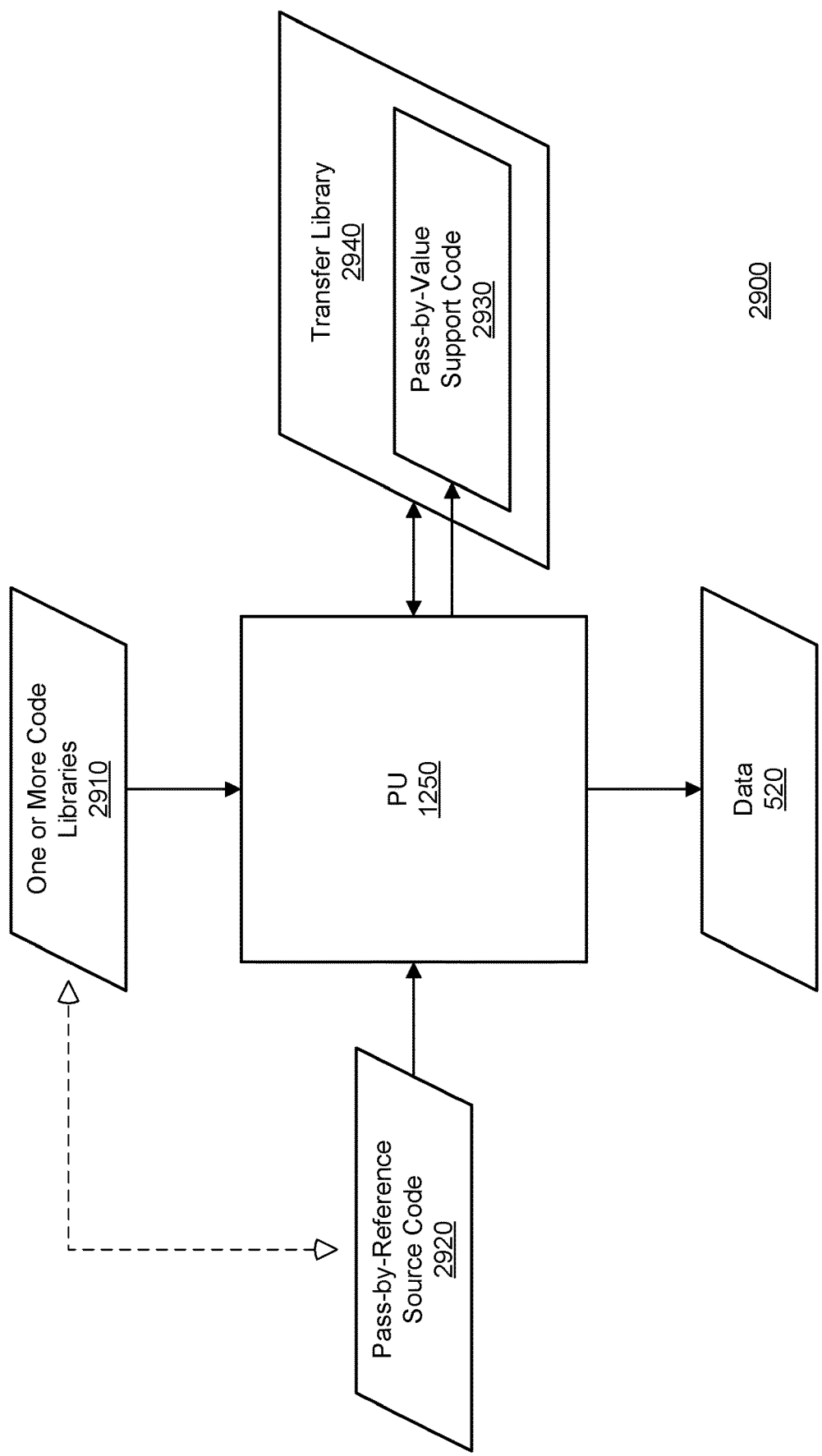
FIG. 29 is a block diagram of an exemplary data passing paradigm in accordance with an embodiment.

To illustrate, and with reference now to FIG. 29, an exemplary data passing paradigm 2900 in accordance with an embodiment is shown. In particular, one or more code libraries 2910 are identified, and pass-by-reference source code 2920 associated with one or more code libraries 2910 is accessed. Additionally, pass-by-reference source code 2920 is translated into pass-by-value support code 2930 to thereby generate a transfer library 2940. Moreover, transfer library 2940 is utilized to pass data 520 by value rather than by reference.

Figure 30:
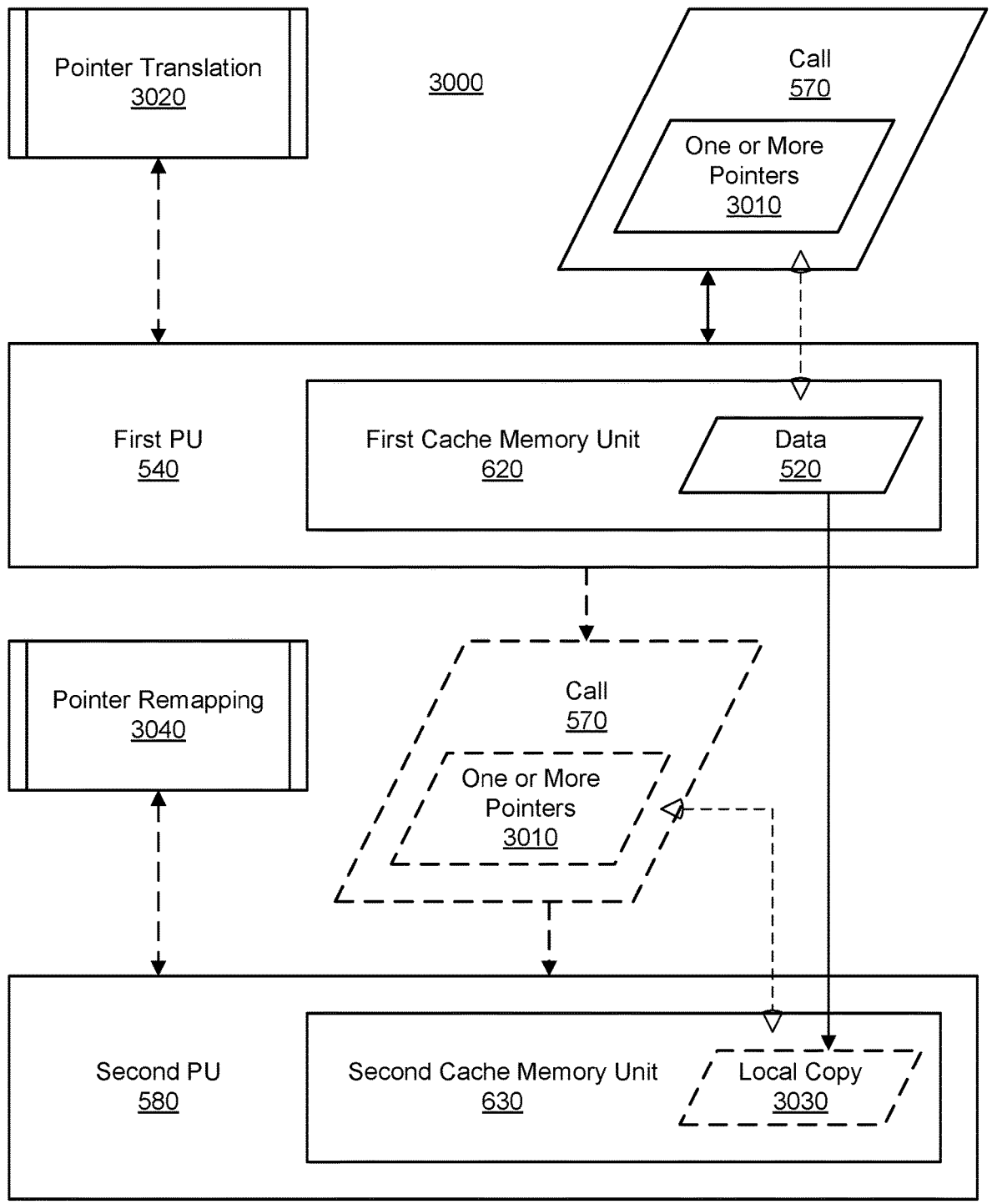
FIG. 30 is a block diagram of an exemplary pointer remapping paradigm in accordance with an embodiment.

Furthermore, in one embodiment, the original target code/routine is called with pointers remapped to the local copies transferred by the RPC mechanism. To illustrate, and with reference now to FIG. 30, an exemplary pointer remapping paradigm 3000 in accordance with an embodiment is shown. In particular, first and second PUs 540, 580 include first and second cache memory units 620, 630, respectively, and data 520 is stored in first cache memory unit 620. Additionally, one or more pointers 3010 in call 570 are identified, and one or more pointers 3010 are translated, as represented by pointer translation 3020, to thereby configure call 570 to pass data 520 by value rather than by reference. Moreover, a transfer of call 570 from first PU 540 to second PU 580 is executed, and data 520 is passed by value during this transfer to thereby store a local copy 3030 of data 520 in second cache memory unit 630. Furthermore, one or more pointers 3010 are remapped to local copy 3030, as represented by pointer remapping 3040, to thereby enable call 570 to be executed without accessing first cache memory unit 620.

iv. RPC Transferring

Figure 31:
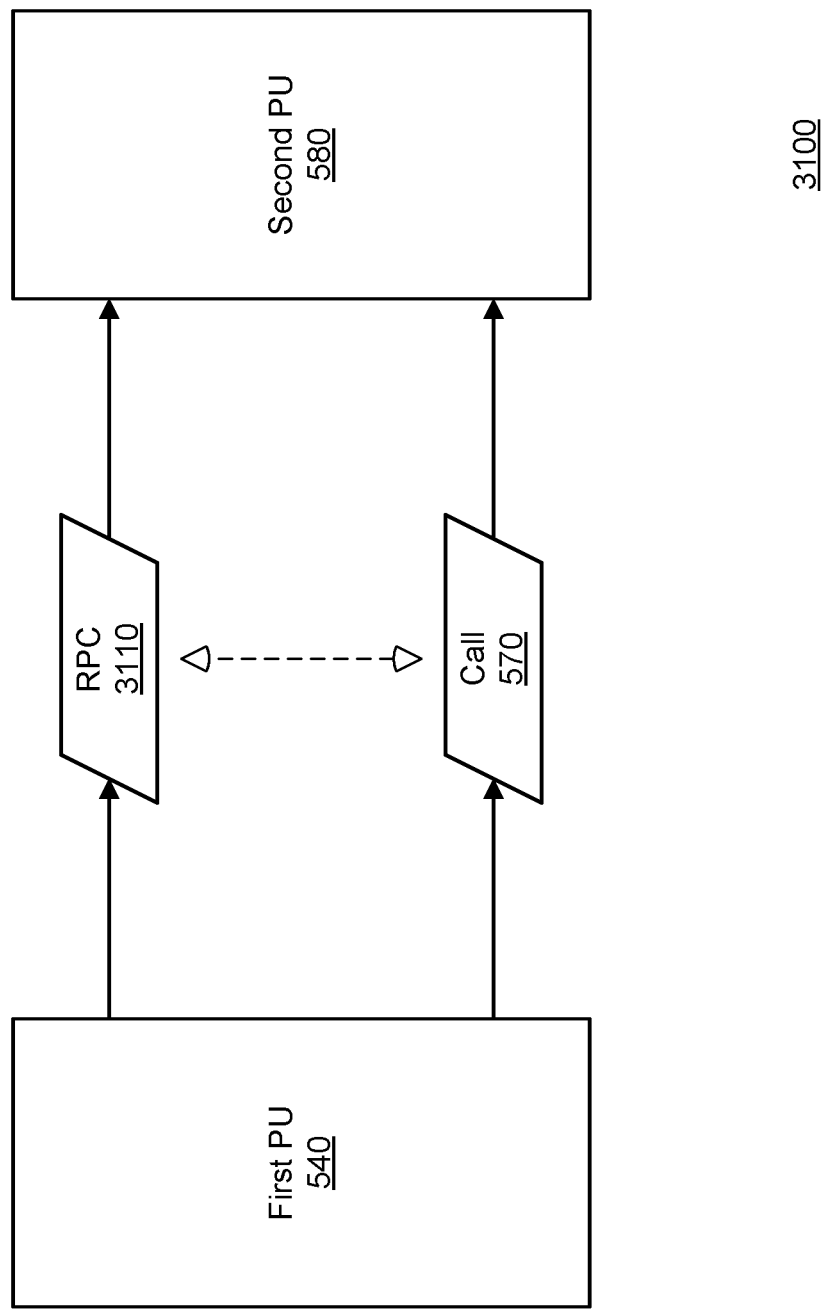
FIG. 31 is a block diagram of an exemplary remote procedure call (RPC) transferring paradigm in accordance with an embodiment.

As previously indicated, an embodiment provides that a RPC mechanism may be employed for the call transfer process. For example, and with reference now to FIG. 31, an exemplary RPC transferring paradigm 3100 in accordance with an embodiment is shown. In particular, a RPC 3110 is invoked to thereby transfer call 570 from first PU 540 to second PU 580. In this regard, it is noted that, pursuant to an exemplary implementation, RPC 3110 is an inter-process communication that allows a computer program to cause a subroutine or procedure (such as one mapped to call 570) to execute in another address space (e.g., in a different PU) within a shared network of various resources (e.g., multiple PUs). Indeed, RPC 3110 may also be configured to transfer a context of first processor 540 to second processor 580 during this call transfer process. It is noted that RPC 3110 is similar to a local procedure call, except that the called procedure may or may not exist in the same address space as the calling procedure. Rather, two different processes may be running on the same computer system, or they may be running on different computer systems, respectively, with a network enabling such systems to communicate with one another. As such, RPC 3110 may be implemented to realize relatively efficient and truly distributed applications.

Additionally, in one embodiment, RPC 3110 is implemented such that a "client/server" mode is not utilized. For example, in contrast to a RPC mode whereby a client program run by the originating PU awaits a result from the server program run by the target PU, an embodiment provides that threads may or may not return to the originating PU, and that these threads may therefore meander or wander through memory (from PU to PU), such as until such time as these threads are completely executed (or, theoretically speaking, in the event that the threads are not ultimately executed, they may wander indefinitely). This is particularly relevant for database searching, wherein a complex query may be dispatched with no immediate expectation of return.

For example, RPC 3110 is initiated by first PU 540, which sends a request message to second PU 580 to execute a specified procedure with supplied parameters, such as where this procedure is mapped to call 570. In particular, first PU 540 calls a proxy function locally and passes it the argument for the remote code, wherein such arguments may be passed as addresses. The proxy then (1) encodes, serializes or "marshalls" the remote procedure arguments, such as by converting them into a predefined transfer format called external data representation (XDR), and (2) makes a system call to thereby cause the local operating system to send the encoded packet to second PU 580 (such as with a user data protocol (UDP) packet or a local message queue). In so much as the client/server mode is not implemented, it is noted that first PU 540 does not wait for a result once it has dispatched this packet to second PU 580. Consequently, first PU 540 is free to process a different thread.

Upon or subsequent to second PU 580 receiving the encoded packet, it passes this packet to a dispatch routine that will (1) decode, recreate or "unmarshall" the remote procedure arguments (such as with predefined external data representation (XDR) filters) and (2) call and perform the remote procedure. It is noted that, in so much as the client/server mode is not implemented, second PU 580 does not initiate the process of encoding, serializing or marshalling the results into a new packet and then sending this packet back to first PU 540. Rather, second PU 580 is free to continue processing this same thread, or else, in the event that this thread then wanders to a different PU, begin/continue processing a different thread. As such, it is noted that this approach yields greater system processing efficiency as compared to a client/server mode RPC.

Indeed, with regard to overall system performance, an exemplary implementation provides that a Pthread mutex lock call may be defined as follows:

int pthread_mutex_lock(pthread_mutex_t*mutex);

The data transferred for the RPC approach is (1) the mutex address, (2) the code address, (3) an identifier (e.g., an address) for the return and (4) a header, which may aggregate to, for example, a 4 word minimum. Attempting to read the mutex directly involves updating/flushing at least one cache line, which will be at least 4 words, and possibly 8 words or more. However, the cache line will be shared between multiple processors, while the RPC call can be exclusive to the PUs involved and separate from the memory system, such as by implementing, for example, a point-to-point, multiple processor interconnect protocol (e.g., Intel QuickPath™ or AMD HyperTransport Technology™). Consequently, the RPC mechanism may be implemented such that calls can be transferred in a relatively efficient manner.

In view of the foregoing, it is noted that the implementation of multiple threads may involve the utilization of mutex operations, which may be implemented, for example, using semaphores, in order to prevent common data from being read or modified while such data is in the process of being modified. It is also noted that the mutex calls for a particular mutex operation may be handled serially on a single processor in an atomic manner, such that there is no chance of overlapping access (and therefore no race conditions or cache-coherency issues). It is further noted that, with more PUs and finer segmentation of memory, it is more likely that a particular portion of shared data has its own PU, and the processing of RPC calls will be faster. Consequently, this approach scales well such that relatively large numbers of PUs may be implemented while existing code is supported.

The foregoing notwithstanding, in an embodiment, the actual mechanisms used for executing the remote procedure calls depend on the kind of core being used. For most processors, the context of a call/code is held in registers, so transferring control to another PU involves transferring the register set. The ability to transfer other data that is held locally in cache as well may be beneficial, but it may be difficult to entirely perform this automatically. Therefore, an exemplary implementation provides a user level call to "push" locally cached data to a PU, which is the RPC target, wherein such data is to be used in the redirect code. Thus, it is noted that user level control may be provided for copying data directly from cache to cache.

Figure 32:
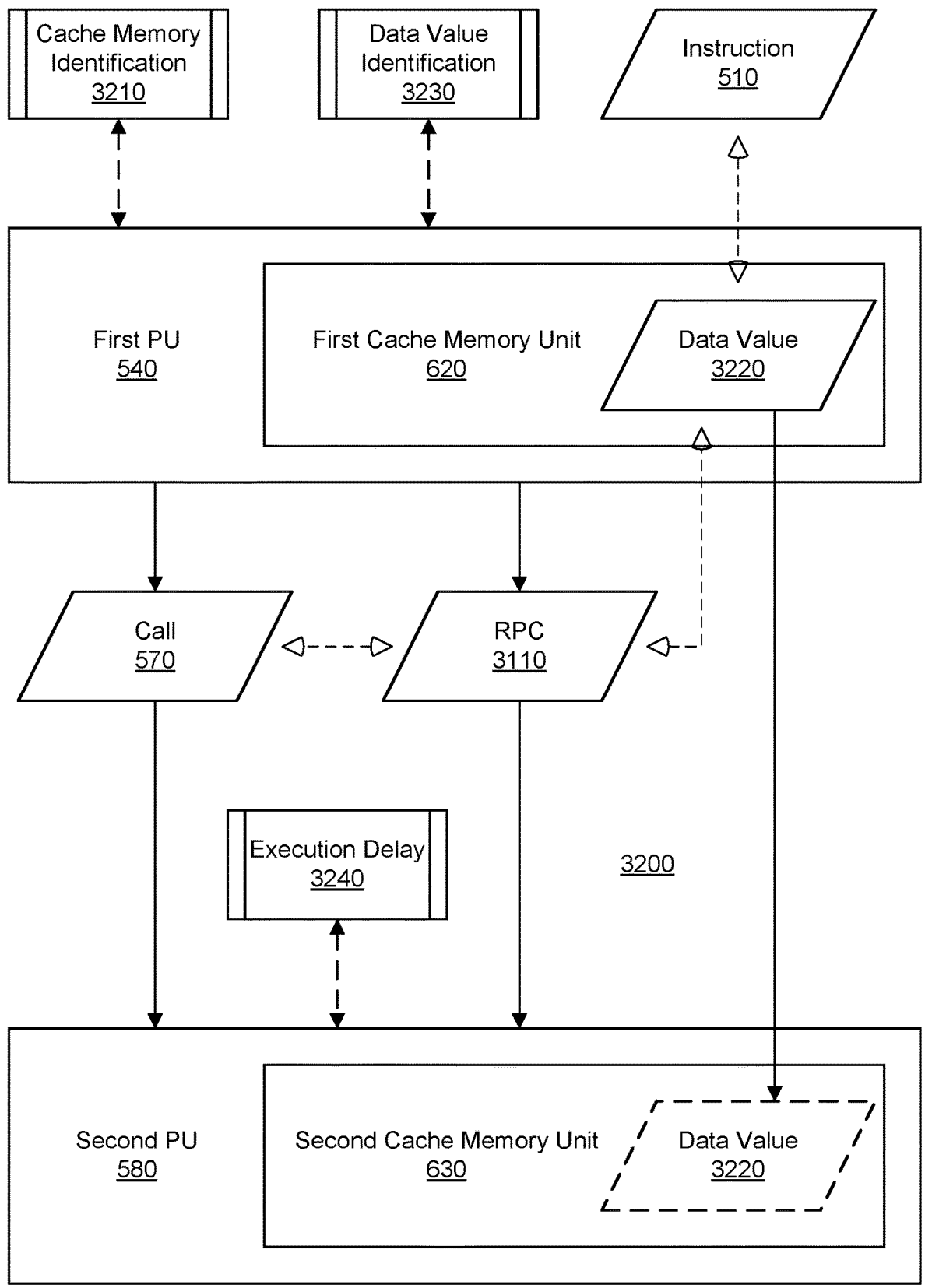
FIG. 32 is a block diagram of an exemplary data storage paradigm in accordance with an embodiment.

For example, if a RPC is being implemented and the remote code is mapped to data from the originating PU's memory, the RPC mechanism can push the data ahead of, or along with, the call. To illustrate, and with reference now to FIG. 32, an exemplary data storage paradigm 3200 in accordance with an embodiment is shown. In particular, first and second cache memory units 620, 630 associated with first and second PUs 540, 580, respectively, are identified, as represented by cache memory identification 3210. Additionally, a data value 3220 stored in first cache memory unit 620 and associated with instruction 510 is identified, as represented by data value identification 3230. Moreover, data value 3220 is stored in second cache memory unit 630 as a result of RPC 3110, such as where RPC 3110 "pushes" data value 3220 to second cache memory unit 630 when transferring call 570 from first PU 540 to second PU 580.

To further illustrate, and with reference to the aforementioned examples involving the fprintf function, an exemplary implementation provides the option of pushing the arguments to the call in the redirect code. Options to the push function control whether the local cache is flushed. Thus, the call may resemble the following:

void push (local_address, data_size, target_pu, option_flags);

If the data is not actually in the local cache or other local memory, then no action is taken to retrieve or move the data, in which case the instruction is effectively a "no-op", which may be defined, for example, as a computer instruction that utilizes a relatively small amount of memory space but specifies no operation, such that the processor simply moves to the next sequential instruction. The target's PU caching policy may also be taken into consideration as well, such that the operation may be skipped. The user may also supply extra information with the "push" as to whether the data is to be retained in the local cache.

In addition to the foregoing, one embodiment provides that the remote PU may have the capability to hold or delay an execution of the transferred call until the data has arrived. To illustrate, and with reference still to FIG. 32, an embodiment provides that an execution of call 570 is delayed by second PU 580, as indicated by execution delay 3240, until data value 3220 is stored in second cache memory unit 630. It is noted that delaying execution of the transferred call until such data has arrived may help to avoid stalling the main processing pipeline of the remote PU.

In view of the foregoing, and in accordance with an embodiment, it is noted that the concept of "pushing" memory/data may be implemented. Pursuant to an exemplary implementation, such a data "pushing" approach solves two problems pertaining to (1) knowing when to invalidate local cache and (2) the latency incurred on the remote end when requesting the data. Thus, the injected RPC code can pull extra data from the local cache and send it with the RPC, thereby invalidating/releasing the local cache in the process, or set up a direct memory access (DMA) transfer (e.g., outside of local cache) such that when the call is executed remotely the implemented data will already be located in cache on the remote PU.

In accordance with an exemplary implementation, using the mechanisms of pushing, remapping and wandering together means that a task such as a database query can move efficiently through multiple PUs without accessing shared memory mechanisms to retrieve pieces of the query itself, and it may exist in local memory and caches (rather than in other memory). Similarly, an object such as a video frame/sequence can be passed through a chain of PUs for video compression or decompression. However, at the programmer's level, it is not necessary to know the architecture of the runtime system; rather, the code will be partitioned such that potential RPC boundaries can be identified. For example, in a general purpose graphical processing unit (GP-GPU) system for video processing, particular "warps", wherein a warp is a bank of processors running the same code, would be associated with particular routines (using code sector mapping), and the type-dependent allocation and remapping can make use of the inter-bank memory such that user level tasks will automatically "wander" through a GPU pipeline. Existing approaches to programming GPUs include CUDA and OpenCL, which target a particular processing architecture and involve learning new coding styles, whereas the "wandering threads" approach allows programmers to use a familiar platform independent (SMP) style, and the architectural issues of where code actually runs and data is stored can be handled independently thus making the code more portable and longer lived.

Figure 33:
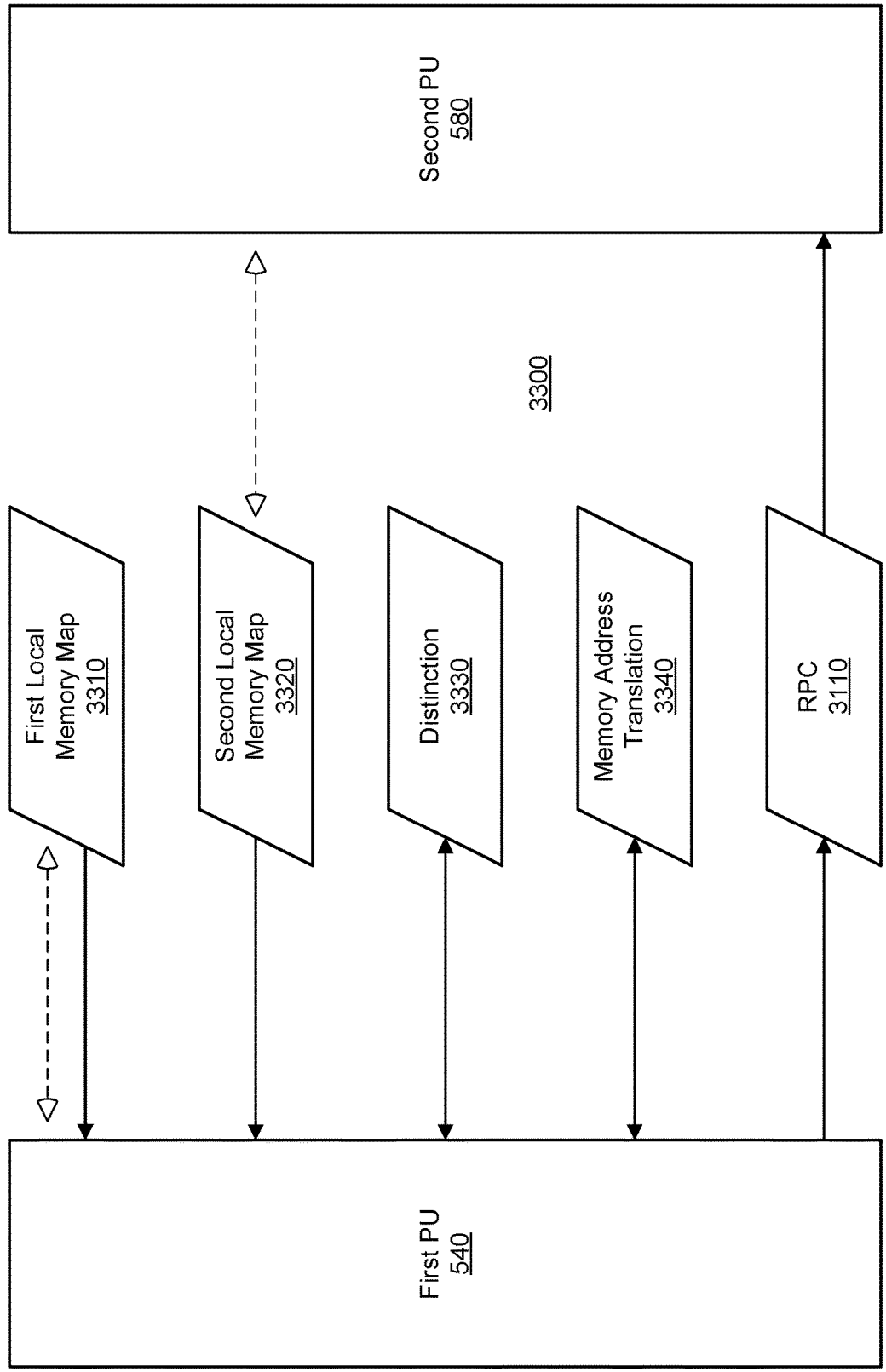
FIG. 33 is a block diagram of an exemplary RPC construction paradigm in accordance with an embodiment.

In one embodiment, the global memory map into which all memory within a particular system or network is allocated distinctly may be different from the individual PUs' respective memory maps, and addresses may be translated during the RPC process. To illustrate, and with reference now to FIG. 33, an exemplary RPC construction paradigm 3300 in accordance with an embodiment is shown. In particular, first and second local memory maps 3310, 3320 associated with first and second PUs 540, 580, respectively, are identified (e.g., by first PU 540). Additionally, a distinction 3330 between first and second local memory maps 3310, 3320 is identified, and a memory address translation 3340 is generated based on distinction 3330. Moreover, memory address translation 3340 is utilized to construct RPC 3110. In this manner, the RPC is generated based on the local memory maps of the client and server PUs.

Indeed, in one embodiment, the local memory may be mapped into the lower address space so that most local memory is accessible with a lower number of address bits. Consider the example where a processor is to be implemented that is designed for handling a 16 or 32 bit address space rather than a 64 bit address space, which may also be the case for each processor within the system. This is similar to "virtual memory", but it may be accomplished in the application layer so that multiple machines can be spanned and have finer granularity. Thus, a relatively large program is implemented that is to span multiple machines, and mapping the entire system may not be feasible if control is not maintained over the local memory mapping process. Consequently, the runtime code will map the local machine into a distinct space in the global map, pieces of the global map may be cached locally (e.g., by software rather than hardware), and calls for non-local data will be automatically transferred when necessary, noting that this works for single address argument calls (such as mutex calls) but may not work for calls to executable routines having arguments that are pointers to memory on different machines (without the software caching, which may involve source code level awareness).

Figure 34:
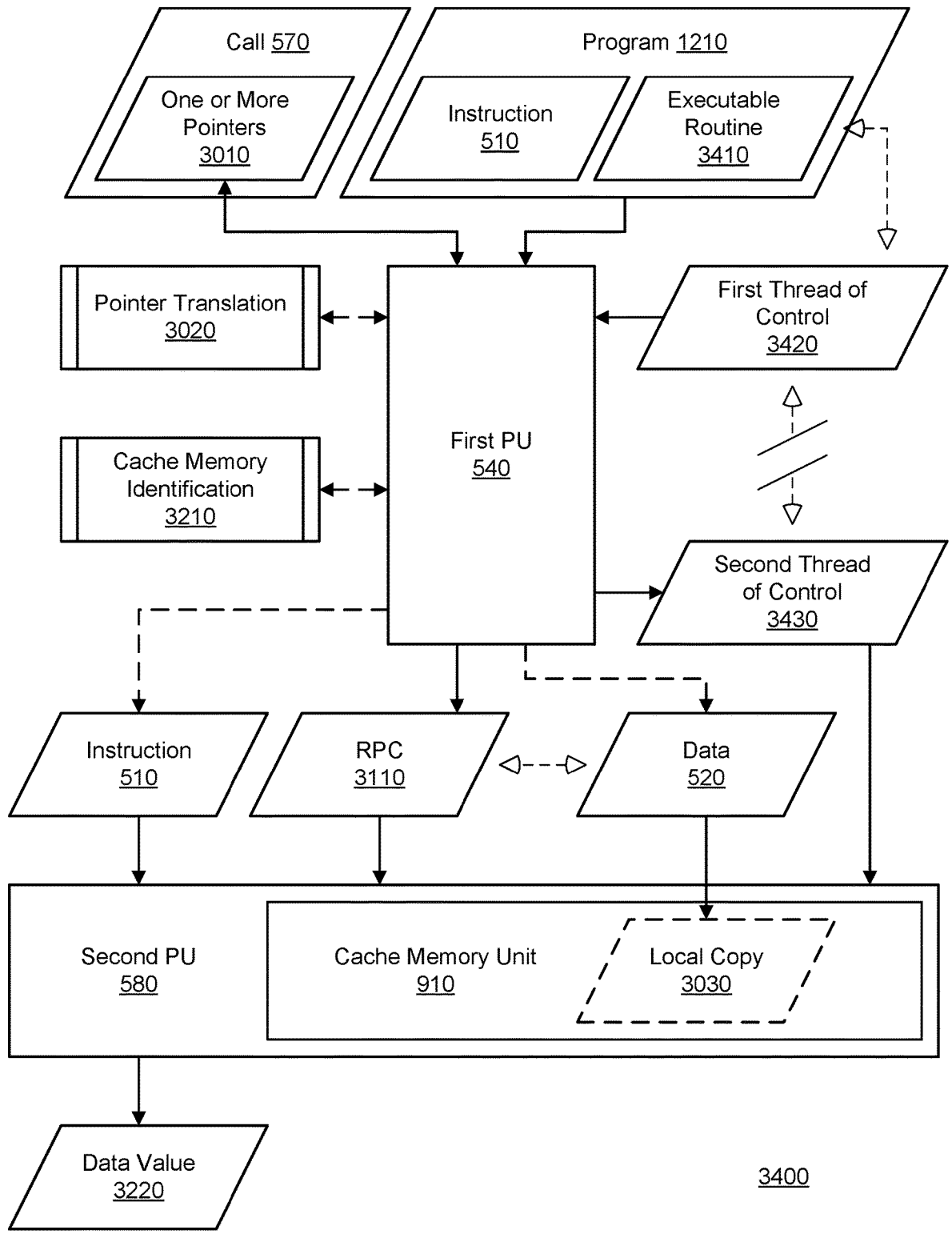
FIG. 34 is a block diagram of an exemplary executable routine performance paradigm in accordance with an embodiment.

As previously indicated, in the case where a routine does not involve a return (such as indicated in C/C++ as "void" calls), an embodiment provides that the RPC mechanism may immediately return locally without waiting for the remote PU. To illustrate, and with reference now to FIG. 34, an exemplary executable routine performance paradigm 3400 in accordance with an embodiment is shown. In particular, program 1210, which includes instruction 510 as well as an executable routine 3410 associated with a first thread of control 3420, is accessed. Additionally, one or more pointers 3010 in call 570 are identified, and one or more pointers 3010 are translated, as represented by pointer translation 3020, so as to configure call 570 to pass data 520 by value rather than by reference to thereby create a second thread of control 3430. Moreover, a cache memory unit 910 associated with (e.g., contained within and allocated to) second PU 580 is identified, as represented by cache memory identification 3210, and data 520 is passed by value as a result of RPC 3110 to thereby store local copy 3030 of data 520 in cache memory unit 910 and provide second PU 580 with second thread of control 3430. Furthermore, executable routine 3410 is performed with first PU 540 based on first thread of control 3420, while second PU 580 performs an execution of instruction 510 based on second thread of control 3430, as a result of first thread of control 3420 being independent of second thread of control 3430, whereby executable routine 3410 lacks a return request for a data value 3220 generated during this execution.

In view of the foregoing, it is noted that, pursuant to an embodiment, first PU 540 is able to continue on without waiting for a return from the RPC, in which case it will be assumed that second PU 580 will complete the call. For example, if a pass-by-reference print call is converted into a pass-by-value call, and if first PU 540 is not to be provided with confirmation that execution of the transferred call has been successful (when such execution has in fact been successful), then the transferred call therefore becomes an independent thread (e.g., a wandering thread).

The foregoing notwithstanding, it is noted that, in one embodiment, the call transfer procedure is executed based on the implementation of shared-memory coherence machine instructions. To illustrate, and with reference now to FIG. 35, an exemplary executable routine transferring paradigm 3500 in accordance with an embodiment is shown. In particular, a first processing core 3520 is identified, wherein first processing core 3520 is performing a first executable routine 3530 mapped to data 520, and wherein first executable routine 3520 includes shared-memory coherence machine instructions 3540. Additionally, a second executable routine 3550 is accessed at a second processing core 3560; thus, it is noted that two different processing cores are implemented. Moreover, a procedure call 3580 (e.g., a RPC) is invoked to thereby transfer second executable routine 3550 from second processing core 3560 to first processing core 3520 based on second executable routine 3550 being mapped to data 520 and based on second executable routine 3550 including shared-memory coherence machine instructions 3540. Indeed, in so much as first processing core 3520 is already processing first executable routine 3530, which includes shared-memory coherence machine instructions 3540, first processing core 3520 will be able to efficiently execute these same shared-memory coherence machine instructions 3540 during an execution of second executable routine 3550.

Figure 35:
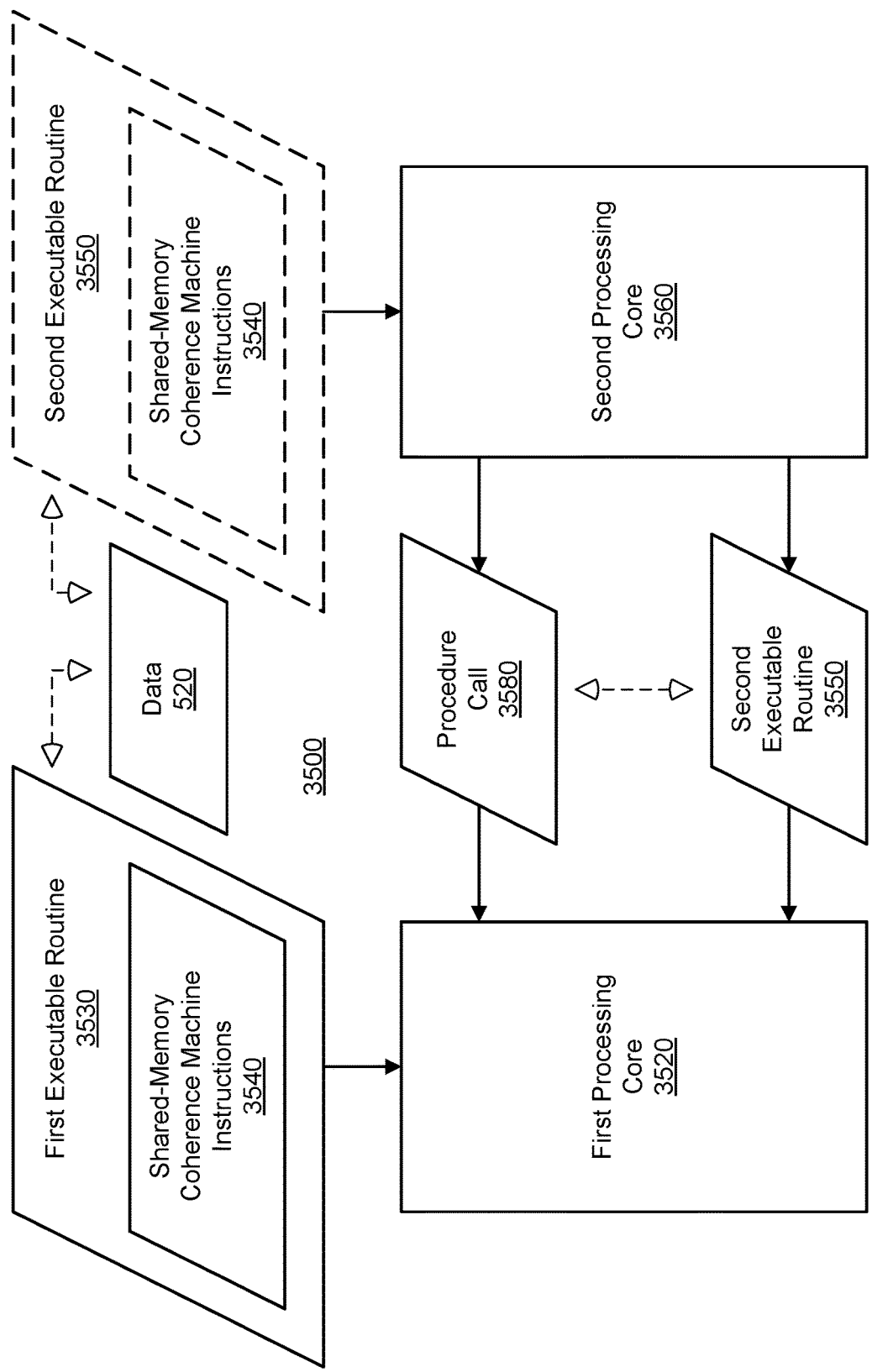
FIG. 35 is a block diagram of an exemplary executable routine transferring paradigm in accordance with an embodiment.

With reference still to FIG. 35, an embodiment provides that different PUs include first and second processing cores 3520, 3560, respectively. Consider the example where first and second PUs 540, 580 include second and first processing cores 3560, 3520, respectively. As a result of having decided to transfer a call, the call is transferred from second processing core 3560 in first PU 540 to first processing core 3520 in second PU 580 such that the thread of control is transferred from first PU 540 to second PU 580, and such that first PU 540 is consequently free to access a different, independent thread.

Pursuant to one embodiment, however, a single PU (e.g., first PU 540) includes both of first and second processing cores 3520, 3560, such as where the RPC is routed between cores within a multi-core processor. For example, if a particular PU has multiple cores, the RPC mechanism may be used locally so that only one processor handles calls on shared data (e.g. the same processing core is allocated to all mutex calls). In this case, the call would cross between cores that share a coherent memory system (e.g., L2 cache), which is in contrast to the RPC calls routed between cores addressing disjoint pieces of memory that are not coherent.

III. Exemplary Computer System Environments

It is noted that various components of the present technology may be hard-wired or configured to carry out various actions and operations discussed herein. Pursuant to one embodiment, however, a computer system may be implemented to carry out various operations of the present technology. Consequently, an exemplary computer system and configuration will now be explored. However, the present technology is not limited to this exemplary system and configuration. Indeed, other systems and configurations may be implemented.

Figure 36:
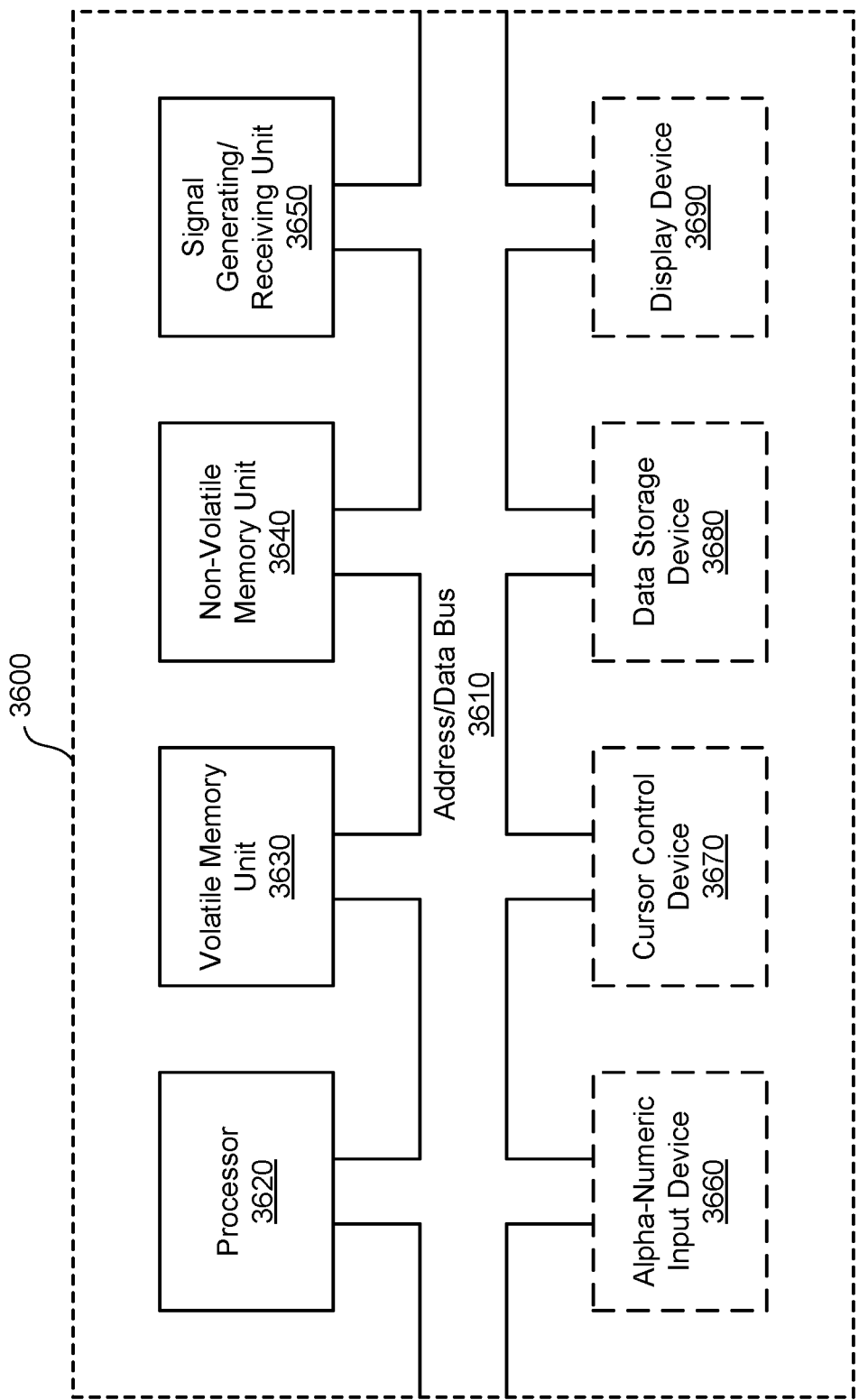
FIG. 36 is a block diagram of an exemplary computer system in accordance with an embodiment.

With reference now to FIG. 36, an exemplary computer system 3600 in accordance with an embodiment is shown. Computer system 3600 may be any type of computing device (e.g., a computing device utilized to perform calculations, processes, operations, and functions associated with a program or algorithm). Within the discussions herein, certain processes and steps are discussed that are realized, pursuant to one embodiment, as a series of instructions, such as a software program, that reside within computer-readable memory units and are executed by one or more processors of computer system 3600. When executed, the instructions cause computer system 3600 to perform specific actions and exhibit specific behavior described in various embodiments herein.

With reference still to FIG. 36, computer system 3600 includes an address/data bus 3610 configured to communicate information between a source and a destination. In addition, one or more data processors, such as processor 3620, are coupled with address/data bus 3610, wherein processor 3620 is configured to process information and instructions. In an embodiment, processor 3620 is a microprocessor or microcontroller, although other types of data processors may be implemented.

Computer system 3600 also includes a number of data storage components, such as, for example, a volatile memory unit 3630. Volatile memory unit 3630 is communicatively associated or coupled with address/data bus 3610. Additionally, volatile memory unit 3630 is configured to store information and instructions for processor 3620. Moreover, volatile memory unit 3630 may include, for example, random access memory (RAM), such as static RAM and/or dynamic RAM. Computer system 3600 further includes a non-volatile memory unit 3640, which is communicatively associated or coupled with address/data bus 3610 and configured to store static information and instructions for processor 3620. In an embodiment, non-volatile memory unit 3640 includes read-only memory (ROM), such as programmable ROM, flash memory, erasable programmable ROM (EPROM), and/or electrically erasable programmable ROM (EEPROM). The foregoing notwithstanding, it is noted that the present technology is not limited to the use of the exemplary storage units discussed herein, and that other types of memory may be implemented.

With reference still to FIG. 36, computer system 3600 also includes one or more signal generating and receiving devices, such as signal generating/receiving unit 3650, which is communicatively associated or coupled with address/data bus 3610 and configured to enable computer system 3600 to interface with other electronic devices and computer systems. The communication interface(s) implemented by the one or more signal generating and receiving devices may utilize wired (e.g., serial cables, fiber optic cables, modems, and network adapters) and/or wireless (e.g., wireless modems and wireless network adapters) communication technologies.

In an embodiment, computer system 3600 optionally includes an alphanumeric input device 3660 that is communicatively associated or coupled with address/data bus 3610, wherein alphanumeric input device 3660 includes alphanumeric and function keys for communicating information and command selections to processor 3620. Moreover, pursuant to one embodiment, a cursor control device 3670 is communicatively associated or coupled with address/data bus 3610, wherein optional cursor control device 3670 is configured to communicate user input information and command selections to processor 3620. For example, cursor control device 3670 may be implemented using a mouse, a track-ball, a track-pad, an optical tracking device, or a touch screen. In a second example, a cursor is directed and/or activated in response to input from alphanumeric input device 3660, such as when special keys or key sequence commands are executed. It is noted, however, that a cursor may be directed by other means, such as, for example, voice commands.

With reference still to FIG. 36, computer system 3600, pursuant to one embodiment, optionally includes a data storage device 3680 that is communicatively associated or coupled with address/data bus 3610, wherein data storage device 3680 is configured to store information and/or computer-executable instructions. To illustrate, one example provides that data storage device 3680 is a magnetic or optical disk drive, such as a hard disk drive (HDD), a floppy disk drive, a compact disk ROM (CD-ROM) drive, a digital versatile disk (DVD) drive, or a Blu-ray Disk™ (BD) drive.

Furthermore, in an embodiment, a display device 3690 is communicatively associated or coupled with address/data bus 3610 and configured to display video and/or graphics. Display device 3690 may be, for example, a cathode ray tube (CRT) display, a field emission display (FED), a plasma display, a liquid crystal display (LCD), a light emitting diode (LED) display, or any other display device suitable for displaying video and/or graphic images and alphanumeric characters capable of being recognized by a user.

It is noted that computer system 3600 is presented as an exemplary computing environment in accordance with an embodiment. However, computer system 3600 is not strictly limited to being a computer system. For example, one embodiment provides that computer system 3600 represents a type of data processing analysis that may be used in accordance with various embodiments described herein. Moreover, other computing systems may be implemented. Indeed, the present technology is not limited to any particular data processing environment.

In addition to the foregoing, it is noted that various methods of the present technology may be carried out by a computer system configured to execute a set of instructions. Such instructions may be stored, for example, on or within a computer-readable medium (e.g., on or within a non-transitory computer-readable medium, or on or within a transitory computer-readable medium that includes something other than one or more transitory, propagating signals per se) such that the instructions, when executed, cause a computer system to perform a method of the present technology. Consequently, an exemplary system and configuration for a computer-readable medium will now be explored. However, the present technology is not limited to this exemplary system and configuration. Indeed, other systems and configurations may be implemented.

Figure 37:
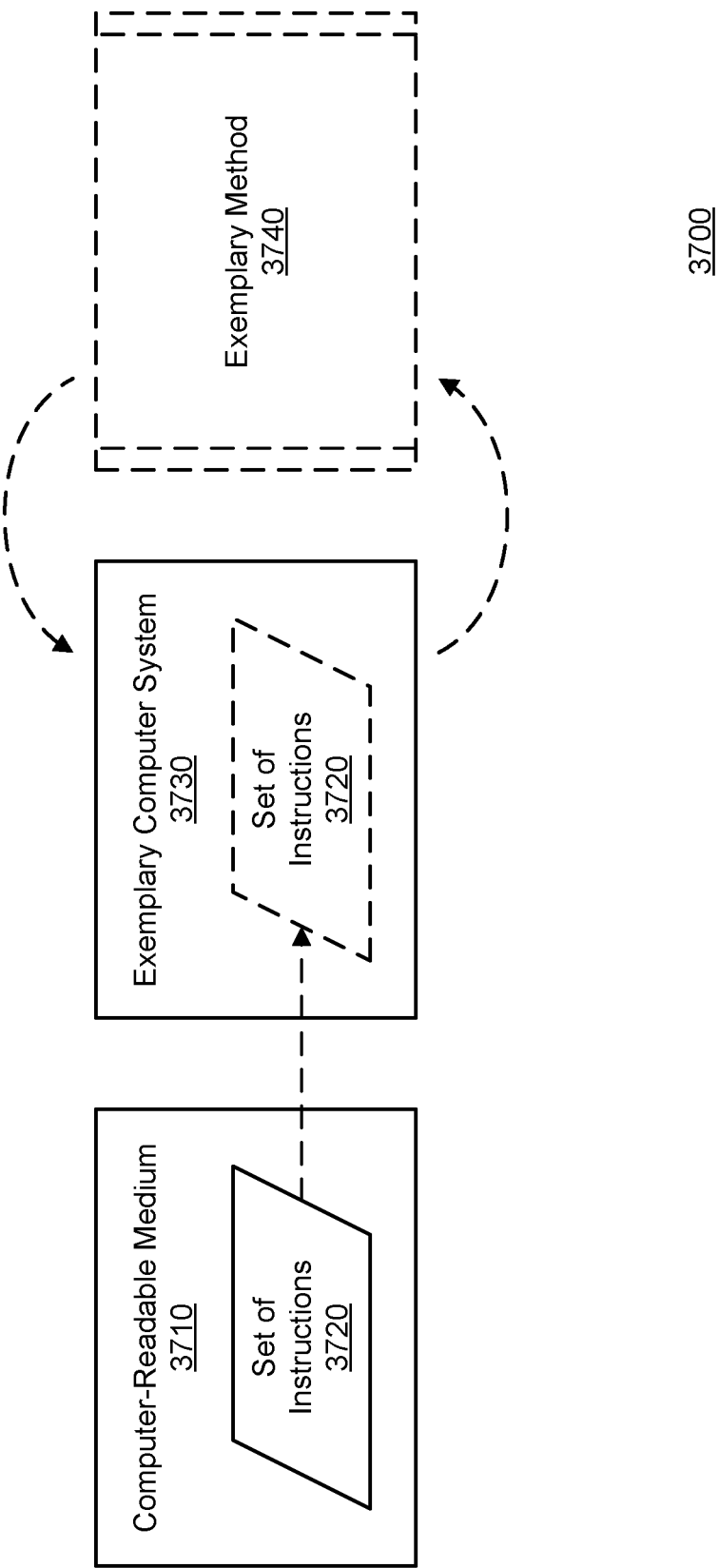
FIG. 37 is a block diagram of an exemplary instruction execution system in accordance with an embodiment.

With reference now to FIG. 37 an exemplary instruction execution system 3700 in accordance with an embodiment is shown. Exemplary instruction execution system 3700 includes a computer-readable medium 3710 configured to store a set of instructions 3720 that when executed cause a computer system, such as exemplary computer system 3730, to perform a method of the present technology, such as exemplary method 3740. For example, in one embodiment, set of instructions 3720 is acquired by computer system 3730 from computer-readable medium 3710, and then computer system 3730 executes set of instructions 3720 and consequently performs exemplary method 3740.

The foregoing notwithstanding, it is noted that the electronic and software based systems discussed herein are merely examples of how suitable computing environments for the present technology might be implemented, and that these examples are not intended to suggest any limitation as to the scope of use or functionality of the present technology. Neither should such exemplary systems be interpreted as having any dependency or requirement relating to any one or combination of the components illustrated in the disclosed examples.

IV. Exemplary Implementations

In view of the foregoing, it is noted that various embodiments of the present technology involve at least one of the following:

Feature 1: using data locality to avoid instruction code cache misses, such as by allocating specific data types to a particular processing unit;

Feature 2: allocating data in memory to thereby achieve data locality so as to support Feature 1;

Feature 3: implementing "wandering threads" so as to take advantage of Features 1 and 2; and Feature 4: code injection and runtime modification for performance and to support Features 1 through 3.

It is further noted that various embodiments involve the implementation of a processor-in-memory architecture and software methods for parallel processing with support for accelerating single threaded code. Moreover, one exemplary implementation provides that a platform supporting wandering threads is configured to provide an application programming interface (API) that is callable from C and/or assembly level instructions in order to invoke the RPC mechanism.

In accordance with an exemplary implementation, the value of various embodiments of the present technology may be appreciated by observing the behavior of circuit simulations based on hardware description languages such as Verilog and VHDL. Such descriptions are extremely parallel, but do not accelerate linearly (e.g., N times faster for N processors, wherein N is an integer value greater than 1) with various defined SMP architectures. The lack of performance is mostly due to a bottleneck in the shared memory system, which is utilized by each processor from among a plurality of implemented processors. Moreover, code may be difficult to verify due to cache-coherency problems, and bugs may be difficult to replicate. Furthermore, cache coherency problems can also cost in terms of both hardware and power. In accordance with various embodiments of the present technology, however, these same simulator programs can be used, but by managing how the simulation data representing the circuit is allocated, it can be ensured that communication between neighboring pieces of simulation is localized, as it would be in the actual, physical circuit being modeled.

Consider the example where a large integrated circuit is provided on a silicon substrate, which has been separated into tiles, wherein each tile performs its own processing and communicates with its neighbors only along its edges. By allocating memory to PUs in the simulation in a similar manner to the tiles, the boundary communication will be similarly localized, and non-adjacent segments of a simulation will not interfere. The threads created on PUs for communicating signal value changes may be forked and detached (e.g., by injected code) such that they will "wander" to other PUs and be extinguished upon completion, thereby leaving the source PU free to do other work.

Additionally, pursuant to one exemplary implementation, a secondary problem with compiled-code simulators (e.g., VCS®) is that the code is specific to the circuit such that a large circuit with a variety of different uses for components generally produces a relatively large program, and large randomly-accessed program code tends to miss cache on instruction fetches more often. In so much as the variety of data on an individual PU is defined by an acceptable range of allocated data types, the corresponding code itself will be minimized, and the miss rate will be lower.

Moreover, certain problems with applications involving hardware simulations and database searching may be referred to, for example, as "data static" problems when the data in the system does not change significantly during the lifetime of a program, although a variety of operations may be performed on the data (such as to modify it) in unpredictable patterns causing poor cache performance and contention for memory access. A PU architecture in accordance with an embodiment of the present technology is configured to avoid such "data static" problems, because PU-to-PU communication is not through a shared bus, and PUs will automatically limit cache use to the code they will be utilizing for handling the data that they process (the working data being local to the PU). As such, once a reliable data distribution system/channel is established, it is implicitly configured to perform in a relatively efficient manner.

In accordance with an exemplary implementation, a wandering thread approach to code execution on a DPA is particularly suited to tasks involving large amounts of static data, such as when applications search within structured or unstructured databases. Consider the example where a thread is configured to identify or lookup information in a database. This thread wanders through multiple PUs as it goes through index code and then through the data itself, with the code writing back to the originating PU as it hits targets in the data. Multiple requests can be handled simultaneously without much interference, and if there is a bottleneck upon processing, such as may occur, for example, in an index, additional PUs can be transparently assigned to handle the same address space, using the RPC selection mechanism to pick either random or more lightly loaded PUs from among potential targets.

Although various embodiments discussed herein involve a series of specific steps, actions or operations for achieving a result, it is noted these steps, actions or operations are examples of various steps, actions or operations that may be performed in accordance with a number of exemplary implementations. Indeed, the embodiments disclosed herein may be configured such that various other steps, actions or operations are performed, such as variations of the steps, actions or operations recited. Moreover, the steps disclosed herein may be performed in an order different than presented, and not all of the steps are necessarily performed in a particular embodiment.

V. Exemplary Summary Concepts

It is noted that the foregoing discussion has presented at least the following concepts:

Concept 0. A parallel processing machine including or comprising:

a plurality of processing units (PUs) communicatively associated or coupled with one another, or connected to each other, wherein each of the plurality of PUs has local memory, and wherein the plurality of PUs are configured to execute an instruction or to transfer execution of an instruction to another PU based on a data or code location in memory associated with the instruction.

Concept 1. A computer-readable medium storing a set of instructions that when executed cause a computer system to perform a method of processing resource allocation, the method including or comprising:

identifying an instruction mapped to data having a preselected data location; and determining whether to transfer a call of the instruction from a first processing unit (PU) to a second PU based on the preselected data location.

Concept 2. The computer-readable medium of Concept 1, wherein the method further includes or comprises:

selecting a cache memory unit associated with the first PU;

loading the instruction into the cache memory unit; and injecting an extra code set into the cache memory unit at a boundary associated with the instruction, the instruction being a target instruction, and the extra code set configured to enable the first PU to determine whether to transfer the call to a specific PU.

Concept 3. The computer-readable medium of Concept 2, wherein the method further includes or comprises:

identifying one or more executable routine names corresponding to one or more preselected executable routines, respectively; and selecting the extra code set based on the one or more executable routine names so as to convert the call from a pass-by-reference call into a pass-by-value call.

Concept 4. The computer-readable medium of Concept 1, wherein the method further includes or comprises:

identifying first and second cache memory units associated with the first and second PUs, respectively;

identifying first and second data locations associated with first and second data sets, respectively, the first and second data locations located within the first and second cache memory units, respectively; and conducting an allocation of the first and second cache memory units to the first and second data sets, respectively, based on the first and second data locations.

Concept 5. The computer-readable medium of Concept 4, wherein the method further includes or comprises:

identifying a data set mapped to the instruction; and determining that the data set is currently stored in the second cache memory unit, rather than in the first cache memory unit, to thereby decide to transfer the call from the first PU to the second PU.

Concept 6. The computer-readable medium of Concept 1, wherein the method further includes or comprises:

identifying first and second cache memory units associated with the first and second PUs, respectively;

accessing the call with the first PU, the call including or comprising an argument indicating that the instruction is mapped to the preselected data location;

analyzing the argument with the first PU to make a determination that the preselected data location is not located within the first cache memory unit; and identifying the call as a potential redirect call based on the determination.

Concept 7. The computer-readable medium of Concept 6, wherein the method further includes or comprises:

determining that the preselected data location is not located within the second cache memory unit to thereby make a decision to execute target code associated with the potential redirect call with the first PU; and executing the target code with the first PU based on the decision.

Concept 8. The computer-readable medium of Concept 6, wherein the method further includes or comprises:

determining that the preselected data location is located within the second cache memory unit to thereby identify the potential redirect call as an actual redirect call; and transferring the actual redirect call from the first PU to the second PU.

Concept 9. The computer-readable medium of Concept 1, wherein the method further includes or comprises:

identifying a code or data memory location associated with the instruction; and transferring the call from the first PU to the second PU based on the code or data memory location being associated with the second PU.

Concept 10. The computer-readable medium of Concept 9, wherein the method further includes or comprises:

determining that the code or data memory location is associated with the second PU and a plurality of other PUs;

defining a numerical measurement reflecting a currently available processing capability corresponding to the second PU;

defining a plurality of other numerical measurements reflecting a plurality of other currently available processing capabilities, respectively, the plurality of other currently available processing capabilities corresponding to the plurality of other PUs, respectively; and transferring the call from the first PU to the second PU based on the numerical measurement being greater than each of the other numerical measurements.

Concept 11. The computer-readable medium of Concept 9, wherein the method further includes or comprises:

selecting a specific resource; and transferring the call from the first PU to the second PU based on a degree of control of the specific resource being assigned to the second PU, based on the first PU lacking access to the specific resource and based on one or more other PUs lacking access to the specific resource.

Concept 12. The computer-readable medium of Concept 1, wherein the method further includes or comprises:

selecting a shared random access memory (RAM) unit having the instruction stored therein;

identifying a sector of the shared RAM unit as a redirect sector; and determining whether the instruction is stored in the redirect sector to thereby determine whether to transfer the call from the first PU to the second PU.

Concept 13. The computer-readable medium of Concept 1, wherein the method further includes or comprises:

selecting a shared RAM unit;

identifying one or more sectors of the shared RAM unit as one or more redirect sectors, respectively;

identifying a program including or comprising the instruction;

accessing static code corresponding to the program;

partitioning the shared RAM unit by defining a collective size of the one or more redirect sectors based on a size of the static code; and loading an amount of the static code into one or more selected redirect sectors from among the one or more redirect sectors based on the partitioning and a PU specification.

Concept 14. The computer-readable medium of Concept 13, wherein the method further includes or comprises:

identifying one or more different sectors of the shared RAM unit as one or more non-redirect sectors, respectively;

accessing one or more portions of at least one shared library corresponding to the program;

proportioning the shared RAM unit by defining the collective size of the one or more redirect sectors based on a collective size of the static code and the one or more portions of the at least one shared library; and loading one or more portions of the static code either into one or more selected redirect sectors from among the one or more redirect sectors or into one or more selected non-redirect sectors from among the one or more non-redirect sectors based on the proportioning and the PU specification, and/or loading the one or more portions of the at least one shared library either into one or more selected redirect sectors from among the one or more redirect sectors or into one or more selected non-redirect sectors from among the one or more non-redirect sectors based on the proportioning and the PU specification.

Concept 15. The computer-readable medium of Concept 1, wherein the method further includes or comprises:
selecting a cache memory unit associated with the first PU;
fetching code or data associated with the instruction into the cache memory unit;
identifying a PU data path associated with the first PU; and
defining shadow register values in the PU data path such that the shadow register values reflect PU identifiers indicating at least one PU associated with the code or data.

Concept 16. The computer-readable medium of Concept 1, wherein the method further includes or comprises:
identifying code associated with the instruction;
identifying an executable routine including or comprising at least one shared-memory coherence machine instruction; and
transferring the call from the first PU to the second PU based on the executable routine being associated with the second PU and based on the code being mapped to the at least one shared-memory coherence machine instruction.

Concept 17. The computer-readable medium of Concept 1, wherein the method further includes or comprises:
identifying a global memory location associated with the instruction; and
automatically transferring the call from a third PU to the first PU as a result of the third PU lacking access to the global memory location and the first PU having access to the global memory location.

Concept 18. The computer-readable medium of Concept 1, wherein the method further includes or comprises:
identifying a cache memory unit associated with a specific PU;
conducting an allocation of the cache memory unit to a specific data type associated with the data based on the preselected data location being located within the cache memory unit;
accessing a program including or comprising the instruction;
identifying a programming language corresponding to the program;
accessing a library corresponding to the programming language, the library defining a constructor including or comprising a memory allocation call, and the memory allocation call being mapped to information having the specific data type;
implementing an amendment to the memory allocation call based on the allocation to thereby create an amended memory allocation call and a modified version of the program; and
performing the amended memory allocation call such that the information is loaded into the cache memory unit as a result of the amendment.

Concept 19. The computer-readable medium of Concept 18, wherein the method further includes or comprises:
performing the call to thereby execute the modified version of the program with the specific PU as a result of the allocation.

Concept 20. The computer-readable medium of Concept 1, wherein the method further includes or comprises:
identifying one or more code libraries;
accessing pass-by-reference source code associated with the one or more code libraries;
translating the pass-by-reference source code into pass-by-value support code to thereby generate a transfer library; and
utilizing the transfer library to pass the data by value rather than by reference.

Concept 21. The computer-readable medium of Concept 1, wherein the method further includes or comprises:
identifying one or more pointers in the call;
translating the one or more pointers to thereby configure the call to pass the data by value rather than by reference;
executing a transfer of the call from the first PU to the second PU;
passing the data by value during the transfer to thereby store a local copy of the data in a first cache memory unit, the second PU including or comprising the first cache memory unit; and
remapping the one or more pointers to the local copy to thereby enable the call to be executed without accessing a second cache memory unit, the first PU including or comprising the second cache memory unit.

Concept 22. The computer-readable medium of Concept 1, wherein the method further includes or comprises:
invoking a remote procedure call (RPC) to thereby transfer the call from the first PU to the second PU.

Concept 23. The computer-readable medium of Concept 22, wherein the method further includes or comprises:
identifying first and second local memory maps associated with the first and second PUs, respectively;
identifying a distinction between the first and second local memory maps;
generating a memory address translation based on the distinction; and
utilizing the memory address translation to construct the RPC.

Concept 24. The computer-readable medium of Concept 22, wherein the method further includes or comprises:
identifying first and second cache memory units associated with the first and second PUs, respectively;
identifying a data value stored in the first cache memory unit and associated with the instruction; and
storing the data value in the second cache memory unit as a result of the RPC.

Concept 25. The computer-readable medium of Concept 24, wherein the method further includes or comprises:
delaying an execution of the call by the second PU until the data value is stored in the second cache memory.

Concept 26. The computer-readable medium of Concept 22, wherein the method further includes or comprises:
accessing a program including or comprising the instruction and an executable routine associated with a first thread of control;
identifying one or more pointers in the call;
translating the one or more pointers so as to configure the call to pass the data by value rather than by reference to thereby create a second thread of control;
identifying a cache memory unit associated with the second PU;
passing the data by value as a result of the RPC to thereby store a local copy of the data in the cache memory unit and provide the second PU with the second thread of control; and
performing the executable routine with the first PU based on the first thread of control, while the second PU performs an execution of the instruction based on the second thread of control, as a result of the first thread of control being independent of the second thread of control, whereby the executable routine lacks a return request for a data value generated during the execution.

Concept 27. The computer-readable medium of Concept 1, wherein the method further includes or comprises:

identifying a first processing core performing a first executable routine mapped to the data, the first executable routine including or comprising shared-memory coherence machine instructions;

accessing a second executable routine at a second processing core; and invoking a procedure call to thereby transfer the second executable routine from the second processing core to the first processing core based on the second executable routine being mapped to the data and based on the second executable routine including or comprising the shared-memory coherence machine instructions.

Concept 28. The computer-readable medium of Concept 27, wherein different PUs include or comprise the first and second processing cores, respectively, the procedure call being a RPC.

Concept 29. The computer-readable medium of Concept 27, wherein a single PU includes or comprises both of the first and second processing cores, the procedure call being a RPC.

Concept 30. The computer-readable medium of Concept 1, wherein the method further includes or comprises:

accessing a program including or comprising the instruction;

identifying a programming language corresponding to the program, the programming language configured to implement a virtual function table (VFT) such that a data item belonging to a class having one or more virtual functions includes or comprises one or more VFT pointers mapped to the VFT;

identifying a constructor associated with the programming language, the constructor configured to define the one or more VFT pointers; and injecting a wrapper call around the constructor during a loading of the program to thereby replace the one or more VFT pointers with pointers to VFTs including or comprising one or more RPC decision wrappers for the one or more virtual functions.

Concept 31. The computer-readable medium of Concept 1, wherein the method further includes or comprises:

accessing a program including or comprising the instruction;

identifying a programming language corresponding to the program, the programming language configured to implement a VFT such that a data item belonging to a class having one or more virtual functions includes or comprises one or more VFT pointers mapped to the VFT; and modifying the VFT, as a result of an implementation of multiple RPCs, such that the one or more virtual functions are automatically directed to one or more RPCs, respectively, without RPC decision code being called.

Concept 32. The computer-readable medium of Concept 1, wherein the method further includes or comprises:

accessing a program including or comprising the instruction;

identifying a programming language corresponding to the program, the programming language configured to implement a VFT such that a data item belonging to a class having one or more virtual functions includes or comprises one or more VFT pointers mapped to the VFT; and modifying the VFT, as a result of a lack of an implementation of one or more RPCs, such that the one or more virtual functions are automatically directed to local code associated with the program without RPC decision code being called.

Concept 33. The computer-readable medium of Concept 1, wherein the method further includes or comprises:

accessing a predefined version of the instruction including or comprising code mapped to a plurality of conditional branches;

generating multiple modified versions of the instruction, each of the modified versions including or comprising the code modified to follow a different conditional branch from among the plurality of conditional branches;

predicting a plurality of behaviors associated with the multiple modified versions, respectively;

accessing an executable routine associated with the instruction;

identifying a runtime behavior associated with the executable routine; and selecting a modified version from among the multiple modified versions for execution during a performance of the executable routine based on a predicted behavior of the modified version corresponding to the runtime behavior.

Concept 34. The computer-readable medium of Concept 1, wherein the method further includes or comprises:

accessing an executable routine associated with the instruction;

identifying first and second implementations of a virtual function, the virtual function including or comprising a VFT entry pointing at the first implementation, and the virtual function further including or comprising a VFT pointer mapped to a first VFT from among a plurality of VFTs;

initiating a performance of a portion of the executable routine with the first implementation;

identifying a branch behavior exhibited by the first implementation during the performance;

conducting a performance analysis of the branch behavior to thereby determine that a degree to which the second implementation corresponds to the branch behavior is greater than a degree to which the first implementation corresponds to the branch behavior; and either:
  remapping the VFT pointer to a second VFT from among the plurality of VFTs based on the performance analysis, the second VFT including or comprising a pointer mapped to the second implementation, or
  updating the VFT entry to point at the second implementation based on the performance analysis.

Concept 35. The computer-readable medium of Concept 1, wherein the method further includes or comprises:

accessing a program associated with the instruction, the program including or comprising a predefined function mapped to a predefined call site;

performing a call of the predefined function with the predefined call site;

identifying a branch behavior exhibited by the predefined function as a result of the call; and modifying the predefined call site based on the branch behavior.

Concept 36. The computer-readable medium of Concept 1, wherein the method further includes or comprises:

accessing an executable routine associated with the instruction;

identifying first and second implementations of a virtual function, the virtual function including or comprising a VFT entry pointing at the first implementation, and the virtual function further including or comprising a VFT pointer mapped to a first VFT from among a plurality of VFTs;

initiating a performance of a portion of the executable routine with the first implementation;

identifying a branch behavior exhibited by the first implementation during the performance;

predicting a possible future behavior of the virtual function based on the branch behavior;

conducting a performance analysis of the possible future behavior to thereby determine that a degree to which the second implementation corresponds to the possible future behavior is greater than a degree to which the first implementation corresponds to the possible future behavior; and either:

remapping the VFT pointer to a second VFT from among the plurality of VFTs based on the performance analysis, the second VFT including or comprising a pointer mapped to the second implementation, or updating the VFT entry to point at the second implementation based on the performance analysis.

Concept 37. A processing resource allocation method including or comprising:

identifying an instruction mapped to data having a preselected data location; and determining with a processing resource allocation device whether to transfer a call of the instruction from a first processing unit (PU) to a second PU based on the preselected data location.

Concept 38. The processing resource allocation method of Concept 37, further including or comprising:

selecting a cache memory unit associated with the first PU;

loading the instruction into the cache memory unit; and injecting an extra code set into the cache memory unit at a boundary associated with the instruction, the instruction being a target instruction, and the extra code set configured to enable the first PU to determine whether to transfer the call to a specific PU.

Concept 39. The processing resource allocation method of Concept 38, further including or comprising:

identifying one or more executable routine names corresponding to one or more preselected executable routines, respectively; and selecting the extra code set based on the one or more executable routine names so as to convert the call from a pass-by-reference call into a pass-by-value call.

Concept 40. The processing resource allocation method of Concept 37, further including or comprising:

identifying first and second cache memory units associated with the first and second PUs, respectively;

identifying first and second data locations associated with first and second data sets, respectively, the first and second data locations located within the first and second cache memory units, respectively; and conducting an allocation of the first and second cache memory units to the first and second data sets, respectively, based on the first and second data locations.

Concept 41. The processing resource allocation method of Concept 40, further including or comprising:

identifying a data set mapped to the instruction; and determining that the data set is currently stored in the second cache memory unit, rather than in the first cache memory unit, to thereby decide to transfer the call from the first PU to the second PU.

Concept 42. The processing resource allocation method of Concept 37, further including or comprising:

identifying first and second cache memory units associated with the first and second PUs, respectively;

accessing the call with the first PU, the call including or comprising an argument indicating that the instruction is mapped to the preselected data location;

analyzing the argument with the first PU to make a determination that the preselected data location is not located within the first cache memory unit; and identifying the call as a potential redirect call based on the determination.

Concept 43. The processing resource allocation method of Concept 42, further including or comprising:

determining that the preselected data location is not located within the second cache memory unit to thereby make a decision to execute target code associated with the potential redirect call with the first PU; and executing the target code with the first PU based on the decision.

Concept 44. The processing resource allocation method of Concept 42, further including or comprising:

determining that the preselected data location is located within the second cache memory unit to thereby identify the potential redirect call as an actual redirect call; and transferring the actual redirect call from the first PU to the second PU.

Concept 45. The processing resource allocation method of Concept 37, further including or comprising:

identifying a code or data memory location associated with the instruction; and transferring the call from the first PU to the second PU based on the code or data memory location being associated with the second PU.

Concept 46. The processing resource allocation method of Concept 45, further including or comprising:

determining that the code or data memory location is associated with the second PU and a plurality of other PUs;

defining a numerical measurement reflecting a currently available processing capability corresponding to the second PU;

defining a plurality of other numerical measurements reflecting a plurality of other currently available processing capabilities, respectively, the plurality of other currently available processing capabilities corresponding to the plurality of other PUs, respectively; and transferring the call from the first PU to the second PU based on the numerical measurement being greater than each of the other numerical measurements.

Concept 47. The processing resource allocation method of Concept 45, further including or comprising:

selecting a specific resource; and transferring the call from the first PU to the second PU based on a degree of control of the specific resource being assigned to the second PU, based on the first PU lacking access to the specific resource and based on one or more other PUs lacking access to the specific resource.

Concept 48. The processing resource allocation method of Concept 37, further including or comprising:

selecting a shared random access memory (RAM) unit having the instruction stored therein;

identifying a sector of the shared RAM unit as a redirect sector; and determining whether the instruction is stored in the redirect sector to thereby determine whether to transfer the call from the first PU to the second PU.

Concept 49. The processing resource allocation method of Concept 37, further including or comprising:

selecting a shared RAM unit;

identifying one or more sectors of the shared RAM unit as one or more redirect sectors, respectively;

identifying a program including or comprising the instruction;

accessing static code corresponding to the program;

partitioning the shared RAM unit by defining a collective size of the one or more redirect sectors based on a size of the static code; and loading an amount of the static code into one or more selected redirect sectors from among the one or more redirect sectors based on the partitioning and a PU specification.

Concept 50. The processing resource allocation method of Concept 49, further including or comprising:

identifying one or more different sectors of the shared RAM unit as one or more non-redirect sectors, respectively;

accessing one or more portions of at least one shared library corresponding to the program;

proportioning the shared RAM unit by defining the collective size of the one or more redirect sectors based on a collective size of the static code and the one or more portions of the at least one shared library; and loading one or more portions of the static code either into one or more selected redirect sectors from among the one or more redirect sectors or into one or more selected non-redirect sectors from among the one or more non-redirect sectors based on the proportioning and the PU specification, and/or loading the one or more portions of the at least one shared library either into one or more selected redirect sectors from among the one or more redirect sectors or into one or more selected non-redirect sectors from among the one or more non-redirect sectors based on the proportioning and the PU specification.

Concept 51. The processing resource allocation method of Concept 37, further including or comprising:

selecting a cache memory unit associated with the first PU;

fetching code or data associated with the instruction into the cache memory unit;

identifying a PU data path associated with the first PU; and defining shadow register values in the PU data path such that the shadow register values reflect PU identifiers indicating at least one PU associated with the code or data.

Concept 52. The processing resource allocation method of Concept 37, wherein the method further includes or comprises:

identifying code associated with the instruction;

identifying an executable routine including or comprising at least one shared-memory coherence machine instruction; and transferring the call from the first PU to the second PU based on the executable routine being associated with the second PU and based on the code being mapped to the at least one shared-memory coherence machine instruction.

Concept 53. The processing resource allocation method of Concept 37, further including or comprising:

identifying a global memory location associated with the instruction; and automatically transferring the call from a third PU to the first PU as a result of the third PU lacking access to the global memory location and the first PU having access to the global memory location.

Concept 54. The processing resource allocation method of Concept 37, further including or comprising:

identifying a cache memory unit associated with a specific PU;

conducting an allocation of the cache memory unit to a specific data type associated with the data based on the preselected data location being located within the cache memory unit;

accessing a program including or comprising the instruction;

identifying a programming language corresponding to the program;

accessing a library corresponding to the programming language, the library defining a constructor including or comprising a memory allocation call, and the memory allocation call being mapped to information having the specific data type;

implementing an amendment to the memory allocation call based on the allocation to thereby create an amended memory allocation call and a modified version of the program; and performing the amended memory allocation call such that the information is loaded into the cache memory unit as a result of the amendment.

Concept 55. The processing resource allocation method of Concept 54, further including or comprising:

performing the call to thereby execute the modified version of the program with the specific PU as a result of the allocation.

Concept 56. The processing resource allocation method of Concept 37, further including or comprising:

identifying one or more code libraries;

accessing pass-by-reference source code associated with the one or more code libraries;

translating the pass-by-reference source code into pass-by-value support code to thereby generate a transfer library; and utilizing the transfer library to pass the data by value rather than by reference.

Concept 57. The processing resource allocation method of Concept 37, further including or comprising:

identifying one or more pointers in the call;

translating the one or more pointers to thereby configure the call to pass the data by value rather than by reference;

executing a transfer of the call from the first PU to the second PU;

passing the data by value during the transfer to thereby store a local copy of the data in a first cache memory unit, the second PU including or comprising the first cache memory unit; and remapping the one or more pointers to the local copy to thereby enable the call to be executed without accessing a second cache memory unit, the first PU including or comprising the second cache memory unit.

Concept 58. The processing resource allocation method of Concept 37, further including or comprising:

invoking a remote procedure call (RPC) to thereby transfer the call from the first PU to the second PU.

Concept 59. The processing resource allocation method of Concept 58, further including or comprising:

identifying first and second local memory maps associated with the first and second PUs, respectively;

identifying a distinction between the first and second local memory maps;

generating a memory address translation based on the distinction; and utilizing the memory address translation to construct the RPC.

Concept 60. The processing resource allocation method of Concept 58, further including or comprising:

identifying first and second cache memory units associated with the first and second PUs, respectively;

identifying a data value stored in the first cache memory unit and associated with the instruction; and storing the data value in the second cache memory unit as a result of the RPC.

Concept 61. The processing resource allocation method of Concept 60, further including or comprising:

delaying an execution of the call by the second PU until the data value is stored in the second cache memory.

Concept 62. The processing resource allocation method of Concept 58, further including or comprising:

accessing a program including or comprising the instruction and an executable routine associated with a first thread of control;

identifying one or more pointers in the call;

translating the one or more pointers so as to configure the call to pass the data by value rather than by reference to thereby create a second thread of control;

identifying a cache memory unit associated with the second PU;

passing the data by value as a result of the RPC to thereby store a local copy of the data in the cache memory unit and provide the second PU with the second thread of control; and performing the executable routine with the first PU based on the first thread of control, while the second PU performs an execution of the instruction based on the second thread of control, as a result of the first thread of control being independent of the second thread of control, whereby the executable routine lacks a return request for a data value generated during the execution.

Concept 63. The processing resource allocation method of Concept 37, further including or comprising:

identifying a first processing core performing a first executable routine mapped to the data, the first executable routine including or comprising shared-memory coherence machine instructions;

accessing a second executable routine at a second processing core; and invoking a procedure call to thereby transfer the second executable routine from the second processing core to the first processing core based on the second executable routine being mapped to the data and based on the second executable routine including or comprising the shared-memory coherence machine instructions.

Concept 64. The processing resource allocation method of Concept 63, wherein different PUs include or comprise the first and second processing cores, respectively, the procedure call being a RPC.

Concept 65. The processing resource allocation method of Concept 63, wherein a single PU includes or comprises both of the first and second processing cores, the procedure call being a RPC.

Concept 66. The processing resource allocation method of Concept 37, further including or comprising:

accessing a program including or comprising the instruction;

identifying a programming language corresponding to the program, the programming language configured to implement a virtual function table (VFT) such that a data item belonging to a class having one or more virtual functions includes or comprises one or more VFT pointers mapped to the VFT;

identifying a constructor associated with the programming language, the constructor configured to define the one or more VFT pointers; and injecting a wrapper call around the constructor during a loading of the program to thereby replace the one or more VFT pointers with pointers to VFTs including or comprising one or more RPC decision wrappers for the one or more virtual functions.

Concept 67. The processing resource allocation method of Concept 37, further including or comprising:

accessing a program including or comprising the instruction;

identifying a programming language corresponding to the program, the programming language configured to implement a VFT such that a data item belonging to a class having one or more virtual functions includes or comprises one or more VFT pointers mapped to the VFT; and modifying the VFT, as a result of an implementation of multiple RPCs, such that the one or more virtual functions are automatically directed to one or more RPCs, respectively, without RPC decision code being called.

Concept 68. The processing resource allocation method of Concept 37, further including or comprising:

accessing a program including or comprising the instruction;

identifying a programming language corresponding to the program, the programming language configured to implement a VFT such that a data item belonging to a class having one or more virtual functions includes or comprises one or more VFT pointers mapped to the VFT; and modifying the VFT, as a result of a lack of an implementation of one or more RPCs, such that the one or more virtual functions are automatically directed to local code associated with the program without RPC decision code being called.

Concept 69. The processing resource allocation method of Concept 37, further including or comprising:

accessing a predefined version of the instruction including or comprising code mapped to a plurality of conditional branches;

generating multiple modified versions of the instruction, each of the modified versions including or comprising the code modified to follow a different conditional branch from among the plurality of conditional branches;

predicting a plurality of behaviors associated with the multiple modified versions, respectively;

accessing an executable routine associated with the instruction;

identifying a runtime behavior associated with the executable routine; and selecting a modified version from among the multiple modified versions for execution during a performance of the executable routine based on a predicted behavior of the modified version corresponding to the runtime behavior.

Concept 70. The processing resource allocation method of Concept 37, further including or comprising:

accessing an executable routine associated with the instruction;

identifying first and second implementations of a virtual function, the virtual function including or comprising a VFT entry pointing at the first implementation, and the virtual function further including or comprising a VFT pointer mapped to a first VFT from among a plurality of VFTs;

initiating a performance of a portion of the executable routine with the first implementation;

identifying a branch behavior exhibited by the first implementation during the performance;

conducting a performance analysis of the branch behavior to thereby determine that a degree to which the second implementation corresponds to the branch behavior is greater than a degree to which the first implementation corresponds to the branch behavior; and
either:
remapping the VFT pointer to a second VFT from among the plurality of VFTs based on the performance analysis, the second VFT including or comprising a pointer mapped to the second implementation, or
updating the VFT entry to point at the second implementation based on the performance analysis.

Concept 71. The processing resource allocation method of Concept 37, further including or comprising:
accessing a program associated with the instruction, the program including or comprising a predefined function mapped to a predefined call site;
performing a call of the predefined function with the predefined call site;
identifying a branch behavior exhibited by the predefined function as a result of the call; and
modifying the predefined call site based on the branch behavior.

Concept 72. The processing resource allocation method of Concept 37, further including or comprising:
accessing an executable routine associated with the instruction;
identifying first and second implementations of a virtual function, the virtual function including or comprising a VFT entry pointing at the first implementation, and the virtual function further including or comprising a VFT pointer mapped to a first VFT from among a plurality of VFTs;
initiating a performance of a portion of the executable routine with the first implementation;
identifying a branch behavior exhibited by the first implementation during the performance;
predicting a possible future behavior of the virtual function based on the branch behavior;
conducting a performance analysis of the possible future behavior to thereby determine that a degree to which the second implementation corresponds to the possible future behavior is greater than a degree to which the first implementation corresponds to the possible future behavior; and
either:
remapping the VFT pointer to a second VFT from among the plurality of VFTs based on the performance analysis, the second VFT including or comprising a pointer mapped to the second implementation, or
updating the VFT entry to point at the second implementation based on the performance analysis.

It is noted that reference throughout this specification to features, advantages, or similar language does not imply that all of the features and advantages should be or are in any single embodiment. Rather, language referring to the features and advantages may be understood to mean that a specific feature, advantage, or feature described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon the foregoing exemplary embodiments, it is noted that certain modifications, variations, and alternative constructions may be implemented without departing from the scope of the present technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A non-transitory computer-readable medium storing a set of instructions that when executed cause a computer system to perform a method of allocating a one or more physical processing units (PUs), the method comprising:
securing at least one section of memory against hacking by not allowing all the PUs to have access to the at least one section of memory;
identifying a thread running on a given PU that is not allowed to access to a given memory location;
transferring the thread from the given PU to another PU that does have access to the given memory location disposed in the at least one secured section of memory.

2. The computer-readable medium of claim 1, wherein the method further comprises:
identifying one or more PUs implemented for one or more given functions, that no other PUs perform.

3. The computer-readable medium of claim 2, wherein:
the another PU is an only PU implemented for performing a security function.

4. The computer-readable medium of claim 3, wherein:
the security function is for encryption key checks.

5. The computer-readable medium of claim 4, wherein the method further comprises:
issuing a fault for any attempt to address data space for encryption keys from a PU other than the another PU, which was implemented for encryption key checks.

6. The computer-readable medium of claim 1, wherein the method further comprises:
hardening existing code where information to be secured is used by a less secure user code.

7. The computer-readable medium of claim 6, wherein the method of hardening further comprises:
permitting access to the at least one section of memory by an implemented PU only through an authorized routine that is allowed to make a transfer to the implemented PU.

8. The computer-readable medium of claim 1, wherein the method further comprises:
locking down an instruction memory to the given PU such that the given PU is not free to run code other than code in the instruction memory locked down to the given PU.

9. The computer-readable medium of claim 8, wherein the method of locking down further comprises:
customizing the memory protection so that the given PU is not free to run code other than code in the instruction memory locked down to the given PU.

10. A method of allocating one or more physical processing units (PUs) in a computer system, the method comprising:
identifying a thread running on a given PU that is not allowed to access to a given memory location; and
securing at least one section of memory against hacking by not allowing all the PUs to have access to the at least one section of memory; and
transferring the thread from the given PU to another PU that does have access to the given memory location.

11. The method of claim 10 further comprising:
identifying one or more PUs implemented for one or more given functions, respectively, that no other PUs perform.

12. The method of claim 10, wherein:
the another PU is an only PU implemented for performing a security function.

13. A computer system comprising:
a plurality of processors units (PUs); and
a block of memory coupled to the PUs; and wherein:
   at least two of the PUs each comprise a CPU and a local cache;
   at least one section of the block of memory is a section that does not allow all of the plurality of PUs to have access thereto; and
   at least one of the PUs does have access to the at least one section of the block of memory; and wherein:
      a thread is transferrable from a given PU, that is not allowed to access to a given memory location, to another PU that does have access to the given memory location disposed in the at least one secured section of memory.

14. The computer system of claim 13 further comprising:
one or more of the plurality of PUs are implemented for one or more given functions that no other PUs can perform.

15. The computer system of claim 13 wherein:
the at least one of the PUs is an only PU from among a plurality of implemented PUs providing a security function.

16. The computer system of claim 15 wherein:
the security function is encryption key checks.

17. The computer system of claim 13 further comprising:
a given PU tasked to handle encryption keys; and wherein:
   the given PU is the only PU from an implemented quantity of the plurality of PUs that has access to associated data in the at least one section of the block of memory for storing encryption keys.

18. The computer system of claim 17 further comprising:
an instruction memory coupled to the given PU; and wherein:
   the instruction memory is locked down such that the given PU is not free to run code other than code in the instruction memory locked down to the given PU.

19. A non-transitory computer-readable medium storing a set of instructions that when executed cause a computer system to perform a method of allocating a physical processing units (PUs), the method comprising:
   securing at least one section of memory against hacking by not allowing all the PUs to have access to the at least one section of memory;
   identifying a thread running on a given PU that is not allowed to access to a given memory location; and
   locking down an instruction memory to the given PU such that the given PU is not free to run code other than code in the instruction memory locked down to the given PU.

20. The computer-readable medium of claim 19, wherein the method of locking down further comprises:
   customizing the memory protection so that the given PU is not free to run code other than code in the instruction memory locked down to the given PU.

* * * * *